(12) United States Patent
Raffel et al.

(10) Patent No.: US 7,035,646 B2
(45) Date of Patent: *Apr. 25, 2006

(54) CORDLESS CELLULAR SYSTEM

(75) Inventors: Michael A. Raffel, Redmond, WA (US);
Michael D. Bamburak, Columbia, MD (US); David R. Glass, Redmond, WA (US); Keith Jarett, Oakland, CA (US); Masud Kibria, Kirkland, WA (US); Christopher G. Lawrnc, Kirkland, WA (US); Tony S. Lee, Alameda, CA (US); Ileana A. Leuca, Bellevue, WA (US); Joseph P. Marx, Kirkland, WA (US); Roderick Nelson, Kirkland, WA (US); Paul B. O'Neill, San Francisco, CA (US); Roland E. Williams, Walnut Creek, CA (US); Peter L. Winship, Albany, CA (US)

(73) Assignee: Cingular Wireless II, LLC, Atlanta, GA (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/647,105

(22) Filed: Aug. 22, 2003

(65) Prior Publication Data

US 2004/0152482 A1 Aug. 5, 2004

Related U.S. Application Data

(60) Continuation of application No. 10/235,039, filed on Sep. 4, 2002, now Pat. No. 6,611,692, which is a division of application No. 09/497,082, filed on Feb. 2, 2000, now abandoned, which is a division of application No. 08/838,664, filed on Apr. 9, 1997, now abandoned, which is a continuation of application No. 08/525,473, filed on Sep. 8, 1995, now Pat. No. 5,675,629.

(51) Int. Cl.
*H04Q 7/20* (2006.01)
*H04B 1/38* (2006.01)
*H04M 1/00* (2006.01)

(52) U.S. Cl. ..................................... 455/456; 455/561
(58) Field of Classification Search ................ 455/522, 455/561, 456
See application file for complete search history.

(56) References Cited

U.S. PATENT DOCUMENTS

| | | |
|---|---|---|
| 3,588,365 A | 6/1971 | McNeilly |
| 4,086,442 A | 4/1978 | Rickard |
| 4,313,035 A | 1/1982 | Jordan et al. |
| 4,392,220 A | 7/1983 | Hirosaki et al. |
| 4,508,937 A | 4/1985 | Burger et al. |
| 4,554,668 A | 11/1985 | Deman et al. |
| 4,613,990 A | 9/1986 | Halpern |
| 4,675,863 A | 6/1987 | Paneth et al. |
| 4,748,655 A | 5/1988 | Thrower et al. |
| 4,752,951 A | 6/1988 | Konneker |
| 4,783,780 A | 11/1988 | Alexis |
| 4,790,000 A | 12/1988 | Kinoshita |
| 4,797,948 A | 1/1989 | Milliorn et al. |
| 4,831,647 A | 5/1989 | D'Avello et al. |
| 4,876,738 A | 10/1989 | Selby |
| 4,905,302 A | 2/1990 | Childress et al. |
| 4,953,197 A | 8/1990 | Kaewell, Jr. et al. |
| 4,977,589 A | 12/1990 | Johnson et al. |
| 4,989,230 A | 1/1991 | Gillig et al. |
| 5,020,091 A | 5/1991 | Krolopp et al. |
| 5,127,042 A | 6/1992 | Gillig et al. |
| 5,127,661 A | 7/1992 | Franson et al. |
| 5,161,168 A | 11/1992 | Schilling |
| 5,191,593 A | 3/1993 | McDonald et al. |
| 5,193,101 A | 3/1993 | McDonald et al. |
| 5,197,092 A | 3/1993 | Bamburak |
| 5,210,771 A | 5/1993 | Schaeffer et al. |
| 5,210,784 A | 5/1993 | Wang et al. |
| 5,210,785 A | 5/1993 | Sato et al. |
| 5,210,786 A | 5/1993 | Itoh |
| 5,212,684 A | 5/1993 | MacNamee et al. |
| 5,224,120 A | 6/1993 | Schilling |
| 5,228,026 A | 7/1993 | Albrow et al. |
| 5,239,538 A | 8/1993 | Teel, Jr. et al. |
| 5,241,537 A | 8/1993 | Gulliford et al. |

| | | |
|---|---|---|
| 5,263,045 A | 11/1993 | Schilling |
| 5,287,544 A | 2/1994 | Menich et al. |
| 5,289,527 A | 2/1994 | Tiedemann, Jr. |
| 5,309,502 A | 5/1994 | Hirai |
| 5,335,357 A | 8/1994 | Fennell et al. |
| 5,353,331 A | 10/1994 | Emery et al. |
| 5,361,399 A | 11/1994 | Linquist et al. |
| 5,367,558 A | 11/1994 | Gillig et al. |
| 5,388,149 A | 2/1995 | Lynn et al. |
| 5,406,615 A | 4/1995 | Miller, II et al. |
| 5,418,838 A | 5/1995 | Havermans et al. |
| 5,418,839 A | 5/1995 | Knuth et al. |
| 5,425,030 A | 6/1995 | Comroe et al. |
| 5,428,668 A | 6/1995 | Dent et al. |
| 5,428,687 A | 6/1995 | Willcocks et al. |
| 5,438,608 A | 8/1995 | Kojima |
| 5,442,680 A | 8/1995 | Schellinger et al. |
| 5,463,674 A | 10/1995 | Gillig et al. |
| 5,469,115 A | 11/1995 | Peterzell et al. |
| 5,471,649 A | 11/1995 | Rees et al. |
| 5,497,503 A | 3/1996 | Rydberg et al. |
| 5,509,052 A | 4/1996 | Chia et al. |
| 5,513,176 A | 4/1996 | Dean et al. |
| 5,513,248 A | 4/1996 | Evans et al. |
| 5,519,884 A | 5/1996 | Duque-Anton et al. |
| 5,533,027 A | 7/1996 | Akerberg et al. |
| 5,533,029 A | 7/1996 | Gardner |
| 5,535,215 A | 7/1996 | Hieatt, III |
| 5,539,728 A | 7/1996 | Gaiani et al. |
| 5,548,586 A | 8/1996 | Kito et al. |
| 5,559,866 A | 9/1996 | O'Neill |
| 5,570,349 A | 10/1996 | Bustamante et al. |
| 5,570,367 A | 10/1996 | Ayanoglu et al. |
| 5,574,979 A | 11/1996 | West |
| 5,574,993 A | 11/1996 | Kobayashi et al. |
| 5,577,103 A | 11/1996 | Foti |
| 5,581,594 A | 12/1996 | McAfee |
| 5,581,597 A | 12/1996 | Dent et al. |
| 5,588,043 A | 12/1996 | Tiedemann, Jr. et al. |
| 5,592,480 A | 1/1997 | Carney et al. |
| 5,592,490 A | 1/1997 | Barratt et al. |
| 5,592,676 A | 1/1997 | Bonnafoux |
| 5,592,677 A | 1/1997 | Intrater et al. |
| 5,594,782 A | 1/1997 | Zicker et al. |
| 5,600,709 A | 2/1997 | Hoflinger |
| 5,610,972 A | 3/1997 | Emery et al. |
| 5,617,060 A | 4/1997 | Wilson et al. |
| 5,629,967 A | 5/1997 | Leksell et al. |
| 5,675,629 A | 10/1997 | Raffel et al. |
| 5,678,186 A | 10/1997 | Lee |
| 5,710,973 A | 1/1998 | Yamada et al. |
| 5,715,516 A | 2/1998 | Howard et al. |
| 5,722,070 A | 2/1998 | Alford |
| 5,745,850 A | 4/1998 | Aldermeshian et al. |
| 5,768,267 A | 6/1998 | Raith et al. |
| 5,812,955 A | 9/1998 | Dent et al. |
| 5,862,485 A | 1/1999 | Linneweh, Jr. et al. |
| 5,884,140 A | 3/1999 | Ishizaki et al. |
| 5,911,120 A | 6/1999 | Jarett et al. |
| 5,920,815 A | 7/1999 | Akhavan |
| 5,926,760 A | 7/1999 | Khan et al. |
| 5,933,774 A | 8/1999 | Bertocci |
| 5,956,638 A | 9/1999 | Chang et al. |
| 5,960,341 A | 9/1999 | LeBlanc et al. |
| 5,966,428 A | 10/1999 | Ortiz Perez et al. |
| 5,966,668 A | 10/1999 | Lindroth |
| 5,991,345 A | 11/1999 | Ramasastry |
| 5,995,839 A | 11/1999 | Coursey et al. |
| 6,014,376 A | 1/2000 | Abreu et al. |
| 6,021,123 A | 2/2000 | Mimura |
| 6,021,333 A | 2/2000 | Anderson et al. |
| 6,058,305 A | 5/2000 | Chavez, Jr. |
| 6,085,109 A | 7/2000 | Koga |
| 6,088,431 A | 7/2000 | LaDue |
| 6,088,598 A | 7/2000 | Marsolais |
| 6,112,098 A | 8/2000 | Flint et al. |
| 6,125,285 A | 9/2000 | Chavez, Jr. et al. |
| 6,128,485 A | 10/2000 | Mori et al. |
| 6,131,043 A | 10/2000 | Shimizu |
| 6,151,510 A | 11/2000 | Zicker |
| 6,167,278 A | 12/2000 | Nilssen |
| 2001/0046882 A1* | 11/2001 | Karimi et al. ............... 455/561 |
| 2003/0092450 A1* | 5/2003 | Juppi et al. ................ 455/456 |

FOREIGN PATENT DOCUMENTS

| | | |
|---|---|---|
| DE | 4236777 | 5/1994 |
| EP | 0544095 | 6/1993 |
| EP | 0649266 | 4/1995 |
| EP | 0661837 | 7/1995 |
| EP | 0668627 | 8/1995 |
| JP | 57041064 | 6/1982 |
| WO | WO 92/08324 | 5/1992 |
| WO | WO 94/03993 | 2/1994 |

OTHER PUBLICATIONS

TIA/EIA Interim Standard, 800MHz TDMA Cellular—Radio Interface—Mobile Station—Base Station Compatibility—Digital Control Channel, Telecommunications Industry Association, TIA/EIA/IS-136.1, Dec. 1994.

TIA/EIA Interim Standard 800MHz TDMA Cellular—Radio Interface—Mobile Station—Base Station Compatibility—Traffic Channels and FSK Control Channel, Telecommunications Industry Association, TIA/EIA/IS-136.2, Dec. 1994.

TIA/EIA Interim Standard, 800MHz TDMA Cellular—Radio Interface—Minimum Performance Standards for Mobile Stations, Telecommunications Industry Association TIA/EIA/IS-137, Dec. 1994.

TIA/EIA Interim Standard, 800MHz TDMA Cellular—Radio Interface—Minimum Performance Standards for Base Stations, Telecommunications Industry Association TIA/EIA/IS, 138, Dec. 1994.

TIA/EIA Interim Standard, 800MHz TDMA Cellular—Radio Interface—Mobile Station—Base Station Compatibility—Digital Control Channel, Telecommunications Industry Association TIA/EIA/IS-136.1-1 (Addendum No. 1), Oct. 1995.

TIA/EIA Interim Standard, TDMA Cellular/PCS—Radio Interface—Minimum Performance Standards for Mobile Stations, Telecommunications Industry Association TIA/EIA/IS-137-A (Revision), Jul. 1996.

TIA/EIA Interim Standard, TDMA Cellular/PCS—Radio Interface—Minimum Performance Standards for Base Stations, Telecommunications Industry Association TIA/EIA/IS-138-A (Revision), Jul. 1996.

PCT International Search Report, PCT/US96/14443, Sep. 6, 1996.

* cited by examiner

*Primary Examiner*—William D. Cumming
(74) *Attorney, Agent, or Firm*—Perkins Coie LLP

(57) ABSTRACT

A mobile station communicates with both a cellular network, by which it is assigned a mobile identification number, and to a cordless cellular base station utilizing the same cellular frequency range and communications protocol. The cordless cellular base station is preferably connected to a public switched telephone network and is assigned a landline number. The cordless cellular base station acts as a conduit between the mobile station and the public switched telephone network. When the mobile station comes within range of a cordless cellular base station, it deregisters automatically from the cellular network and register with the cordless cellular base station. Once the mobile station is communicating with the cordless cellular base station, the cordless cellular base station communicates with the cellular network to instruct the cellular network to route all calls for mobile identification number to the cordless cellular base station's landline number. In addition, all calls placed on the mobile station are sent through the cordless cellular base station to the public switched telephone network. When the mobile station severs contact with the cordless cellular base station, the mobile station registers with the regional cellular base station of the regional cellular network. The cordless cellular base station then sends a network forwarding cancellation message to the cellular network to cancel the forwarding of calls for the mobile station's identification number. Once the mobile station is registered with the regional cell, calls to the mobile stations identification number are directly routed by the cellular network to the mobile station.

20 Claims, 23 Drawing Sheets

|   | STATUS | MIN. |
|---|--------|------|
| 1 | A |   |
| 2 | S |   |
| 1 | S |   |
| 2 | A |   |
| 3 | S |   |
| 4 | D |   |
| 5 | D |   |
| 6 | D |   |
| 7 | D |   |
| 8 | D |   |

PRIMARY MS: rows 1–2 (114)
NON-PRIMARY MS: rows 1–8 (115)

FIG. 8

H:   Hybrid
VSE: VSELP Speech Encoder
VDE: VSELP Speech Decoder
DET: Voice Detector

CORDLESS CELLULAR SYSTEM

This application is a continuation of application Ser. No. 10/235,039 filed Sep. 4, 2002, now U.S. Pat. No. 6,611,692, which is a Divisional application of U.S. Ser. No. 09/497,082 filed Feb. 2, 2000 now abandoned, which is a Divisional of Ser. No. 08/838,664, filed Apr. 9, 1997 now abandoned, which is a Continuation of Ser. No. 08/525,473 filed Sep. 8, 1995, now U.S. Pat. No. 5,675,629.

FIELD OF THE INVENTION

The invention relates to a digital wireless communication system. In particular, the invention relates to cordless telephones and cellular networks.

BACKGROUND

A common type of wireless communication is the communication which occurs between a cordless telephone handset and its associated base unit within a limited distance range around the user's home or business. Cordless telephones typically operate over a radio frequency (RF) portion of the spectrum set aside for general public use. Also, the power of the cordless phone signal is lower than other communication signals, because the signal needs to only be transmitted between the cordless handset and the associated base unit within the home or business of the user. Therefore, there is no user license from the Federal Communications Commission (FCC) required to operate a cordless telephone. Ultimately the communication is carried from the associated base unit along a landline on the public telephone network to the connecting party; therefore the cost of the telephone call is regulated by the LEC which owns the public switched telephone network (PSTN).

Another method of wireless communication is a regional cellular communication network which is operated by a cellular operator to enable the transmission of voice and data from a mobile station to a cellular base station over a specific band of frequencies, e.g., 824–849 MHz and 869–894 MHz, under license by the FCC. The bands are generally broken up into transmission channels and reception channels which each employ different bands of frequencies in the cellular spectrum. Cellular transmissions from the base station to the mobile station occupies the spectrum between 824 and 849 MHz with each transmission channel occupying about 30 KHz. Cellular reception from the mobile stations to the base stations generally occupy the spectrum between 869 and 894 MHz with each reception channel occupying about 30 KHz. As is well known to those of ordinary skill in the art, each of the transmission and reception bands are divided between two cellular service providers in each market and are referred to as "A" and "B" bands. Thus, each provider operates four hundred and sixteen pairs of transmission and reception frequency channels on which to provide service. Twenty-one of the four hundred and sixteen frequency channels pairs are ordinarily used as control channels to send control signals from the base station to the mobile station, thus only three hundred and ninety-five channels are actually available to transmit calls between the cellular base station and mobile station. The cellular service provider enlists subscribers who are authorized to communicate via the regional cellular network. Each subscriber must purchase a mobile station or handset which is capable of communication with the regional cellular network. The handset, at the time of manufacture, is assigned an electronic serial number (ESN). The ESN is generally stored in the permanent memory, such as an EEPROM, in the handset. The subscriber registers the mobile station with the regional cellular network and the mobile station is assigned a mobile identification number (MIN) by which the mobile station can be accessed. As the price of mobile stations decreases and the cost of air time decreases, the number of users that subscribe to regional cellular networks is increasing.

Recently, handsets have been disclosed which are capable of switching between communication with a cellular network and with an RF cordless telephone unit. Once the handset is in the proximity of the cordless telephone unit, the telephone unit is capable of receiving calls from both the public switched telephone network (via the RF cordless telephone unit) and the regional cellular network. Since the cellular and RF cordless communication systems utilize different frequency bands for communication, a handset that can communicate with both cellular and RF cordless base stations requires some significant additional hardware and software. In practice, a handset that can communicate with both types of base stations requires one transceiver that can communicate with cordless frequencies and one transceiver that can communicate with cellular frequencies as well as separate interface hardware between each transceiver and the main handset controlling hardware. Further, the main handset controlling hardware must be able to recognize and communicate with the different communications protocols required to communicate with the RF cordless telephone base station and with the cellular networks. The additional hardware required to communicate with both base stations increases the size and the weight of the handset. Further, the additional hardware increases the cost of the handset in a highly price-competitive market.

SUMMARY

The preferred embodiment of the present invention comprises a cordless cellular base system. A cordless cellular base station is capable of communicating with a cellular network compatible mobile unit, also referred to as a mobile station herein. The cordless cellular base station, also referred to as a subregional base station, is preferably connected to a landline on a public switched telephone network and is assigned a landline number or phone number. The mobile station is registered with a cellular network and is assigned a mobile identification number. Advantageously, the mobile station is capable of communication with both a conventional regional cellular base station and to the cordless cellular base station utilizing the same cellular frequency range and communications protocol. When the mobile station is communicating with the cellular network, it is referred to as being in the regional cellular service mode. When the mobile station is communicating with the cordless cellular base station, it is referred to as being in cordless cellular telephone landline service mode.

The mobile station of the present invention advantageously communicates with the cordless cellular base station and with the regional cellular base stations of the cellular network utilizing the same frequency range and the same communications protocol. In a preferred embodiment, the communications protocol that is utilized is compliant with the IS-136, parts one and two, air interface standard which is hereby incorporated by reference in its entirety. The IS-136, parts one and two, standard is available from the Telecommunications Industry Association (TIA), Engineering Dept., 2001 Pennsylvania Avenue, N.W., Washington, D.C. 20006. This standard provides in part for TDMA (time division multiple access) digital communications and is well known to those of skill in the art. The IS-136 standard is designed to ensure compatibility between cellular mobile telecommunication systems so that a mobile station can obtain service in any cellular system manufactured in accordance with the standard. Since the mobile station communicates with the cordless cellular base station and with the regional cellular base stations of the cellular network utilizing the same frequency range and the same communications protocol, the mobile station may be manufactured using similar hardware, such as a digital transceiver, and similar software to communicate with both the cordless cellular base station and the cellular network. Therefore, the overall size and the weight of the mobile station is not increased compared to conventional cellular telephones which are compatible with the IS-136 standard. Further, by reducing the amount of additional hardware and additional software necessary, the cost of the mobile station of the preferred embodiment is not much higher than conventional IS-136 compliant mobile stations. The cordless cellular base station is able to communicate with the mobile station and act as a conduit between the mobile station and the public switched telephone network. Further, despite the fact the mobile station is IS-136 compliant and can communicate with both analog and digital regional cells, the mobile station preferably communicates with the cordless cellular base station utilizing a digital control channel and corresponding digital traffic channels. By utilizing a digital channels, rather than analog and digital channels for communication with the mobile station, the hardware and software required to operate the cordless cellular base station is further reduced and thus the manufacturing costs are reduced.

In one aspect of the present invention, in order to maintain a secure system, the cordless cellular base station must first register with the cellular network before its operation is enabled. In a preferred embodiment, the cordless cellular base station is not operational without the network authorization, as the cellular network provides the cordless cellular base station with certain operating parameters, such as a list of authorized frequencies for its operation. After the network authorization procedure is complete, the cordless cellular base station enables registration of mobile stations. In the preferred embodiment, once a mobile station receives registration privileges with a particular cordless cellular base station, the mobile station automatically registers with the cordless cellular base station when the mobile station comes into proximity with the cordless cellular base station. As the number of cordless cellular base station users increases it becomes more likely that at least some cordless cellular base stations will be operating in close proximity to one another. With base stations present in adjoining houses, for example, it is not desirable to enable automatic registration for all mobile station users that come into proximity with a cordless cellular base station, because it is possible for one neighbor to inadvertently automatically register with another neighbor's cellular base station. Advantageously, the automatic registration feature of the present invention allows the cordless cellular base station to restrict automatic registration to those users who have been previously pre-registered with a particular cordless cellular base station. By requiring preregistration, before automatic registration occurs, accidental automatic registration with a nearby cordless cellular base station is prevented while still providing the convenience of automatic registration for frequent users. In addition, the mobile station will not attempt to automatically register with a cordless cellular base station unless it has previously registered with that cordless cellular base station and knows on which channels to look for the cordless cellular base station.

In another aspect of the present invention, the cordless cellular base station maintains a cordless cellular base station registration list in a semipermanent portion of memory which stores the mobile system identification number of the mobile stations which have been previously been granted registration privileges with the cordless cellular base station. For each entry, the cordless cellular base station registration list stores a status record that indicates the state of the mobile station with respect to the cordless cellular base station and the mobile station identification number. Preferably, there are three states of a mobile station with respect to the cordless cellular base station which are referred to as the: "standby", "active" and "dormant" states. The dormant state indicates that the mobile station which has previously registered with the cordless cellular base station is not currently registered with the cordless cellular base station. The standby state indicates that the mobile station is currently registered with the cordless cellular base station and is not currently on a call, i.e., the mobile station is "standing by" waiting to receive or place a call through the cordless cellular base station. The active state indicates that the mobile station is registered with the cordless cellular base station and is currently on a call which is being controlled by the cordless cellular base station. In a preferred embodiment the status of up to ten mobile stations can be monitored by the cordless cellular base station.

In another aspect of the present invention, when a mobile station which is not presently involved in a call comes within range of a cordless cellular base station with which it has previously registered, in accordance with the preferred embodiment, it automatically switches from regional cellular service mode to cordless telephone landline service mode without user intervention. Once the mobile station has confirmed with the cordless cellular base station that the mobile station has switched to cordless landline service mode, the cordless cellular base station communicates with the cellular network to provide a location update message. If the mobile station has a call in progress, the mobile station waits for the call to be completed before it is switched to cordless telephone landline service mode and sends the call forwarding update message.

Once the cellular network receives the call forwarding update, the cellular network routes all calls to the mobile station's mobile identification number to the landline number associated with the cordless cellular base station. In addition, while the mobile station remains within range of the cordless cellular base station, all calls placed from the mobile station are sent through the cordless cellular base station to the associated landline. In the preferred embodiment there is no hand-off of telephone calls between the regional cellular network and cordless cellular base station environments. For example, if a call is initiated via the cordless cellular base station and the mobile station is moved to an area outside of the cordless cellular base stations range, the call is disconnected instead of being transferred to the cellular network. In an alternate embodiment, handoff of telephone calls between the regional cellular network and cordless cellular base station environments is enabled. For example, if a call is initiated via the cordless cellular base station and the mobile station moves to an area outside of the cordless cellular base station's range, the call is automatically transferred from the cordless cellular base station and its associated landline to the cellular network. The cellular network then routes the call through the cellular base station and a hand-off is performed to the user's mobile station as is performed in a conventional cellular system.

By communicating with the cellular network, the cordless cellular base station is advantageously able to inform the cellular network where to route telephone calls for the mobile station's identification number when the mobile station is registered with the cordless cellular base station ensuring that the mobile station user will always receive telephone calls for its mobile station identification number regardless of the mode of operation of the mobile station.

Typically, when the mobile station severs contact with the cordless cellular base station, the cordless cellular base station sends a network forwarding cancellation message to the cellular network to cancel the forwarding of calls for the mobile station identification number to the landline number associated with the cordless cellular base station. The cordless cellular base station is informed during an initial authorization message which types of registration/deregistration activities for which the network wants to be informed. Some examples of types of deregistration events for which the network may want to be contacted are: when the mobile station is turned off, i.e., a power down deregistration or due to a manual cancellation of the cordless service mode, i.e., forced deregistration. When the mobile station severs contact with the cordless cellular base station for reasons other than powering off, the mobile station typically registers with the local regional cellular base station of the regional cellular network. Once the mobile station is registered with the regional cell, calls to the users mobile identification number are directly routed by the cellular network to the mobile station.

In another aspect of the present invention, the cordless cellular base station can process up to two active mobile stations at the same time. When two mobile stations are listed as active, the cordless cellular base station bridges the audio signal for the two mobile stations together such that each of the mobile stations is acting like an extension on a normal landline. In a first embodiment, each mobile station receives a voice signal which is a summation of the voice signals from the caller on the landline and from the other mobile station. In a second embodiment, the cordless cellular base station compares a voice signal from one mobile station with the voice signal from the caller on the land line and whichever is loudest is sent to the other mobile station. The voice signals from each of the mobile stations are summed together and sent to the landline. Thus, the landline caller hears a summation of both mobile stations speaking while each mobile station only hears whichever signal is louder, the other mobile station or the caller on the landline. In a third embodiment, the cordless cellular base station uses a detector to determine which of the signals from the mobile stations is the loudest and sends the loudest received signal to the caller on the landline. The users of the mobile stations are able to listen to the voice of the party on the landline; however, they are unable to hear what is being said by the user of the other mobile station.

The cordless cellular base station is designed to operate in the residential home or small office environment. This active RF environment can be potentially very noisy because there may be no dedicated frequency spectrum allocated for the cordless cellular base station operation coupled with the fact that the frequency usage is not explicitly coordinated with the regional cellular network planning. The cordless cellular base station has to co-exist in the same cellular band used by the regional cellular network and views the regional cellular network as a source of background interference. The cordless cellular base station attempts to avoid the potential interference by the cellular network by choosing frequencies which, as far as the cordless cellular base station can determine, are not being used by nearby regional cells or by other nearby cordless cellular base stations.

In another aspect of the present invention, the cordless cellular base station implements an avoidance mechanism which scans the frequencies in the cellular band and determines the best and next-best cellular frequencies for communication with the cellular network at all times. The cordless cellular base station periodically takes received signal strength (RSS) measurements for each of the authorized frequencies of the cordless cellular base station and word error rate (WER) measurements on the current operational frequency when a call is in progress, which are measurements known to those of skill in the art. The cordless cellular base station translates the RSS measurements into a score increment or decrement value based upon a stored score increment table. After each measurement, the current score increment/decrement value adjusts the previous score value. The score for a frequency is a measure of the amount of noise plus interference at a given frequency, thus the score itself is a measure of the potential of interference if this channel were selected rather than the actual interference occurring on the channel. Therefore, throughout this document any discussion of the measurement of the interference on a channel should be interpreted as the measurement of the potential interference on this channel, if the channel was selected for operation. Thus, the interference score represents the potential interference that would be encountered on that frequency, with a higher score representing more interference, and a lower score representing lower interference. In the absence of interference, the score value will gradually decay towards zero as more measurements are made.

The cordless cellular base station uses the interference score measurements in making the choice of an operating frequency. By selecting a frequency from those with the lowest interference scores, and by using appropriate channel abandonment thresholds described below, the cordless cellular base station attempts to avoid transmitting on any frequency which is already in use nearby the public or private cellular network or by other cordless cellular base stations within range. Preferably, the cordless cellular base station selects for its initial operational frequency, the frequency with the lowest interference score. The cordless cellular base station 10 randomly selects for its backup frequencies, a specified number of downlink frequencies whose scores are below a high threshold value (Ht). Depending upon whether a call is in progress or whether a primary mobile station is registered, if the interference score of the current operational frequency rises above a first low threshold (Lt) or above the high threshold (Ht), the cordless cellular base station 10 automatically switches its operational frequency to the first backup frequency as described in more detail below. The cordless cellular base station 10 also removes backup frequencies from the back-up frequency list if the interference score for that backup frequency rises above the high threshold (Ht).

In another aspect of the present invention, the cordless cellular base station needs to locate a specified number of frequencies having score values below the high threshold value (Ht). If a sufficient number of frequencies are not available, the cordless cellular base station notifies the cellular network of the problem. In one embodiment, when the cordless cellular base station notifies the cellular network of the problem, the cellular network will provide the cordless cellular base station with a list of alternative authorized frequencies. In another embodiment, the cellular network will temporarily lower the specified number of frequencies having score values below the high threshold value (Ht) that are needed, thus enabling the cordless cellular base station to continue to operate. In still another embodiment, if an insufficient number of frequencies are available, the cordless cellular base station may continue to take frequency measurements and will cease transmission until a sufficient number of clear frequencies are available.

The cellular network initially provides the cordless cellular base station in an authorization message a list of operational frequencies in the cellular spectrum in which to operate. In one embodiment, the list includes all of the possible voice channels in the cellular spectrum. In another embodiment, the list includes a small portion of the entire cellular spectrum.

In another aspect of the present invention, the cordless cellular base station periodically initiates a phone call to a cordless cellular base station visitor location register (CCBS VLR). The CCBS VLR is a data base which is used to keep track of the location of visiting mobile stations which have registered with a cordless cellular base station. In one embodiment, the CCBS VLR contains additional storage space to receive data regarding interference scores for the cellular frequencies which are reported by the cordless cellular base stations. After receiving the initial call from the cordless cellular base station, the cellular network sends a message to the cordless cellular base station indicating that it is ready to receive the interference score data. Next, the cordless cellular base station downloads all of the interference scores for all of its authorized frequencies to the CCBS VLR. The CCBS VLR forwards the interference score information to a data collection node in the cellular network. The cellular network uses these interference scores to assist in assigning or re-assigning the operational frequencies for the regional cells.

In another aspect of the present invention, during any contact between the cellular network and the cordless cellular base station, such as during a location update or a network cancellation procedure, the cellular network has the ability to update the operational parameters in the cordless cellular base station by sending the cordless cellular base station a new authorization message. The new authorization message may be sent in response to any request sent to the cellular network. The update is useful for revising the cordless cellular base station operation to accommodate for changes in the service in the area around the cordless cellular base station and to update the cordless cellular base station regarding changed features of the cellular network. For example, the cellular network may temporarily alter the telephone number(s) that the cordless cellular base station calls to access the location update/call forwarding feature or the cellular network may revise the allowable frequencies of the cordless cellular base station.

In another aspect of the present invention, in order to enable the cellular network to periodically change the operational parameters of the cordless cellular base station, the cordless cellular base station preferably includes a preset timer which counts down the amount of time since the cordless cellular base station last contacted the cellular network. When the timer expires, the cordless cellular base station automatically calls the cellular network. In the preferred embodiment, the timer is set for thirty days, thus if the cordless cellular base station has not contacted the cellular network within the last thirty days, for example, to request a location update for a registered mobile station, the cordless cellular base station automatically contacts the cellular network. In response, the cellular network determines if it is necessary to send the cordless cellular base station a new authorization message. If a new authorization message is required, the cellular network sends the message to the cordless cellular base station. If a new authorization message is not required, the cellular network sends a return result message to the cordless cellular base station. Upon receiving either message from the cellular network, the timer in the cordless cellular base station is reset for thirty days. This feature is useful in preventing fraudulent usage of a cordless cellular base station. For example, if the owner did not pay his/her bill for the service and also stopped using his or her phone away from the cordless cellular base station, it would be difficult for the cellular network to cancel the operation of the cordless cellular base station, because the cordless cellular base station would never contact the cellular network. With the automatic contact feature, the cordless cellular base station would automatically contact the cellular network within the time specified on the preset timer. The network would, if necessary, send a new authorization message removing all of the operating frequencies from the cordless cellular base station which belonged to the non-paying customer, thus making the cordless cellular base station inoperable.

In another aspect of the present invention, when a call is initiated by a mobile station that is registered with the cordless cellular base station, the cordless cellular base station initially checks to see if the phone number matches the MIN for one of the other mobile stations which is listed in standby mode in the registration table on the cordless cellular base station. If the phone number matches a MIN for the one of the mobile stations listed in standby mode, the cordless cellular base station pages that mobile station and initiates an intercom conversation between the two mobile stations. The intercom feature is described in more detail below. The intercom conversation does not utilize the landline, so the telephone extensions connected directly to the landline can initiate and receive calls over the landline.

In another aspect of the present invention, when a user wants to use a mobile station which was not previously registered with the cordless cellular base station, the user presses the initial registration button on the cordless cellular base station which initiates an initial registration procedure. The user of the mobile station may then depress a test registration function key on the mobile station which causes the mobile station to send out a test registration message to the cordless cellular base station. The test registration message is specified by the IS-136 standard. The cordless cellular base station checks to see if the test registration message is received from a mobile station within a specified time period, preferably thirty seconds. If a test registration message is received, the cordless cellular base station determines if the registration list is full. If there is no room in the registration list for an additional mobile station, the cordless cellular base station bumps off a dormant non-primary mobile station from the list. If there are no non-primary mobile stations which are dormant, the cordless cellular base station sends a negative test registration response to the mobile station and the initial registration attempt is terminated. If there is room in the registration list for an additional mobile station, the cordless cellular base station sends a positive test registration response message to the mobile station. Upon receiving a positive test registration response, the mobile station will display a set of alpha characters transmitted by the cordless cellular base station in the positive test registration response message which are then stored by the mobile station. In the preferred embodiment, the alpha characters which are displayed form the word "Cordless". At this time, the mobile station may decide to attempt cordless registration with the cordless cellular base station. If the user wishes to attempt the registration, the mobile station sends a registration message to the cordless cellular base station. If a registration is not desired, no message is sent to the cordless cellular base station. Once the cordless cellular base station receives the registration message, the cordless cellular base station completes the registration procedure and sends a registration accept message to the mobile station. In subsequent automatic registration attempts, once the mobile station recognizes the Residential System ID (RSID) of the cordless cellular base station, the mobile station will display the stored alpha characters, such as, "Cordless" to indicate that the mobile station has automatically registered with the cordless cellular base station.

In another aspect of the present invention, the cordless cellular base station advantageously utilizes two separate antennas—a transmit (Tx) antenna and receive (Rx) antenna. Preferably, the transmit and receive antennas are simple antennas, since the coverage area for the cordless cellular base station is small. In a preferred embodiment, the transmit antenna and receive antenna are physically separated on the cordless cellular base station. Further, their signals are transmitted to the cellular transceiver along separate paths to eliminate the need for a duplexer, thereby simplifying the design and reducing manufacturing costs.

Advantageously, in another aspect of the present invention, a single receiver is used by the cordless cellular base station to both receive the mobile station transmissions and to take noise measurements which saves in the cost of the cordless cellular base station and reduces the size of the cordless cellular base station. In order to accurately receive the signals from the mobile station, the sensitivity of the receiver on the cordless cellular base station can be significantly less than the sensitivity to measure the noise in the surrounding environment. Advantageously, when the receiver is waiting to receive a mobile station transmission, the sensitivity of the receiver is lowered to enable it to receive higher powered transmission. When the receiver is taking an interference measurement, the sensitivity of the receiver is increased to enable it to receive lower power transmissions. By changing the sensitivity of the receiver for normal reception and for interference measurements, the cordless cellular base station can advantageously use the same receiver for both tasks.

BRIEF DESCRIPTION OF THE DRAWINGS

FIG. 8 is a schematic diagram of the registration list which is maintained by the cordless cellular base station.

DETAILED DESCRIPTION OF THE PREFERRED EMBODIMENTS

General Description of System Operation

Figure 1:
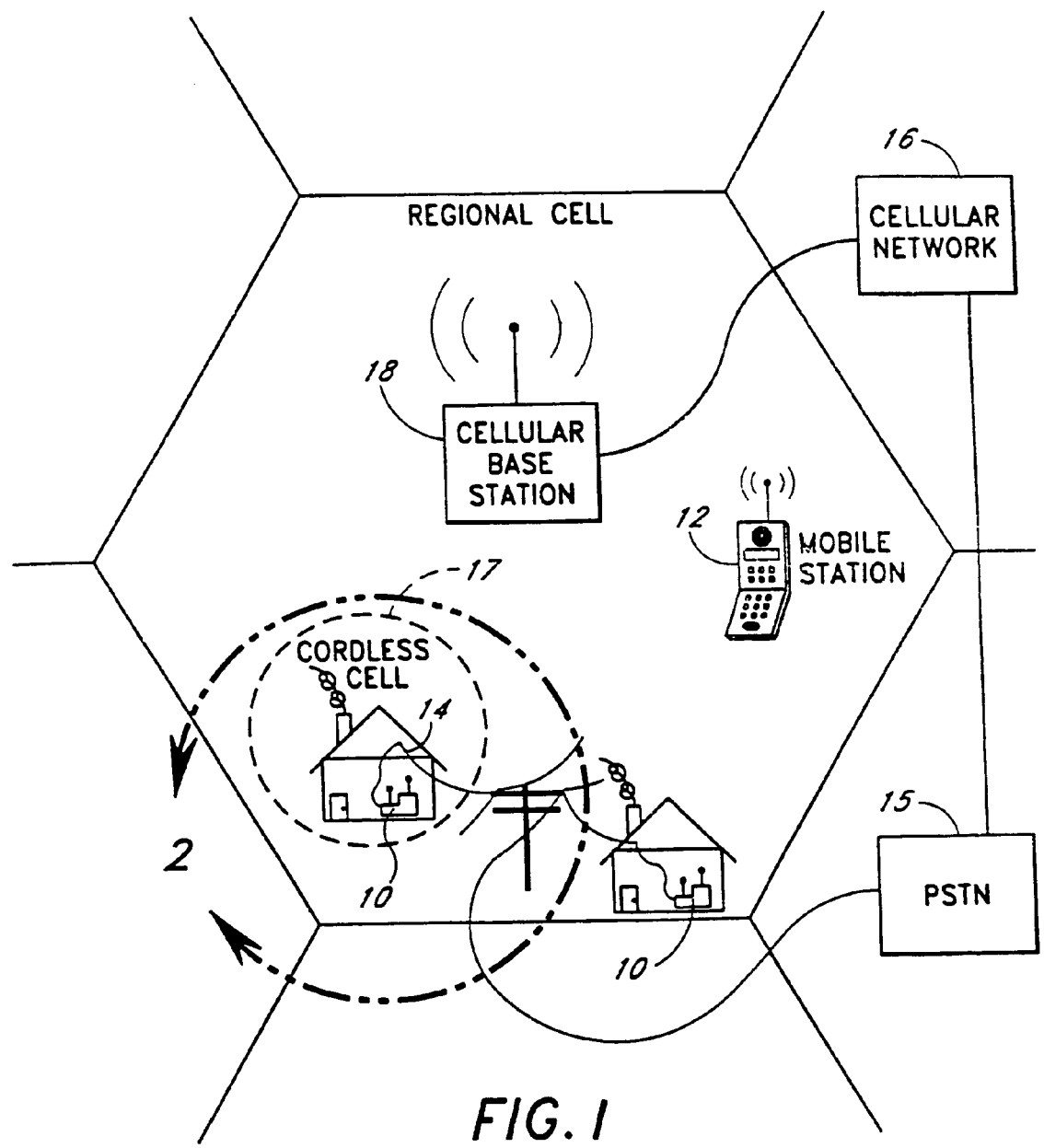
FIG. 1 is a schematic block diagram of a cordless cellular system of the preferred embodiment in communication with a cellular network and a public switched telephone network and shown in use with a cellular network compatible mobile unit.
Figure 2:
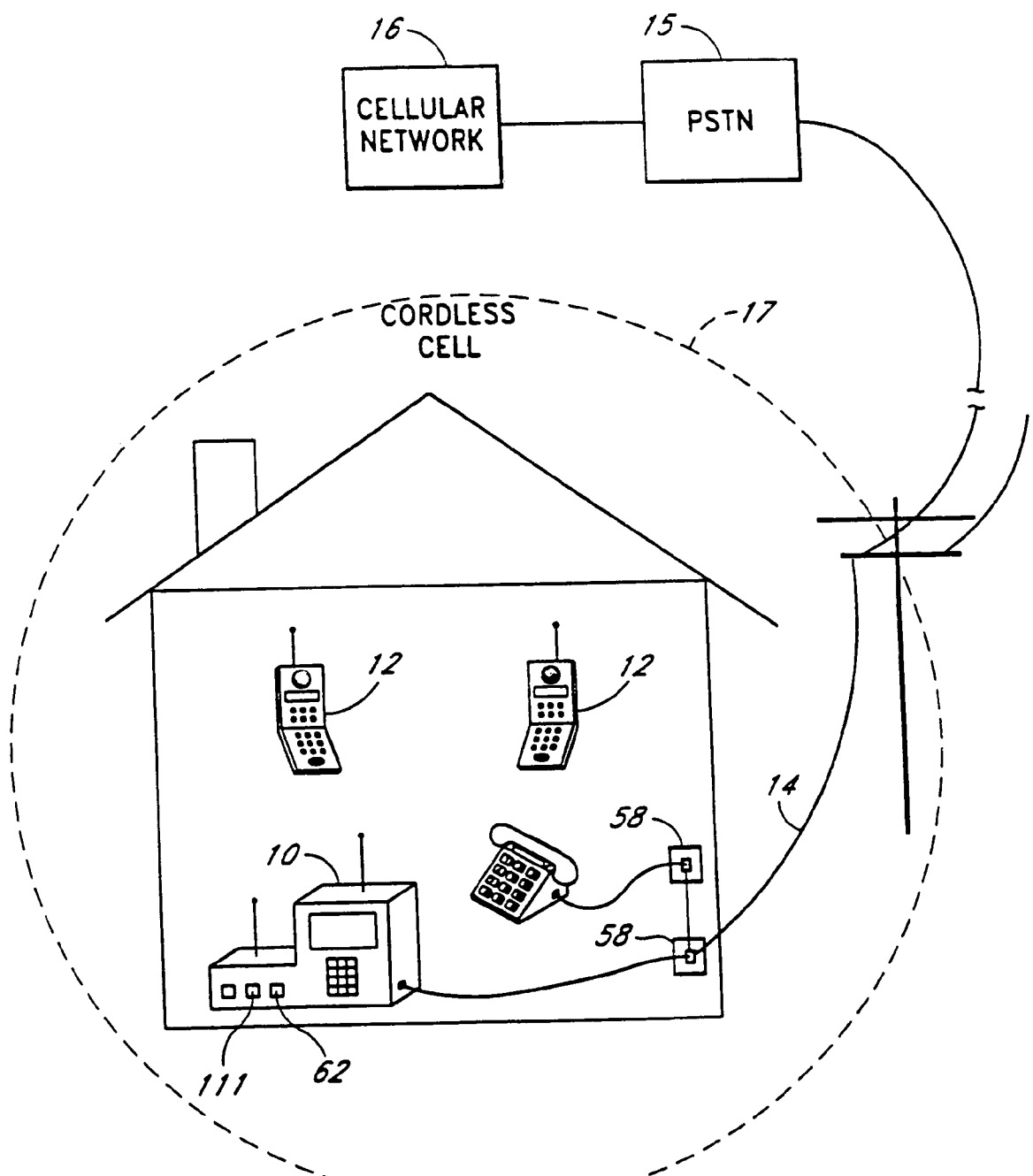
FIG. 2 is a partial schematic block diagram of a cordless cellular system of the preferred embodiment in communication with a plurality of cellular network compatible mobile units and a public switched telephone network.

The preferred embodiment of the wireless communication system of the present invention, as illustrated in FIGS. 1 and 2, comprises a cordless cellular base station 10. The cordless cellular base station is capable of communicating with a cellular network compatible mobile station 12. The cordless cellular base station 10, algor referred to as a limited or selective access base station, is connected to a landline 14 on a public switched telephone network (PSTN) 15 and is assigned a landline identification number (LLN) or telephone number. Further, the cordless cellular base station 10 is assigned an electronic serial number at the time of manufacture for identification purposes. The electronic serial number is generally stored in permanent memory in the cordless cellular base station so the serial number cannot be tampered with by unauthorized personnel. The mobile station 12 is registered with a cellular network 16 and is assigned a mobile station identification number (MIN), which is the telephone number of the mobile station. Further, the mobile station, at the time of manufacture, is assigned an electronic serial number (ESN). The ESN is generally stored in the permanent memory, in the mobile station. As is known to those of skill in the art, the cellular network 16 is connected to the public switched telephone network to route calls to/from callers on the cellular network 16 from/to callers on the public switched telephone network (PSTN) 15.

The mobile stations 12 are capable of communicating with both cellular base stations 18 on the cellular network 16 and with cordless cellular base stations 10. When a mobile station 12 is communicating with the cellular network 16, it is referred to as being in regional cellular service mode. When a mobile station 12 is communicating with the cordless cellular base station 10, it is referred to as being in cordless telephone landline service mode.

When a mobile station 12 comes within range of a cordless cellular base station 10 with which it has previously registered, as described in more detail below and in accordance with the preferred embodiment, the mobile station 12 automatically switches from the regional cellular service mode to the cordless telephone landline service mode without user intervention. Once the mobile station 12 has confirmed with the cordless cellular base station 10 that the mobile station 12 has switched to cordless landline service mode, the cordless cellular base station 10 communicates with the cellular network 16 to provide a call forwarding update message. The call forwarding update message requests that the cellular network 16 route all calls for the mobile station 12 to the landline number associated with the cordless cellular base station 10. In addition, while the mobile station 12 remains within range of the cordless cellular base station 10, all calls placed on the mobile station 12 are sent through the cordless cellular base station 10 to the associated landline 14 and out onto the PSTN 15. Preferably, there is no handoff of telephone calls between the regional cellular network 16 and cordless cellular base station 10 environments. For example, if a call is initiated via the cordless cellular base station 10 and the mobile station 12 moves to an area outside of the range of the cordless cellular base station's cell 17, the call is disconnected instead of being transferred to the cellular network 16. In an alternate embodiment, handoff of telephone calls between the regional cellular network 16 and cordless cellular base station 10 environments is enabled. For example, if a call is initiated via the cordless cellular base station 10 and the mobile station 12 moves to an area outside of the range of the cordless cellular base station's cell 17, the call is automatically switched through the cordless cellular base station 10 and its associated landline 14 to the cellular network 16. The cellular network 16 then routes the call through the cellular base station 10 to the user's mobile station 12 in a manner similar to the handoff procedure between adjacent cells in a conventional cellular system.

Typically, when the mobile station 12 severs contact with the cordless cellular base station 10, the cordless cellular base station 10 sends a network forwarding cancellation message to the cellular network 16 to cancel the forwarding of calls for the mobile station identification number to the landline number associated with the cordless cellular base station 10. The cordless cellular base station 10 is informed during the initial authorization message which type of registration/deregistration activities for which the network 16 wants to be informed. Some examples of types of deregistration events for which the network 16 may want to be contacted are: when the mobile station 12 is turned off, i.e., a power down deregistration or due to a manual cancellation of the cordless service mode, i.e., forced deregistration. When the mobile station 12 severs contact with the cordless cellular base station 10 for reasons other than powering off, the mobile station 12 may register with the local regional cellular base station of the regional cellular network 16. Once the mobile station 12 is registered with the regional cell, calls to the users mobile identification number are directly routed by the cellular network 16 to the mobile station 12.

Cordless Cellular Base Station

Cordless Cellular Base Station (CCBS) Hardware

The cordless cellular base station 10 communicates over the land line 14 and with the mobile station 12 using a digital cellular transceiver. The cordless cellular base station uses time division multiple access (TDMA) communication to communicate with the mobile station 12.

Figure 3:
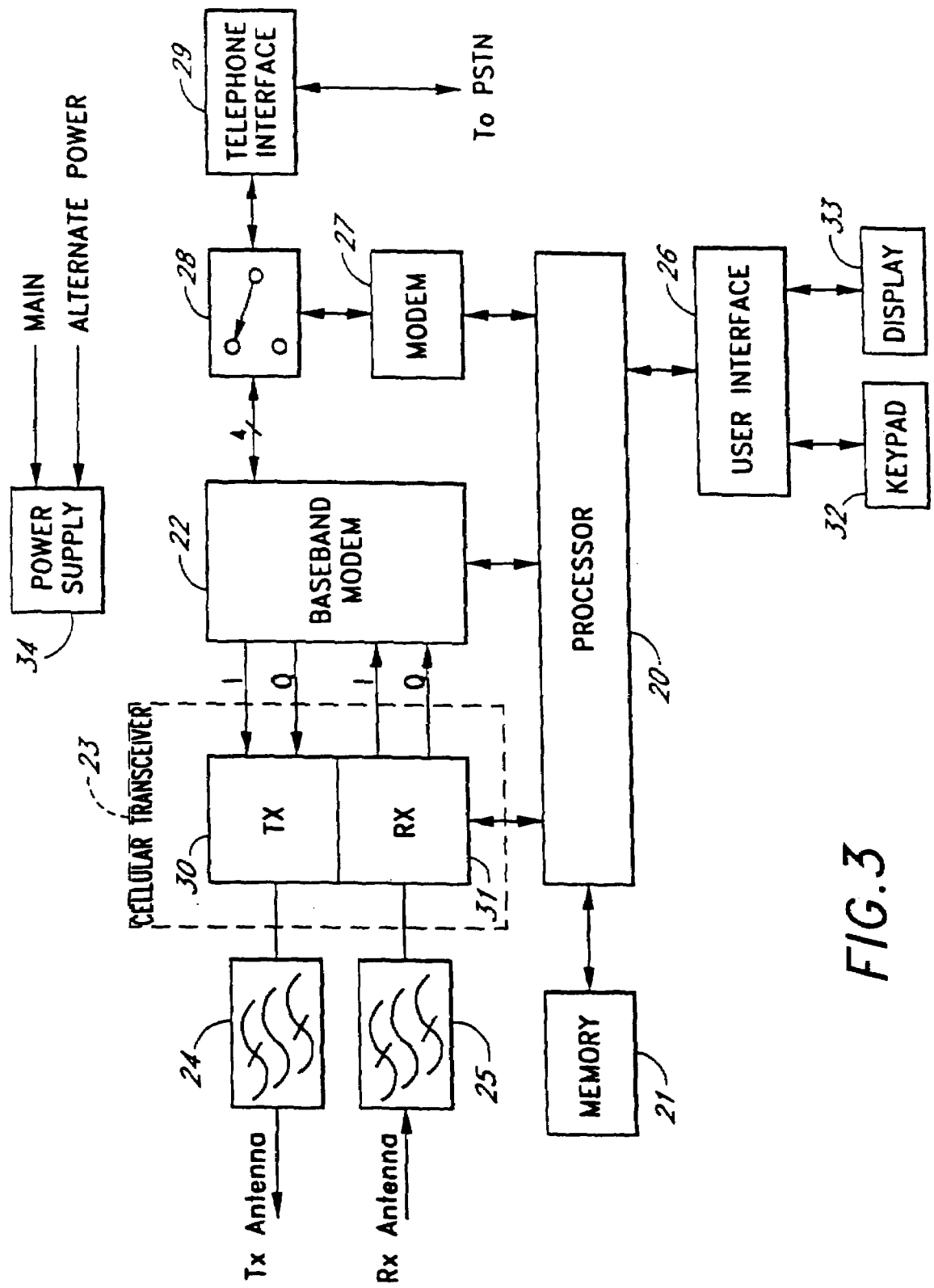
FIG. 3 is a block diagram of the cordless cellular base station hardware of the preferred embodiment.

In a preferred embodiment, the hardware of the cordless cellular base station 10 is very similar to the hardware used for a mobile station, however the functionality of the cordless cellular base station 16 is similar to a base station for a regional cell. The most significant differences between the cordless cellular base station and a typical base station are that the cordless cellular base station preferably has only one transceiver (permitting the use of only one set of transmit and receive frequency channel at one time) and that it supports only digital traffic. These differences permit the cordless cellular base station to be configured in a reasonable size for home use. As illustrated in FIG. 3, the CCBS comprises a microprocessor or a microcontroller 20, an associated memory storage area 21, a baseband modem 22, a cellular transceiver 23, a transit (Tx) antenna 24, a receive (Rx) antenna 25, user interface hardware 26, a modem 27, a switch 28 and standard telephone interface hardware 29. The processor 20 is in communication with the memory 21, the user interface 26, the modem 27, the baseband modem 22, and the cellular transceiver 23 in a well known way. The processor 20 controls the operation of the radio portion of the cordless cellular base station hardware, i.e., the operation of the baseband modem 22 and cellular transceiver 23. The processor 20 also controls the operation of the call processing tasks and the administrative tasks related to communication with the cellular network 16. Finally, the processor 20 controls the user interface 26. Preferably, the digital cellular transceiver 23 and processor 20 together communicate with the mobile station utilizing the IS-136 standard air interface communications protocol. The associated memory storage area 21 comprises both permanent and temporary memory storage capabilities.

The baseband modem 22 is preferably implemented using a digital signal processor (DSP). Preferably, the baseband modem 22 used in the cordless cellular base station 10 provides the same type of function as is used in local cellular base stations 18. The baseband modem 22 is used to implement the time division multiple access (TDMA) protocol in accordance with the IS-136 standard. Further, the baseband modem 22 performs the coding of the voice signals which digitally compresses and encodes the analog voice messages to/from the landline from/to the mobile station for faster transmission across the cellular channel, as known to those of skill in the art. In the preferred embodiment, VSELP coding is used; however, other compressing and coding schemes known to those of skill in the art, such as the International Telecommunications Union (ITU) compression and coding schemes, may be utilized. Finally, the baseband modem 22 performs the signal processing functions associated with voice detection to differentiate between noise and voice signals and echo cancellation to alleviate echoes picked up by the microphone in the mobile stations 12 which are common signal processing functions performed by base stations.

The cellular transceiver 23 comprises a transmitter (Tx) 30 and a receiver (Rx) 31. In a preferred embodiment, the cellular transceiver 23 is a digital transceiver. In a more preferred embodiment, the digital cellular transceiver 23 is a time division multiple access (TDMA) transceiver. Preferably, the transmitter 30 is the similar to the transmitter that is used in the mobile station 12. Preferably, the functionality of the transmitter is compliant with the IS-138 minimum performance requirements for a digital base station standard except for the exceptions listed below. The IS-138 standard is well known to those of skill in the art and is hereby incorporated by reference in its entirety. The IS-138 standard can be obtained through the Telecommunications Industry Association (TIA), Engineering Department, 2001 Pennsylvania Avenue, N.W., Washington, D.C. 20006. The first exception is that the transmitter of the cordless cellular base station emits much less power than a standard cellular base station, since the output power of the cordless cellular base station 10 is designed to communicate only with mobile stations 12 in a small surrounding area. Preferably, the transmitter 30 transmits at an output power of 6.3 mW. In another embodiment, the transmitter 30 transmits at an output power of approximately 10 mW. Additional exceptions for the transceiver to the IS-138 standard are that the frequency tolerance of the cordless cellular base station is 1.0 parts per million (ppm) and that time slot 4 is usually silent except for the transmission of the synch word as described in more detail below. The receiver 31 is similar to the receivers that are used in a standard cellular telephone, in that the receiver 31 of the cordless cellular base station 10 is able to receive at a fairly high sensitivity in the mobile receive band in order to be able to search for other nearby base station signals. Advantageously, a single receiver is used to both receive the mobile station transmissions and to take noise measurements which saves in the cost of the cordless cellular base station and reduces the size of the cordless cellular base station. In the preferred embodiment, the dynamic range of the receiver is approximately 70 dB, that is, the receiver can receive signals which are within a 70 dB range. In order to accurately receive the signals from the mobile station 12, the sensitivity of the receiver 31 on the cordless cellular base station 10 must be significantly less than the sensitivity to measure the noise in the surrounding environment. This is because the mobile station is expected to be used very close to the base station. Thus, when the receiver 31 is waiting to receive a mobile station transmission, the sensitivity of the receiver is less to enable it to receive higher powered transmissions. In the preferred embodiment, the 70 dB dynamic range of the receiver is scaled to receive transmissions from the mobile station 12 in the −20 dBm to −90 dBm range. When the receiver 31 is waiting to take an interference measurement, the sensitivity of the receiver 31 is increased to enable it to receive lower power transmissions. In the preferred embodiment, the 70 dB dynamic range of the receiver 31 is scaled to receive transmissions in the −46 dBm to −116 dBm range. In an alternate embodiment, the CCBS uses a non-linear front end receiver to provide increased dynamic range. As will be recognized by those of skill in the art, the fact that the CCBS does not require an equalizer enables the non-linear front end receiver to be easily substituted for the preferred receiver described above.

By utilizing only a digital transceiver 23 to communicate with the mobile station 12, the hardware and software of the cordless cellular base station 10 is less complicated and therefore, the cost to manufacture the cordless cellular base station 10 is reduced. The IS-136 standard calls for base station and mobile stations that operate in TDMA digital mode on the digital channels and in an analog mode on analog channels. While it is preferred to provide cordless cellular base station that operates only in a digital mode on the digital channels, it is contemplated that a cordless cellular base station could be provided such that it operates in both analog and digital modes.

The transmit (Tx) antenna 24 and receive (Rx) antenna 25 are simple antennas, since the coverage area for the cordless cellular base station 10 is small. In a preferred embodiment, the transmit antenna 24 and receive antenna 25 are separate antennas which are physically separated on the cordless cellular base station 10. Further, their signals are transmitted to the transceiver 23 along separate paths to eliminate the need for a duplexer, thereby simplifying the design and reducing manufacturing costs. However, it is contemplated that in some cases a common antenna for both transmission and receive functions may be advantageous and in the common antenna embodiment a duplexer is added to the cordless cellular base station hardware. Duplexers are well known devices that permit signals of different frequencies to be sent and received at the same time over the same antenna. In one embodiment, the transmit and receive antennas are internal antennas that do not extend outside of the cordless cellular base station.

The user interface hardware 26 is capable of providing an interface between a keypad 32 and a display 33. In a preferred embodiment, the keypad 32 includes the standard telephone twelve-key keypad. In other embodiments, the keypad 32 may include additional function keys. The display 33 is preferably an LCD display capable of displaying a variety of types of information to the user. The display 33 in a simpler embodiment may include a plurality of seven-segment displays or one or more simple LEDs. The standard telephone interface hardware 29 is utilized to communicate with the landline 14 and the PSTN 15 utilizing control signals and a communications protocol which are commonly known in the art. Preferably, the standard telephone interface hardware 29 includes a standard four-wire-to-two wire hybrid device to convert the signals on four wires from the cordless cellular base station hardware to the two wire standard of landline communication. In addition, the telephone interface hardware 29 provides ring detection and the closing of a subscriber loop under command of the controller 20. In a preferred embodiment, the cordless cellular base station 10 appears to the PSTN 15 as if it were a standard 2500 series telephone. Thus, for example, the base station 10 advantageously supports both pulse and DTMF dialing. The cordless cellular base station 10 also includes a standard data modem 27 for use in transmitting data over an ordinary telephone line. This permits a modem link to be set up between the cordless cellular base station 10 and another system using its associated landline 14.

Finally, the cordless cellular base station hardware includes a power supply 34. The power supply 34 comprises the circuits to define and regulate voltages supplied to the above-referenced hardware elements of the cordless cellular base station 10. At least one connection is made to obtain power from a main source, such as a wall socket in a home. The power supply 34 may also include an alternate connection to which a battery may be connected and charged.

Cordless Cellular Base Station Operation

Referring back to FIGS. 1 and 2, the cordless cellular base station 10 supports the following functions, which are described in more detail hereafter. A network authorization procedure initializes the communication between the cordless cellular base station 10 and the cellular network 16. After the network authorization procedure is complete, the cordless cellular base station 10 enables registration of mobile stations 12 for use with the cordless cellular base station 10. Registration of a mobile station 12 with the cordless cellular base station 10, as described in more detail below, enables the mobile station 12 to receive calls addressed to its mobile station identification number at the landline number associated with the cordless cellular base station 10. The cordless cellular base station 10 maintains a list of the mobile stations 12 most recently granted registration privileges with the cordless cellular base station 10.

In the preferred embodiment, while the mobile station 12 is listed on the registration list of a particular cordless cellular base station 10, the mobile station 12 automatically registers with the cordless cellular base station 10 when the mobile station 12 comes into proximity with the cordless cellular base station 10. This automatic registration of the mobile station 12 with the cordless cellular base station 10 occurs because the mobile station 12 stores information about the regional cellular network service 16 in the vicinity of the cordless cellular base station as described in more detail below. When the mobile station 12 recognizes that it is located in the portion of the regional cellular network 16 which is near the cordless cellular base station 10 that it has recently registered with, the mobile station begins to search for the cordless cellular base station 10. The cordless cellular base station 10 is always transmitting a digital control channel signal (DCCH), which is well known to those of skill in the art, for the mobile station 12 to locate. Once the mobile station 12 finds the cordless cellular base station 10, an automatic registration procedure, which is described in more detail below, is invoked which enables the mobile station 12 to receive calls directed to its mobile station identification number at the landline number associated with the cordless cellular base station 10.

The cordless cellular base station 10 is advantageously able to support the registration of up to ten mobile stations 12 at a given time, i.e., up to ten mobile stations 12 may be communicating with the cordless cellular base station 10 to have the regional cellular network 16 forward calls for their respective mobile stations 12 to the landline number associated with the cordless cellular base station 10. If a mobile station 12 is registered with the cordless cellular base station 10 and is not on a call, the mobile station 12 is considered to be in a "standby" state, that is, it is standing by ready to transmit or receive a call. When a call is received on the landline associated with the cordless cellular base station 10, the cordless cellular base station 10 pages all of the registered mobile stations 12, using the paging processes known to those of skill in the art, which is the same as a cellular base station 18 paging a mobile station 12, and all of the mobile stations 12 will "ring" indicating an incoming call. To answer the incoming call, any one of the mobile station users depresses the send key on the mobile station handset 12 and will be connected through the cordless cellular base station 10 to accept the call. When the mobile station 12 accepts a call by pressing the send key or transmits a call, the mobile station 12 is considered to be in an "active" state, that is, it is actively processing a call. The cordless cellular base station of the preferred embodiment can support two "active" mobile stations, that is, up to two mobile stations can communicate with each other or with a caller on the landline through the cordless cellular base station 10. Thus, in the preferred embodiment, the first two mobile stations to answer a call will be connected to the call. The remaining mobile stations are locked out and any attempt by any of the mobile stations to answer the call will result in an error indication by the phone to the user. In order to accept more "active" mobile stations 12, additional transceivers, call processing hardware and software can be added to the cordless cellular base station 10, as known to those of skill in the art.

Figure 4:
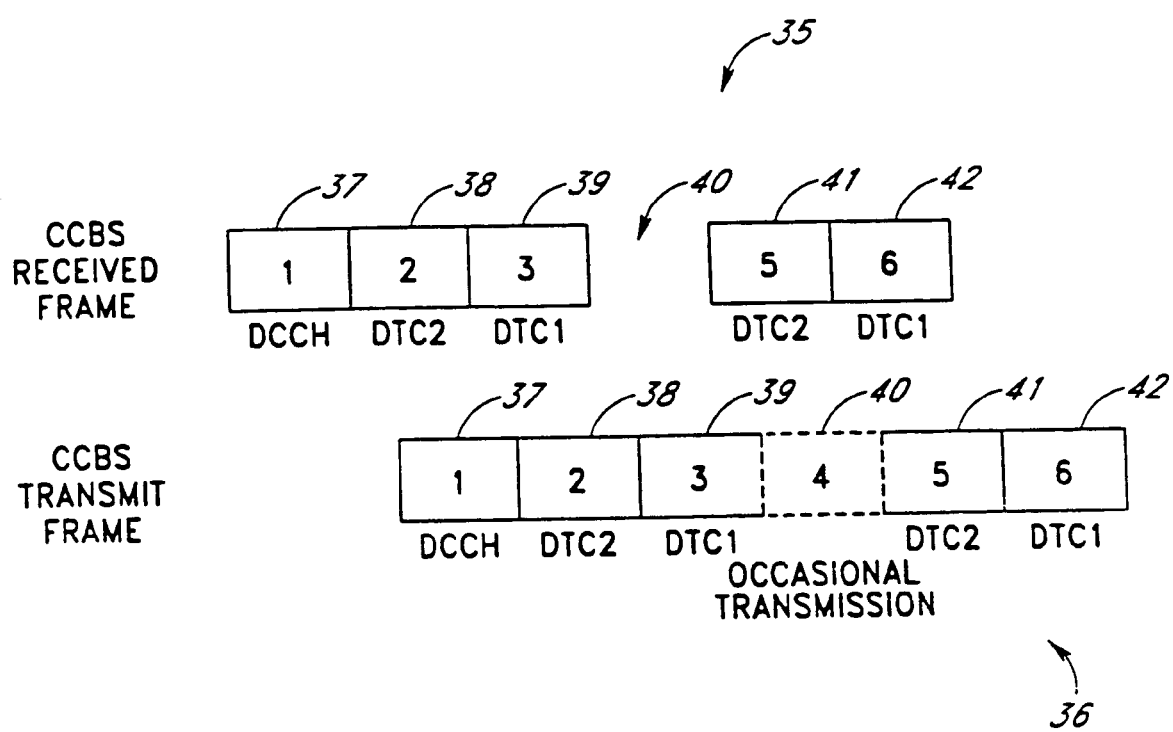
FIG. 4 is a schematic diagram of the TDMA time slot usage for a cordless cellular base station receive frame and for a cordless cellular base station transmit frame.

The cordless cellular base station 10 can support two mobile stations 12 because of the manner that the cordless cellular base station 10 uses the time slots of a single TDMA frame to transmit and receive information. In accordance with the IS-136 standard, the TDMA signal has six time slots, referred to as time slot 1 to time slot 6 (37–42) respectively, and as illustrated in FIG. 4. In a cordless cellular base station receive time frame 35, the following information is received by the mobile station 12 in each of the time slots (37–42), respectively. In time slot 1 (37) the cordless cellular base station 10 receives the digital control channel (DCCH) messages, in accordance with the IS-136 standard, from the mobile station 12 in the same manner that a digital cellular base station in a regional cell 18 receives DCCH messages from a mobile station 12. For example, the DCCH messages contain the information that the mobile station 12 must exchange with the cordless cellular base station 10 to maintain registration with the cordless cellular base station 12. In time slot 2 (38) and time slot 5 (41), the cordless cellular base station 10 receives voice data from a second mobile station (MS2). In time slot 3 (39) and time slot 6 (42), the cordless cellular base station 10 receives voice data from a first mobile station (MS1). In time slot 4 (40), no data is received from the mobile station 12 in the cordless cellular base station 10 which is shown as an open time slot.

In a cordless cellular base station transmission time frame 36, the following information is transmitted by the cordless cellular base station 10 in each time slot, 37–42, respectively. In time slot 1 (37), the cordless cellular base station 10 transmits digital control channel (DCCH) messages, in accordance with the IS-136 standard, in the same manner that a digital cellular base station in a regional cellular network transmits DCCH information. For example, the DCCH messages contain the information that the mobile station 12 looks for to register with the cordless cellular base station 10 when it recognizes that it is in proximity to it. In time slot 2 (38) and time slot 5 (41), the cordless cellular base station 10 transmits voice data to a second mobile station (MS2). In time slot 3 (39) and time slot 6 (42), the cordless cellular base station 10 transmits voice data to a first mobile station (MS1). Since the digital control channel (DCCH) is preferably a half-rate digital control channel, the DCCH does not have to be transmitted in time slot 4 (40).

Therefore, time slot 4 usually only transmits the synch word which helps mobile stations synchronize their transmission with the cordless cellular base station. However, to prevent the cordless cellular base station 10 from accidentally not being detected by another cordless cellular base station 10 should their transmission be in sync the cordless cellular base station 10 randomly transmits an idle code in addition to the synch word on time slot four. By occasionally transmitting an idle code at random time intervals on time slot 4, the probability that the CCBS will be detected by any of the cordless cellular base stations which are transmitting in sync is increased. For the remainder of the time, timeslot 4 (40) is silent besides the transmission of the synch word to gather noise information regarding the environment in which the cordless cellular base station 10 resides. Thus, at randomly selected frames, the cordless cellular base station 10 transmits an idle code in Time Slot 4 (40) instead of being silent to notify nearby cordless cellular base stations 10 of its existence during this time slot 40. The average rate of these transmissions is preferably between one in two hundred fifty-six and one in eight TDMA frames. Preferably, the frames in which the idle code is transmitted are selected by either a non-deterministic process or by a pseudo-random decision process that yields different selection patterns for different cordless cellular base stations 10.

When the mobile station 12 moves out of the range of the cordless cellular base station 10, the cordless cellular base station 10 automatically sends a message to the regional cellular network 16 to cancel the call forwarding of phone calls addressed to the mobile station identification number of the mobile station 12, as described in more detail below. In the preferred embodiment, if the mobile station 12 is on a call, the call is dropped and the mobile station 12 will have to reinitiate the call through the regional cellular network 16. In an alternate embodiment, the call is maintained by automatically forwarding the call to the mobile station 12 through the regional cellular network 16. In either case, after the mobile station 12 is no longer in the range of the cordless cellular network 16, the mobile station 12 automatically registers with the regional cellular network 16 to accept calls in the traditional cellular service manner.

Mobile Station

Mobile Station Hardware

Figure 5:
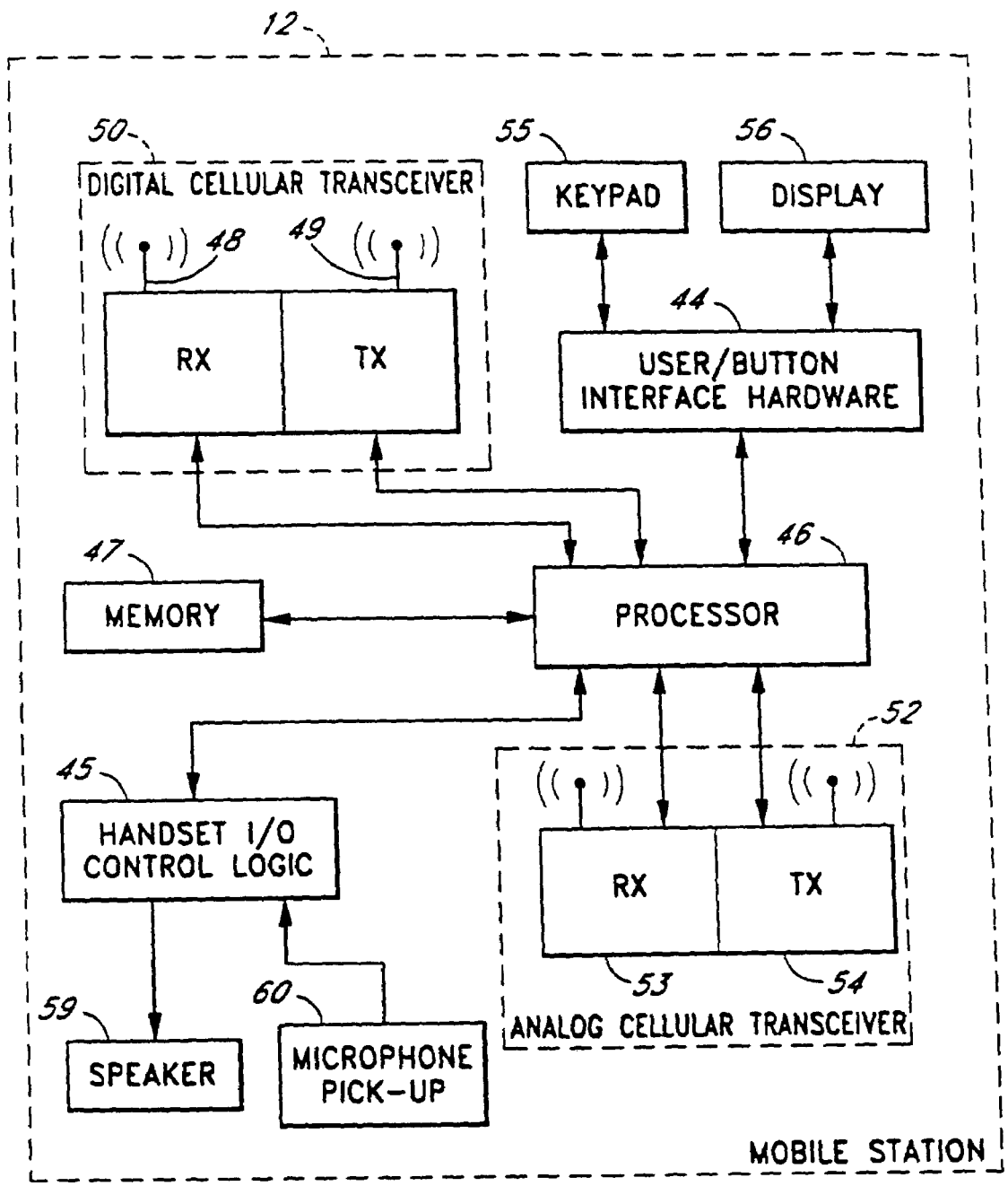
FIG. 5 is a block diagram of the mobile station hardware of the preferred embodiment.

In a preferred embodiment, the hardware of the mobile station 12, as illustrated in FIG. 5, comprises a processor 46, an associated memory storage area 47, a digital cellular transceiver 50, an analog cellular transceiver 52, user interface hardware 44, and handset I/O control logic 45. Advantageously, the digital cellular transceiver 50 and the analog cellular transceiver 52 are actually incorporated into the same cellular transceiver device as in the cordless cellular base station, however, for simplicity of understanding are shown as two separate devices in FIG. 5. The processor 46 is in communication with each of the above indicated elements. The associated memory storage area 47 comprises both permanent and temporary memory storage capabilities. The digital cellular transceiver 50 comprises a receiver (Rx) 48 and a transmitter (Tx) 49. In a preferred embodiment, the digital cellular transceiver 50 is a time division multiple access (TDMA) transceiver. The analog cellular transceiver 52 comprises a receiver (Rx) 53 and a transmitter (Tx) 54. The user interface hardware 50 is capable of providing an interface between a keypad 55 and a display 56. In a preferred embodiment, the keypad 55 includes at least the standard telephone twelve-key keypad. In other embodiments, the keypad 55 may include additional function keys. The display 56 is preferably an LCD display capable of displaying a variety of types of information to the user. The display 56, in a simpler embodiment, may include a plurality of seven-segment displays. The handset I/O control logic 45 provides an interface between a standard telephone microphone pickup 60 and speaker 59 on a conventional handset of a mobile station 12 as is commonly known to those in the art. Preferably, the mobile station 12 meets all of the requirements of the IS-137 performance requirements for a mobile station standard, which is hereby incorporated by reference in its entirety. The IS-137 standard can be obtained through the Telecommunications Industry Association (TIA), Engineering Department, 2001 Pennsylvania Avenue, N.W., Washington, D.C. 20006.

Mobile Station Operation

Referring back to FIGS. 1–2, the mobile station 12 preferably comprises a dual-mode cellular handset that is capable of accessing either digital or analog channels in a regional cell 18 of the cellular network 16. The mobile station 12 communicates with the cellular network 16, i.e., with the local cells 18, and with the cordless cellular base station 10 utilizing the same cellular frequency ranges and utilizing a single communications protocol. In a preferred embodiment, the mobile station 12 utilizes the IS-136 air interface standard, to communicate with both the cellular network 16 and the cordless cellular base station 10. The IS-136 standard forms a compatibility standard for time division multiple access (TDMA) digital cellular mobile telecommunication systems to ensure that a mobile station 12 can obtain service in any cellular system manufactured in accordance with the standard. In the preferred embodiment, the cordless cellular base station 10 uses only the TDMA digital protocol from the IS-136 standard and thus, the mobile station 12 only utilizes its digital transceiver 50 (FIG. 5) to communicate with the cordless cellular base station 10. However, in other embodiments the mobile station may also be compliant with other communications standards such as such as those standards which are compliant with 1.9 GHz operation, such as provisional standard PN-3388 which is also available from the Telecommunications Industry Association (TIA).

Preferably, the mobile station 12 has an initial preference for its last network registration; that is, when the mobile station 12 is powered ON, the mobile station 12 automatically synchronizes to is last operating frequency and attempts to register with the control channel on that frequency. If it fails to locate a control channel on that frequency, the mobile station will scan the other frequencies to locate the best control channel. Most likely, the mobile station will end up registering with the closest regional cellular base station 18 in the cellular network 16. After it has registered with the regional cellular network, as described in more detail below, when the mobile station 12 comes into proximity with a cordless cellular base station 10 with which it has been granted automatic registration privileges, the mobile station 12 automatically deregisters from the regional cellular network 16 and registers with the cordless cellular base station 10. As described briefly above and in more detail below, the mobile station 12 stores information regarding the cellular service in the area surrounding the cordless cellular base stations 10 with which it has recently registered. Thus, the mobile station 12 constantly compares the information about the regional cell 18 it is currently in to see if it is a cell that is likely to contain one of the cordless cellular base stations 10 with which it has most recently registered. If it is in a regional cell 18 that is likely to contain a cordless cellular base station 10 that it has recently registered with, it attempts to locate that cordless cellular base station 10 utilizing information that it has stored about the operating parameters of the cordless cellular base station 10.

Figure 6:
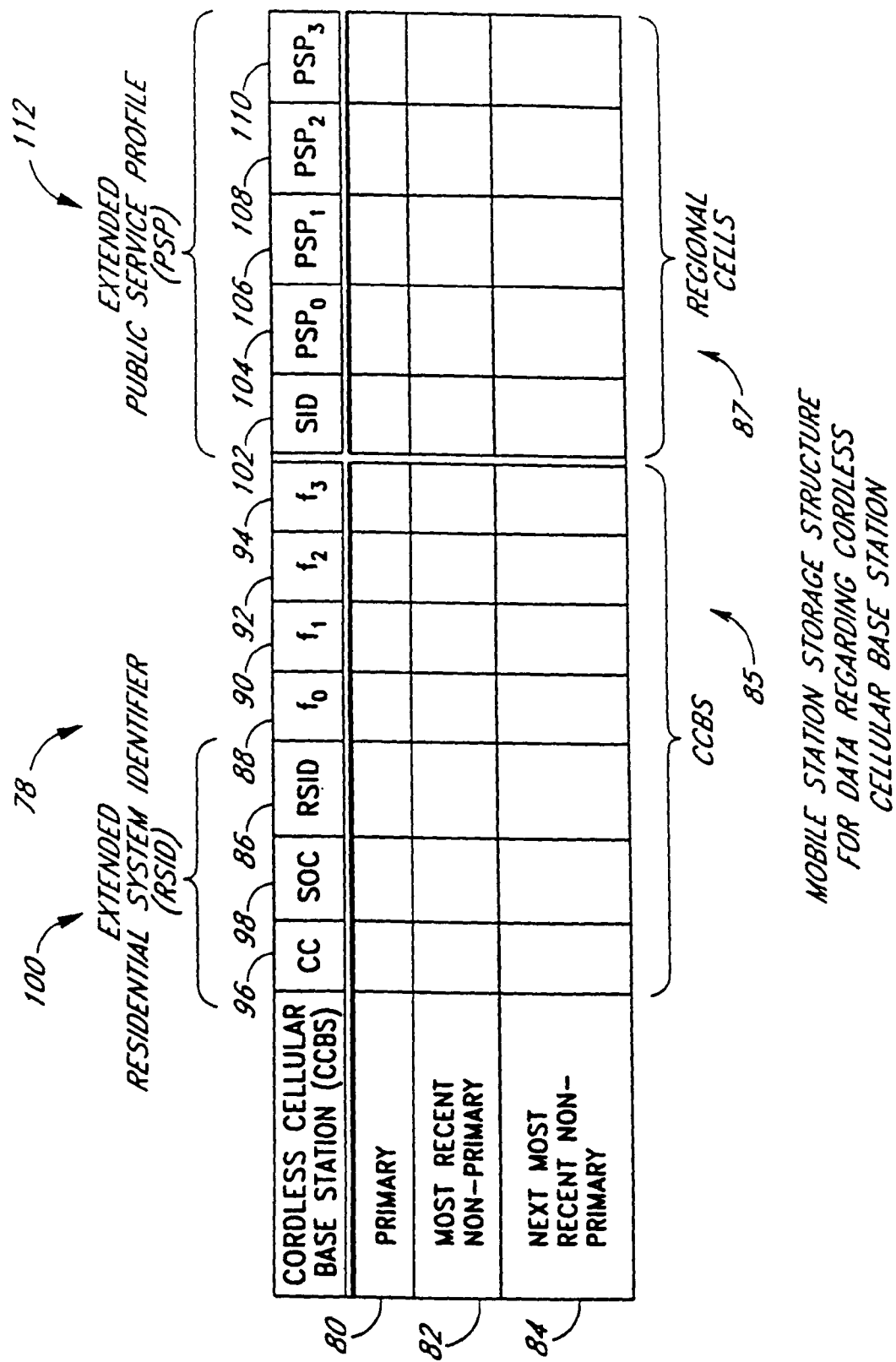
FIG. 6 is a schematic diagram of a memory storage table in the mobile station which stores data regarding certain cordless cellular base stations with which the mobile station communicates.

Therefore, the mobile station 12 includes a certain portion of its memory 47 (FIG. 5) that is dedicated to the semi-permanent storage of the operating frequency and other information related to one or more cordless cellular base stations 10 with which it has recently registered. Preferably, the mobile station 12 semi-permanently retains, in an EEPROM, a cordless cellular base station storage table 78, as illustrated in FIG. 6, which stores information about three cordless cellular base stations with which it has previously registered. While storage for three cordless cellular base stations 10 is currently preferred, it is contemplated that appropriate applications storage for additional cordless cellular base stations 10 is possible. A top row 80 holds data for a "primary" cordless cellular base station. The "primary" cordless cellular base station is, for example, the cordless cellular base station 10 in the user's home or office, which is most often accessed by the user and is responsible for the bills associated with the subscription to this service. The user defines which cordless cellular base station is the "primary" base station. In a preferred embodiment, after the mobile station 12 initially registers with the cordless cellular base station 10, the user enters a specified keystroke procedure, which may advantageously be entering the number 1 key followed by the # key on the mobile station keypad, to allow the user to designate the cordless cellular base station 10 currently in use as the "primary" cordless cellular base station. The second and third rows 82, 84 advantageously hold data for the two most recently used non-primary cordless cellular base stations 10 in the order of most recent use. The mobile station 12 maintains the information for the primary cordless cellular base station at all times in the top row 80. The mobile station 12 manages the ordering of the lower rows, shuffling them as necessary to ensure that the second row 82 has the data for the non-primary cordless cellular base station 10 used most recently, and the third row 84 has the data for the non-primary cordless cellular base station 10 used next most recently.

In the horizontal direction, the table 78 is divided into first and second parts 85, 87. The first part 85 of the table 78 stores information about the cordless cellular base station 10, such as the cordless cellular base station identification number and last known operating channel and back-up channel for the cordless cellular base stations 10. The second part 87 of the table 78 stores information about the cellular service for the regional cell 18 in which the cordless cellular base station 10 exists.

The first part 85 of the table 78 preferably includes the following information regarding the cordless cellular base station 10: a Residential System ID (RSID) 86, the operating channel $f_0$ 88, and back up channels $f_1$, $f_2$, and $f_3$ 90–94 respectively, the country code CC 96 and the system operating code SOC 98. The RSID is a 16-bit serial number that identifies the cordless cellular base station 10. The RSID is assigned to the cordless cellular base station by the cellular network 16 during its initial authorization procedure. The RSID 86 is broadcast by the cordless cellular base station 10 over the digital control channel (DCCH) in accordance with the IS-136 standard for the mobile station 12 to recognize and to attempt to register with the cordless cellular base station 10. The mobile station 12 restores the RSID in the table 78 after the initial registration with the cordless cellular base station 10 to help the mobile station 12 relocate the cordless cellular base station 10 the next time it comes within range. The channel information is the current or last known operating channel $f_0$ 88, and three alternative channels $f_1$, $f_2$, and $f_3$ 90–94, respectively, on which the cordless cellular base station 10 may operate. The alternate channels are the channels on which the digital control channel (DCCH) for the cordless cellular base station would most likely be detected. These channels are determined by the cordless cellular base station 10 based on its measurement of the interference environment using a procedure which is described in more detail below. Preferably, the cordless cellular base station 10 broadcasts a neighbor list which includes the alternate channels for cordless cellular base station operation. The neighbor list is then stored by the mobile station. In an alternate embodiment, the alternate channels are supplied to the mobile station 12 by the cordless cellular base station 10 via data or other delivery packets which are periodically transmitted by the cordless cellular base station 10 over the digital control channel (DCCH), while the mobile station 12 is registered with the cordless cellular base station 10. The country code CC 96 is the country code for the landline 14 to which the cordless cellular base station 10 is connected. The System Operator Code SOC 98 is the system operator code for the service provider. In the case of a cellular network, the McCaw network has its individual code, as do other service providers.

Together, the country code CC 96, the System Operator Code SOC 98, and the RSID 86, are referred to herein as the "extended RSID" 100. Preferably, when the mobile station 12 is trying to determine if it has located a cordless cellular base station 10 with which it has previously registered it compares the "extended RSID" 100 it has stored with the broadcast extended RSID from the cordless cellular base station 10. In the preferred embodiment, when the mobile station 12 compares a stored extended RSID 100 against a cordless cellular base station's broadcasted extended RSID for a match, the following rules are used. If the CC 96 of the cordless cellular base station 10 was not previously obtained by the mobile station 12, the mobile station 12 treats this as if the two CCs are known and match. In effect, an unknown CC 96 is treated as a wild card.

Using the extended RSID 100 rather than the RSID 86 by itself provides an additional level of protection against inadvertent registration with a cordless cellular base station 10 in the wrong area which happen to have the same RSID as the mobile station 12 has stored. For example, you do not want your mobile station 12 to try to register with a cordless cellular base station 10 of a person in Canada which may have the same RSID 86 as a cordless cellular base station 10 in the United States. By using the extended RSID 100 thus checking the country code CC 96, the system operating code SOC 98 and the RSID 100, such errors are obviated.

The second part 87 of the table 78 includes the following information regarding the regional cell 18 in which the cordless cellular base station 10 exists: a system identifier SID 102 of the cell, a plurality of public service profiles $PSP_0$, $PSP_1$, $PSP_2$, and $PSP_3$ 104–110 which further characterize the cell 18. The System Identifier SID 102 is an identification number for a metropolitan area within the cellular network 16 within which the cordless cellular base station 10 is located. Each metropolitan area in the regional cellular network 16 is assigned its own SID 102. The mobile station 12 uses the SID to identify when the mobile station 12 is in an area which is most likely to contain a known cordless cellular base station 10. There may be several cells 18 which operate within the metropolitan area. Thus, it is advantageous to use some further available information to help uniquely identify the cells within which a desired cordless cellular base station is located. The Public Service Profile preferably contains, in the case of a digital regional cell, the digital control channel (DCCH) channel number for the regional cell and the 8-bit Digital Verification Color Code (DVCC) number for the regional cell in which the cordless cellular base station was last located. The DVCC is sent by the base station to the mobile station and is coded to form the Coded Digital Verification Color Code (CDVCC). The DVCC is a 12-bit data field which contains the 8-bit DVCC and 4 protection bits generated by the base station. The CDVCC is sent in each time slot to and from the mobile stations and base station. The CDVCC is used to indicate that the correct data to/from the base station from/to the mobile station is being decoded. These numbers are well known to those in the art. In the case of an analog regional cell, the Public Service Profile preferably contains the Analog Control Channel number (ACCH) for the regional cell and the Digital Color Code (DCC) number for the regional cell within which the cordless cellular base station 10 was last located. The DCC is a digital signal transmitted by a base station on a forward analog control channel that is used to detect capture of the appropriate base station by a particular mobile station. These numbers are well known to those of skill in the art. The purpose for storing the Public Service Profile is to have additional information about the regional cellular service in which the desired cordless cellular base station 10 is located, so that it is more likely the correct regional cells will be identified corresponding to the cordless cellular base station.

The mobile station 12 is responsible for populating the PSP columns 104–110 of the table 78. In order to be able to do this, in a preferred embodiment, the mobile station 12 receives the broadcast neighbor list from the cordless cellular base station 10 and infers the PSPs from the neighbor list. The neighbor list message which is typically broadcast by a base station is specified by the IS-136 standard and includes the ability to designate certain channels as preferred channels, certain channels as non-preferred channels and certain channels as regular channels. A channel designated as a preferred channel would cause the receiving mobile station to switch its operating channel over to this preferred channel. The non-preferred and regular channels do not require such immediate action from the mobile station. The cordless cellular base station takes advantage of this predefined IS-136 broadcast neighbor list message, but instead of sending information regarding the make up of nearby peer cells over the neighbor list message, the cordless cellular base station sends PSP information regarding the cells which overlap the CCBS coverage area and information regarding the backup channels that the CCBS may choose to switch to. In addition, the cordless cellular base station may include additional channels which are not backup channels but are channels that the CCBS wants the mobile station to be aware of. Up to four PSPs are sent over the broadcast neighbor list and are designated as non-preferred channels. The remainder of the neighbor list is made up of the backup channels and other channels which are all indicated as regular channels. When the mobile station 12 receives the neighbor list from the cordless cellular base station 10, it extracts the PSP information for those channels which are indicated as non-preferred channels and stores this information in the cordless cellular base station storage table 78.

The CCBS determines the channels which are to be included in the neighbor list message as the non-preferred channels by determining the public cells that the CCBS is within or nearby by using the following procedure. The CCBS scans all of the channels in the cellular spectrum and performing received signal strength (RSS) measurements on each channel. It will look at the activity on the channel having the highest RSS measurements to see if the activity on the channel is due to a public digital control channel. If the signal is not due to a public digital control channel, the CCBS will switch move to the channel with the next highest RSS measurement, etc. until a 20 dB threshold is reached. If the signal is due to a public digital control channel, the CCBS will store this channel as an active digital control channel for a public cell whose coverage area includes or is near that CCBS is within or nearby. The CCBS will collect the PSP information for up to four active digital control channels for public cells that the CCBS is within or nearby and will send this information in the broadcast neighbor list message.

In an alternate embodiment, the mobile station 12 collects the Public Service Profile for the regional cell 18 whenever the mobile station enters a new cell 18. During registration with the cordless cellular base station 10, the mobile station 12 compares the current and previous collected public service profiles (PSPs) with the previously stored public service profiles and updates the table 78 if one or both of these public service profiles is not already present in table 78. The reason that the public service profile may change is that it is possible that a cordless cellular base station 10 may be located in a place over which the regional cell which provides service may change, i.e., the cordless cellular base station may be at a location where the service range of up to four adjacent cells overlap. By storing up to four public service profiles, no matter which cell is servicing the mobile station 12 as it approaches the cordless cellular base station 10, the mobile station 12 will still recognize that it needs to try to locate the cordless cellular base station 10. The most recently collected public service profile is always stored as $PSP_0$. When the public service profile changes, the public service profile that was previously stored as $PSP_0$ is stored as $PSP_1$, and the public service profile which was stored as $PSP_1$ is stored as $PSP_2$, etc.

The term "extended Public Service Profile" 112 is used herein to mean the combination of the SID 102 and a PSP. The mobile station 12 verifies that the current SID matches the SID of the regional cell 18 containing the cordless cellular base station 10 before checking the PSP. Once a SID match is found the PSPs are checked in order for a match. The extended PSP 112 must match before the mobile station 12 begins looking for a specific cordless cellular base station 10. For example, the mobile station 12 checks the SID of the cell that it is presently in and compares it to SIDs for each of the cordless cellular base stations 10 that the mobile station 12 is registered with to determine if the mobile station 12 is in a SID that is likely to have a known cordless cellular base station 10. In this way, the mobile station 12 does not look for a specific cordless cellular base station 10 when the mobile station 12 is roaming in some distant city with an unfamiliar SID. Further, the use of the SID reduces the chance that the mobile station 12 will erroneously attempt to register with a cordless cellular base station 10 when the mobile station 12 user is in another city or state. To further reduce this risk, in a preferred embodiment, the extended PSP also contains the country code, CC, for the country in which the cordless cellular base station resides which prevents the mobile station from searching for the cordless cellular base station when the SID matches but the mobile station is in the wrong country.

Features of the Cordless Cellular Base Station

Initial Authorization of the Cordless Cellular Base Station

In order to maintain a secure system, the cordless cellular base station 10 first initially registers with the cellular network 16 in order to authorize its use. In fact, the cordless cellular base station 10 is not operational without the network authorization, as the cellular network 16 provides the cordless cellular base station 10 with certain operational parameters, such as the authorized operating frequency list for its operation.

Preferably, when a customer purchases a cordless cellular base station 10, the seller will contact the cellular network 16 and provide it with certain information about the cordless cellular base station 10, such as the electronic serial number of the cordless cellular base station 10, the landline number to which the user plans to hook-up the cordless cellular base station 10, etc. In addition, it is expected that the seller will also provide the mobile identification number (MIN) of the primary user's mobile station 12 to the cellular network for subscription to the call forwarding feature.

Once the cordless cellular base station 10 is brought to the location where the cordless cellular base station 10 will reside, the user connects the cordless cellular base station 10 to a telephone jack 58 associated with the user's landline 14 and a power source (not shown), such as a typical wall socket. In a preferred embodiment, the user depresses a network authorization function key 62 on the cordless cellular base station 10. In one alternate embodiment, once the power source is connected to the cordless cellular base station 10, the cordless cellular base station 10 automatically initializes a cellular network authorization procedure. Alternatively, the system could advantageously accept a series of specified numbers and symbols on the telephone keypad (FIG. 3), such as 4648#, as instructions to manually initialize the network authorization procedure.

Figure 7:
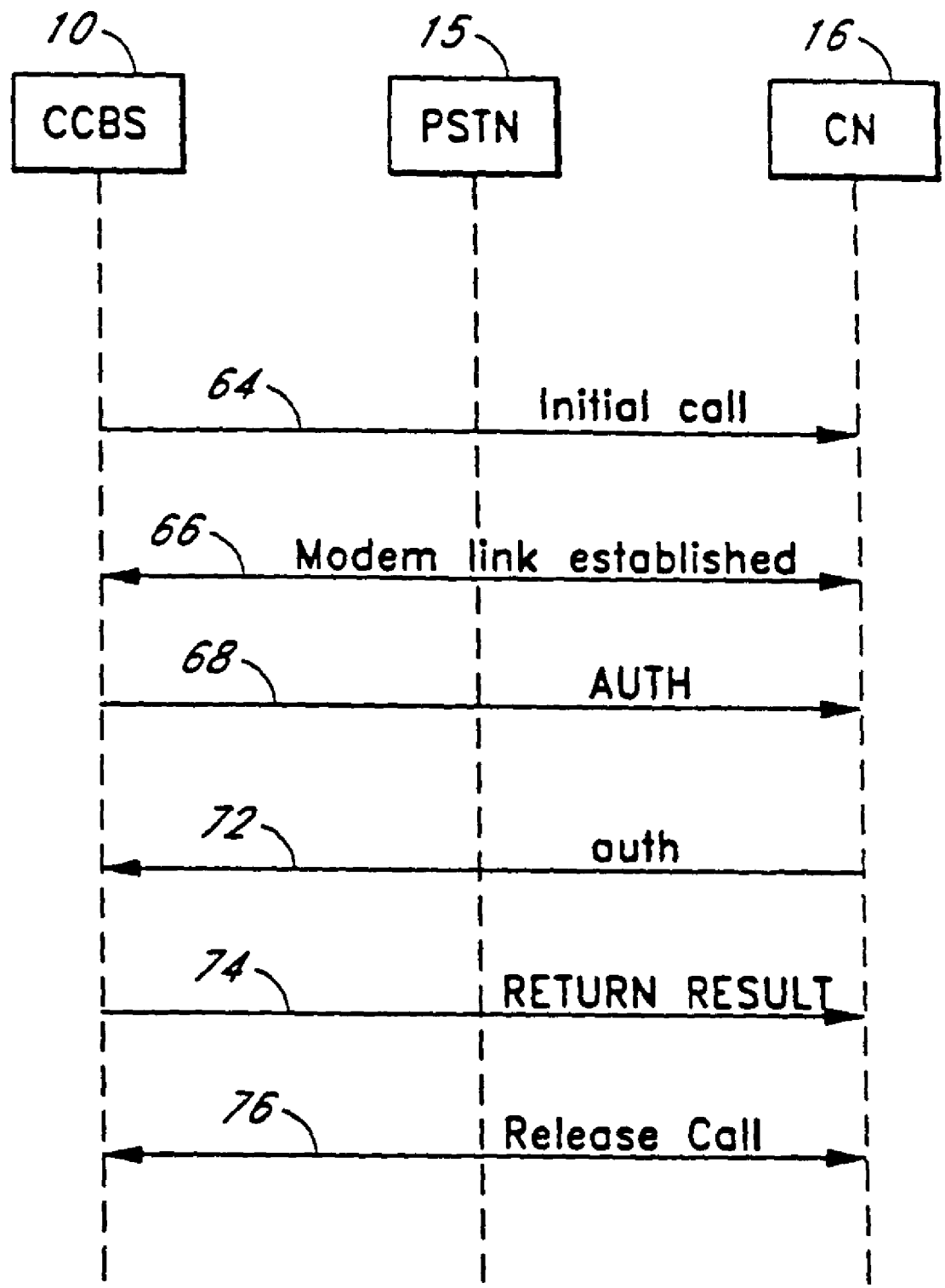
FIG. 7 is a diagram illustrating the steps associated with the cordless cellular base station initial authorization feature.

As illustrated in FIG. 7, the network authorization procedure for a new cordless cellular base station 10 is described. After the automatic network authorization procedure has been initialized or the manual keystroke commands have been depressed, the processor 46 uses the standard telephone interface hardware 29 on the cordless cellular base station (CCBS) 10 to initiate a call to a preset cellular network authorization phone number, such as a remote network update number, via the landline 14 in a step 64. Preferably, the cellular network authorization number is stored in semi-permanent memory in the cordless cellular base station 10.

After the cellular network (CN) 16 answers the call from the cordless cellular base station 10, the cellular network 16 initiates a modem link in modem setup step 66 with the cordless cellular base station 10 on the landline 14. This modem link can be established using the AT&T 800 Transaction Access Service Option or may be provided by a separate modem pool. The cordless cellular base station 10 makes at least two attempts to set up a modem link with the network 16. The modem 27 of the cordless cellular base station 10 and a modem 27 in the cellular network 16 are synchronized, and a modem link is established. At least two attempts are made to establish the modem link. Once the modem link is established, the cordless cellular base station 10 sends an authorization request message in step 68. The authorization request message includes the electronic serial number of the cordless cellular base station for identification purposes. The network verifies that the cordless cellular base station 10 which is identified by the electronic serial number is calling from the landline number which was given to the cellular network when the cordless cellular base station was purchased. Preferably, the cordless cellular base station uses the (CNI) calling number identification feature of the telephone line from the PSTN 15 to verify that the call that is being received is, in fact, on the landline 14 that was stored in the regional cellular system. If the landline number on which the modem link is established is the same as the stored landline number, the cellular network 16 accepts an initial authentication message (AUTH) from the cordless cellular base station 10 and sends an initial authorization message (auth) to the cordless cellular base station 10 in step 72. The cellular network 16 downloads certain operational parameters for the cordless cellular base station 10 in the authorization message. In the preferred embodiment the authorization message comprises (a) Primary MIN; (b) CCBS-ID—Password to be used by the CCBS in subsequent communication with the CCBS VLR; (c) Public SID (SID)—the System Identification in which this CCBS should be operating; (d) Residential SID (RSID)—the Residential System Identification which should identify this CCBS; (e) CCBS_Auth_Count—the initial value to use for fraud protection; (f) Registration/Deregistration Flag—an indication to the CCBS which registrations and deregistrations for which the CCBS VLR would like to be informed; (g) Authorization Frequencies—a list of frequencies within which the cellular base station is authorized to operate; (h) Remote Network Update Number 1 (RNUN1)—the number which the CCBS should use for further communication with the CCBS; (i) Remote Network Update Number 2 (RNUN2)—the alternate number which the CCBS should use if the Remote Network Update Number 1 no longer works; (j) LLN—the land line number on which this CCBS should be operating, (k) SOC—the system operator code for the cellular provider; (l) Authorization Power—the authorized operating power level; (m) Transmitted Signal Strength—the maximum signal strength for which this CCBS should operate; and (n) Receive Signal Strength—the minimum signal strength for which this CCBS will consider a mobile set channel. The operating frequencies are, in a preferred embodiment, a portion of the frequencies in the cellular spectrum. However, the operating frequencies may include all of the frequencies in the cellular spectrum. The authorization power level is the power level at which the CCBS is authorized to operate. In one embodiment, the user has the option of the level of service that he or she wants to receive and could be changed a different fee for a different level of service. For example, the user could choose either a lesser area of coverage for the CCBS, a normal area of coverage for the CCBS or an expanded area of coverage for the CCBS wherein each of these coverage areas would have a corresponding authorization or authorized power level. Depending upon the level of service requested by the user, the corresponding authorized power level will be sent to the CCBS in the authorization message. The parameters received during the authorization step (auth) are stored in the memory of the cordless cellular base station 10 and are used for operation. Preferably, the parameters are stored in an EEPROM. The cordless cellular base station 10 confirms the receipt of the auth message by sending a return result message to the cellular network 16 in step 74. Once the return result message is received and the initialization procedure is complete, either the cordless cellular base station 10 or the cellular network 16 releases the call (Release call)

in step 76. If any of the above attempts to initialize the cordless cellular base station 10 fail, the initialization procedure is canceled by the cellular network 16 and, the authorization step is reattempted after a certain period of time. If the second attempt fails, the user can recontact the cellular network 16 by placing another call on the landline 14 to the cellular network 16 to request that the initialization procedure be tried over again.

After the network authorization is complete, the cellular network 16 retains a permanent record of the cordless cellular base station's unique identification password number, the mobile station ID number of the primary mobile station 12 associated with the cordless cellular base station 10 and the landline number that is associated with the cordless cellular base station 10. In one embodiment, once the cordless cellular base station 10 has completed a successful network authorization procedure with the cellular network 16, an indicator on the cordless cellular base station 10 is illuminated to signify that the cordless cellular base station 10 is authorized for use.

In an alternate embodiment, the network authorization procedure is similar to that described above, except that the user initiates the authorization procedure by calling the cellular network authorization phone number on the user's standard telephone landline 14 and providing the cellular network 16 with the landline number (LLN) to which the cordless cellular base station 10 is connected. The cellular network (CN) 16 initiates the telephone call (Initial Call) to the landline number on the public switched telephone network (PSTN) 15 to which the cordless cellular base station 10 is connected. The user does not answer the telephone call; instead, the landline communications hardware 29 (FIG. 3) on the cordless cellular base station 10 is allowed to answer the call. After a telephone link between the cordless cellular base station 10 and the cellular network 16 has been established, the authorization procedure proceeds as described above, by setting up a modem link and following the flow outline in FIG. 7.

Cordless Cellular Base Station Registration List

As the number of cordless cellular base station users increase it will become more and more likely that cordless cellular base stations 10 will be present in adjoining houses. In such cases, it is not desirable to enable automatic registration for all mobile stations 12 that come into proximity with a cordless cellular base station 10. Advantageously, the preferred registration scheme allows the cordless cellular base station 10 to be accessible only to users who have been previously been granted the registration privilege. The cordless cellular base station 10 maintains a cordless cellular base station registration list 113 in a semipermanent portion of the memory 21 (FIG. 3) which stores the mobile system identification number of the mobile stations 12 which have been previously been granted registration privileges with the cordless cellular base station 10. By requiring preregistration of mobile stations 12, before automatic registration occurs, accidental automatic registration with a nearby cordless cellular base station 10 is prevented, however the convenience of automatic registration for frequent users is still available.

As illustrated in FIG. 8, the cordless cellular base station registration list 113 is preferably broken down into first and second parts 114, 115. The mobile station identification numbers MINS of the "primary" mobile stations 12 which are granted automatic registration privileges with the cordless cellular base station 10 are stored in the first part 114 of the list 113. The primary users are the owners of the cordless cellular base station 10 and are normally the users who are billed for the services of the cordless cellular base station 10. The mobile station identification numbers MIN of the "non-primary" mobile stations 12 most recently registered with the cordless cellular base station 10 are stored in the second part 115 of the list 113. In the preferred embodiment, the cordless cellular base station 10 is advantageously capable of granting automatic registration privileges to a limited number of mobile stations 12 whose MINs are stored in the cordless cellular base station registration list 113. Preferably, the cordless cellular base station 10 is capable of granting registration privileges to two primary users and eight non-primary users. However, depending upon the preferred use, the numbers could be less than or greater than those indicated above.

The primary users in the first part 114 of the list are preferably not changeable without intervention by an authorized agent or by communication with the regional cellular network 16. The second part 115 of the list 113 listing the non-primary mobile stations most recently granted automatic registration privileges is advantageously maintained in order of most recent registration to the cordless cellular base station 12. Thus, if the second part 115 of the list 113 is already full, the last non-primary mobile station on the list, i.e., the mobile station least recently granted automatic registration, is deleted from the list 113 and a new mobile station is granted automatic registration privileges and is placed at the top of the second part 114 or non-primary registration list.

The cordless cellular base station 10 may also advantageously provide an LCD display of the second part 114 of the list 113 listing the non-primary mobile stations 12 most recently granted automatic registration privileges. In this embodiment, the user depresses a function key on the cordless cellular base station to display the second part 114 of the list 113 listing the non-primary mobile stations. Once the second part 114 of the list 113 is displayed, the user scrolls through the list of displayed mobile station identification numbers to select a number that he would like to delete. The user then depresses a function key labeled delete on the cordless cellular base station 10 or in an alternative embodiment can enter a series of keys such as, 335#, on the keypad of the cordless cellular base station 10 to delete the highlighted numbers from the second part 115 of the automatic registration list 113.

For each entry, the cordless cellular base station registration list 113 stores a status record 116 that indicates the state of the mobile station with respect to the cordless cellular base station and a mobile station identification number record 117. Preferably, there are three states of a mobile station 12 with respect to the cordless cellular base station 10 which are referred to as the: "standby", "active" and "dormant" states. The dormant state, shown by a "D" on the table 113, indicates that the mobile station 12, which has previously registered with the cordless cellular base station 10, is not currently registered with the cordless cellular base station 10. The standby state, which is indicated by a "S" on the table 113, indicates that the mobile station 12 is currently registered with the cordless cellular base station 10 and is not currently on a call, i.e., the mobile station 12 is "standing by" waiting to receive or place a call through the cordless cellular base station 10. The active state, which is shown by an "A" on the table 113, indicates that the mobile station 12 is registered with the cordless cellular base station 10 and is currently on a call which is being controlled by the cordless cellular base station 10. As indicate above, in the preferred embodiment, up to two mobile stations 12 may be listed as active at a time.

Initial Registration

Figure 9:
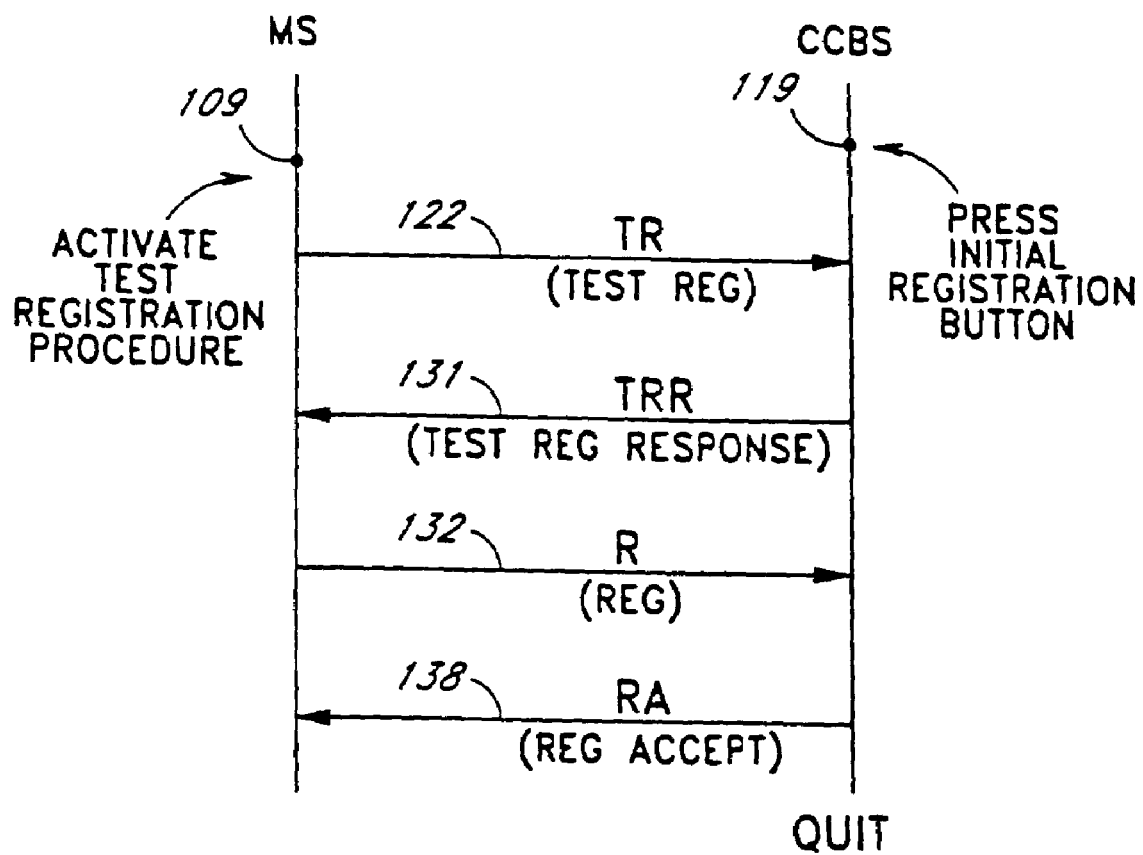
FIG. 9 is a diagram illustrating the communication between the cordless cellular base station and the mobile station associated with an initial registration of a mobile station.
Figure 10A:
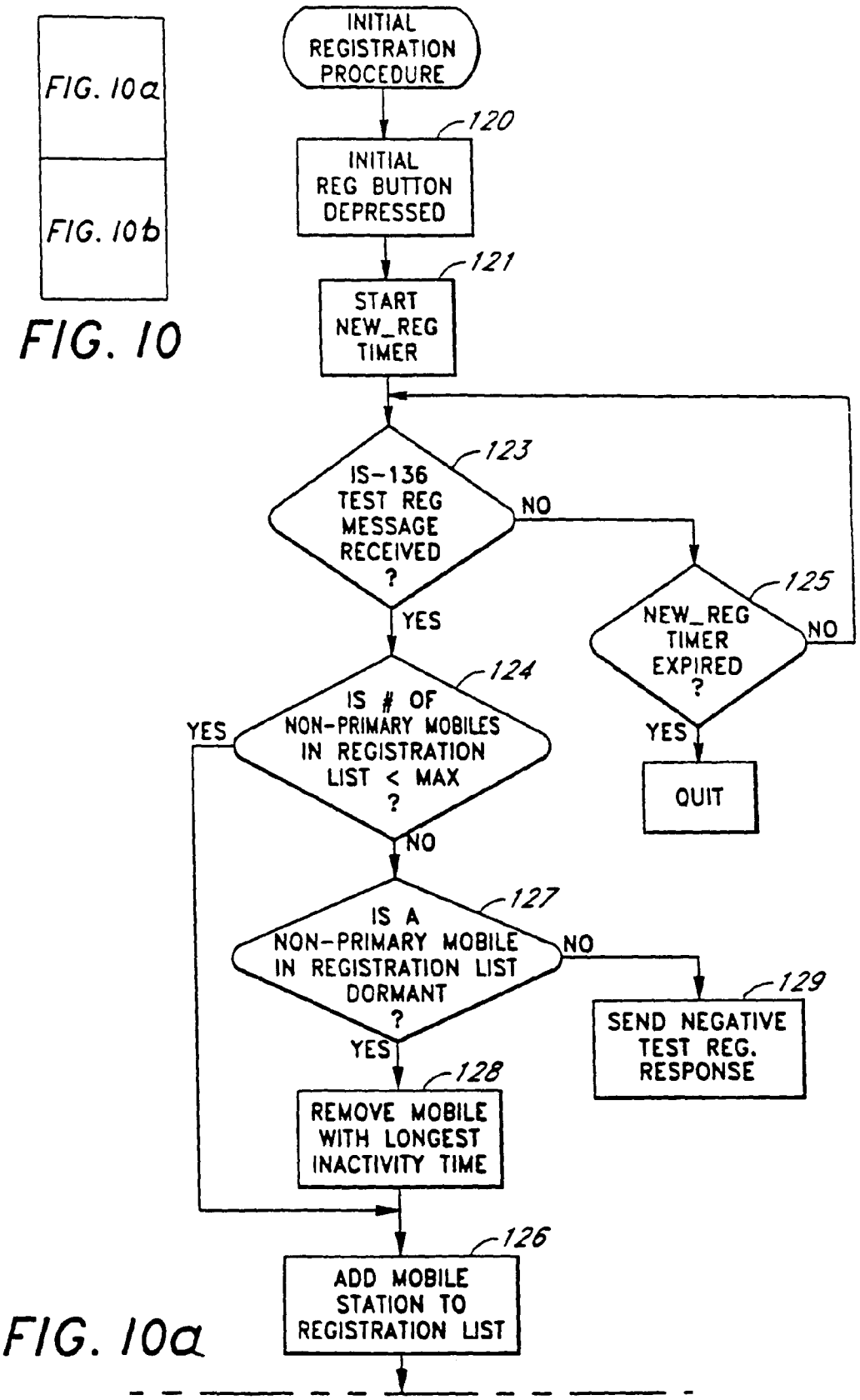
FIG. 10 is a flow chart illustrating the steps that the cordless cellular base station takes to process an initial registration request.
Figure 10B:
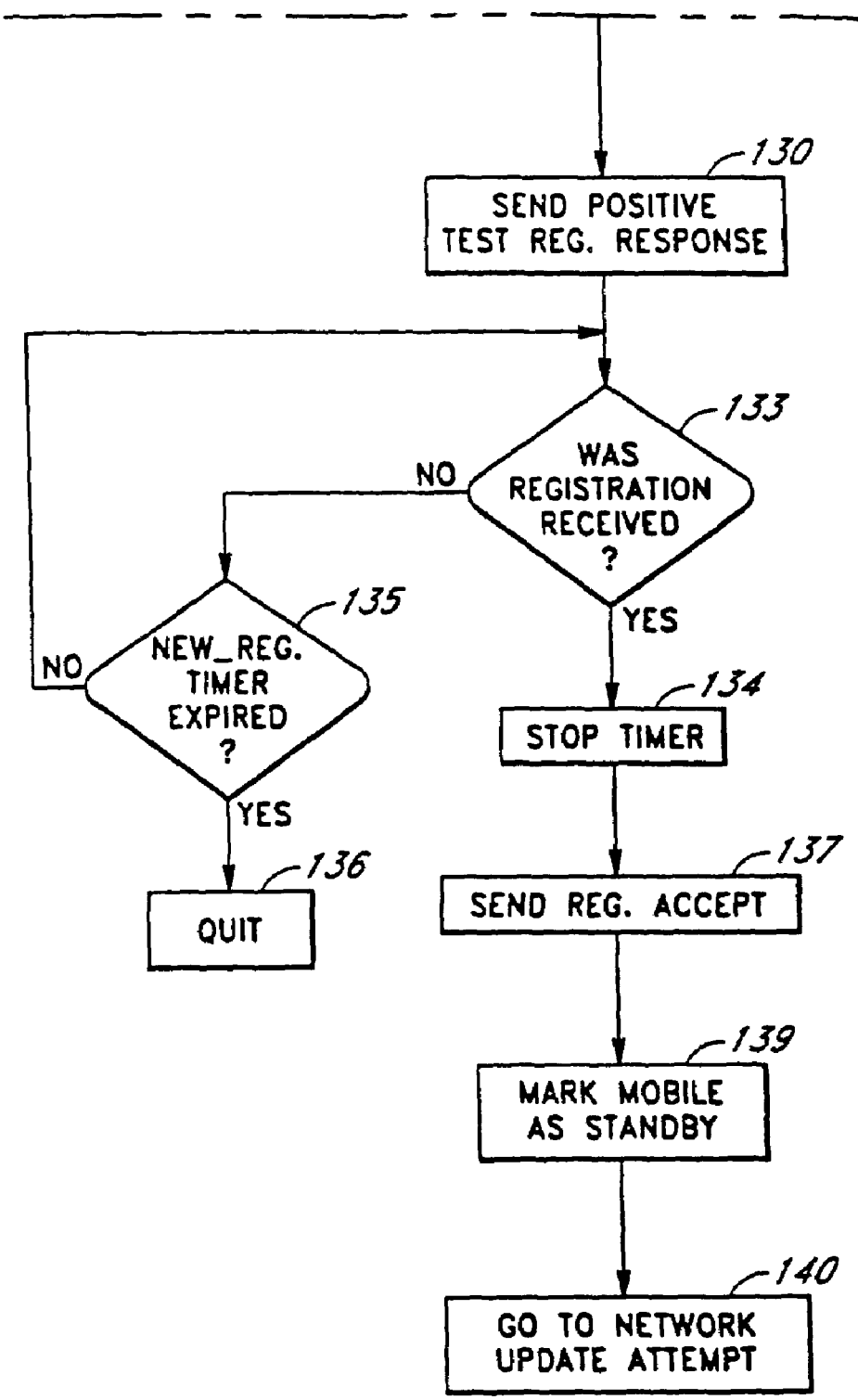
Figure 11:
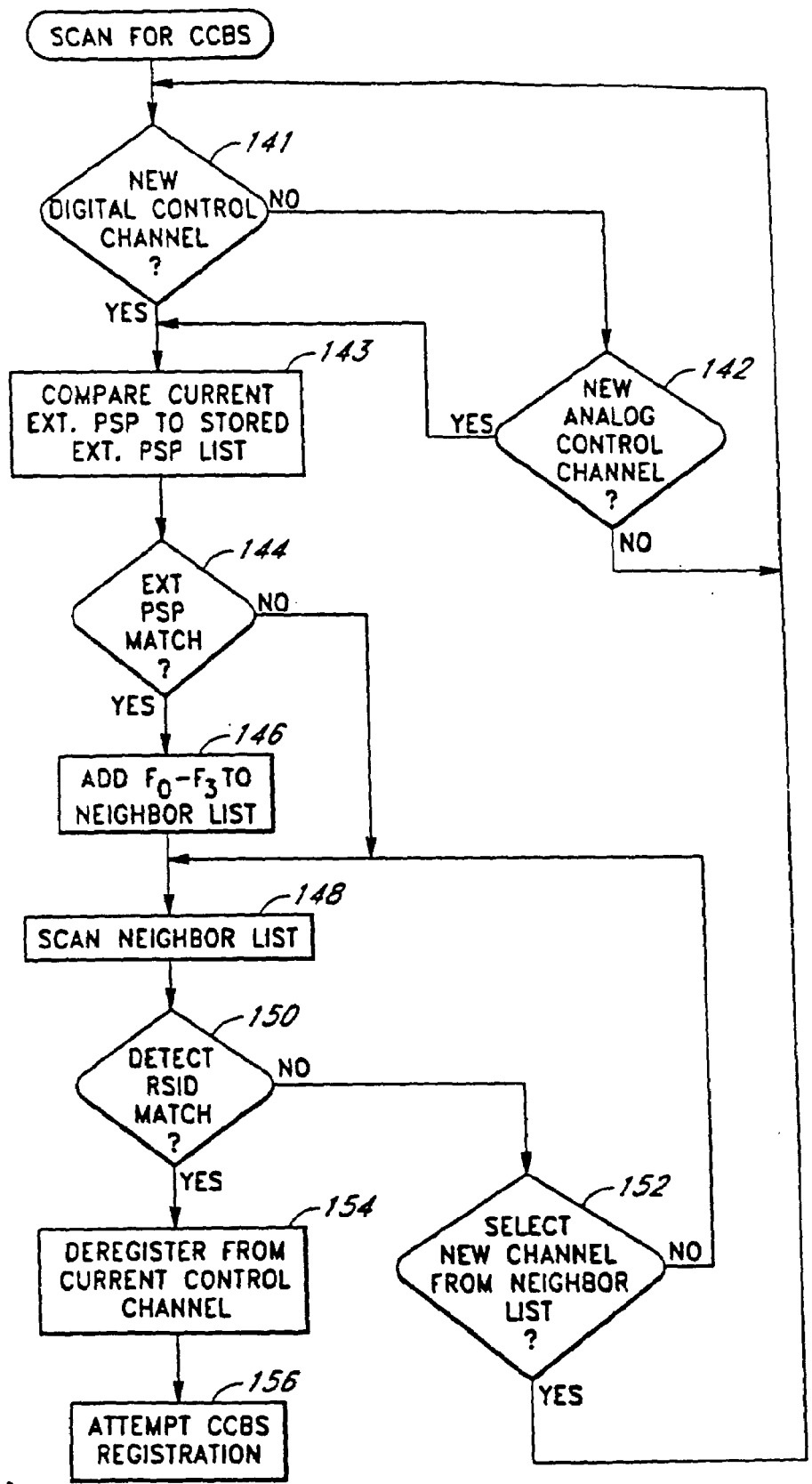
FIG. 11 is a flow chart illustrating the steps that the mobile station takes to determine its location before attempting automatic registration with a cordless cellular base station.

When a user wants to use a mobile station 12 which was not previously registered with the cordless cellular base station 10, the following initial registration procedure is performed described as follows with reference to FIGS. 9 and 10. FIG. 9 shows the messages which are passed between the mobile station 12 and the cordless cellular base station 10. FIG. 10 shows the process which takes place in the cordless cellular base station 10 to enable the initial registration. In step 119 of FIG. 9, the user presses the initial registration button 111 (FIG. 2) on the cordless cellular base station 10. In the flow chart of FIG. 10, at action block 120 the depression of the initial registration button is detected and control passes to action block 121. At action block 121, the cordless cellular base station 10 sets a new registration (new-reg) timer. Preferably, the new registration timer is set for 30 seconds.

After the initial registration button 111 on the cordless cellular base station 10 is depressed, the user of the mobile station 12 activates a test registration procedure on the mobile station in step 109. In a preferred embodiment, the test registration procedure is activated by the user depressing a test registration function key on the mobile station 12. In an alternate embodiment, the user may depress a series of specified keys on the mobile station keypad, such as 878#, to initiate the test registration procedure on the mobile station 12. The initiation of the test registration function causes the mobile station 12 to measure the received signal strength on each channel and to store the measurement. The mobile station then checks the channels which have the strongest receive signal strength to determine if a digital control channel (DCCH) is present. If a DCCH is not present, the mobile station checks the channel with the next highest receive signal strength. If a DCCH is present, the mobile station checks to see if its system ID identifies it as a private system. If it is a private system, the mobile station tries to register with the device by sending out a test registration message (TR) in step 122 of FIG. 9. The test registration message is specified by the IS-136 standard.

At decision block 123 of FIG. 10, the cordless cellular base station 10 checks to see if the test registration message is received from a mobile station 12. If the test registration message is received, control passes to decision block 124. If the test registration message is not received control passes to decision block 125, where the cordless cellular base station checks to see if the new registration timer (new-reg) has expired. If the timer has not expired, control returns to decision block 123. If the timer has expired, the initial registration attempt is completed.

At decision block 124, the cordless cellular base station 10 determines if the registration list of FIG. 8 is full. If there is still room in the registration list, control passes to action block 126. If the registration list is full, control passes to decision block 127. At decision block 127, the cordless cellular base station 10 determines if the status of one of the non-primary mobile stations 12 in the registration list is indicated as being dormant. If the status of one of the non-primary mobile stations 12 is indicated as being dormant, control passes to action block 128. If none of the non-primary mobile stations 12 is listed as being dormant, control passes to action block 129. At action block 129, a negative test registration response is sent to the mobile station and the initial registration process is abandoned. At action block 128, the non-primary mobile station 12 with the longest inactivity time is removed from the registration list and control passes to action block 126. In the preferred embodiment, the non-primary mobile station with the longest inactivity time would be the last non-primary mobile station on the registration list.

At action block 126, the mobile station identification number of the requesting mobile station is added to the registration list. Next, at action block 130, the cordless cellular base station 10 sends a positive test registration response message (TRR) to the mobile station 12 and control passes to decision block 133.

The transmission of the positive or negative test registration response from the cordless cellular base station to the mobile station is shown in step 131 of FIG. 9. If a negative test registration response, or no test registration response is received at the mobile station, the mobile station will check the channel with the next highest receive signal strength and repeat the procedure indicated above to try to determine if it is a private system, and if so, to try to register with the device by sending out a test registration message (TR).

Upon receiving the positive test registration response, in accordance with the IS-136 standard, the mobile station 12 will display a set of alpha characters transmitted by the cordless cellular base station 10 in the test registration message. In the preferred embodiment, the alpha characters which are displayed form the word "cordless", at which time the mobile station may decide to accept or reject the cordless registration with the cordless cellular base station. If the user wishes to accept the registration, he depresses a specified series of keys on the keypad, such as 9#. If the user accepts the registration, the mobile station sends a registration message (R) in step 132 of FIG. 9 to the cordless cellular base station. If the user wishes to reject the registration, the user depresses another specified series of keys on the keypad, such as 6# or in another embodiment does not depress any keys. If the registration is rejected, no message is sent to the cordless cellular base station 10.

In the meantime, at decision block 133, the cordless cellular base 10 checks to see if a registration message has been received from the mobile station. If a registration message (R) is received, control passes to action block 134. If a registration message (R) was not received control passes to decision block 135 where the cordless cellular base station 10 checks to see if the new_reg timer has expired. If the new_reg timer has not expired, control returns to decision block 133 where the cordless cellular base station will continue to check for the receipt of the registration message (R) from the mobile station. If the new_reg timer has expired without the cordless cellular base station 10 receiving a response from the mobile station 12, control passes to action block 136 where the initial registration attempt is canceled.

At action block 134, the new_reg timer is stopped and control passes to action block 137. At action block 137, the cordless cellular base station sends a registration accept message (RA) to the mobile station as is shown in step 138 of FIG. 9 and control passes to action block 139. At action block 139, the status of the mobile station 12 is updated as being in standby mode and the initial registration procedure is completed. At action block 140, the cordless cellular base station 10 proceeds with the network update attempt procedure as described in association with FIG. 13 below.

After the mobile station 12 has completed the initial registration with the cordless cellular base station 10, the mobile station 12 will automatically register with the cordless cellular base station 10 without the need to go through the initial registration procedure. Thus, when a mobile station 12 comes within range of a cordless cellular base station 10 with which it has been granted automatic registration privileges and the mobile station 12 is not currently handling a call, in accordance with the preferred embodiment, the mobile station 12 automatically switches from regional cellular service mode to cordless telephone landline service mode without user intervention. The automatic registration of the mobile station 12 with the cordless cellular base station 10 is discussed in more detail below.

Automatic Registration of a Mobile Station with a Cordless Cellular Base Station The mobile station 12 only attempts to locate a cordless cellular base station 10 when the mobile station 12 is not currently handling a call. When a mobile station 12 that is not currently handling a call comes into the range of a cordless cellular base station 10 with which it has been granted automatic registration privileges, the mobile station 12 preferably automatically deregisters from the cellular network and registers with the cordless cellular base station 10. The cordless cellular base station 10 advantageously is able to communicate with up to two mobile stations 12 at one time. The cordless cellular base station 10 displays an indication of whether its digital control channel (DCCH) is supporting one or more mobile stations 12. In a preferred embodiment, the cordless cellular base station 10 displays the mobile identification number of each mobile station 12 that the cordless cellular base station's digital control channel (DCCH) is currently supporting. The cordless cellular base station 10 remains ready to receive registrations and other legitimate requests from the mobile stations 12 at any time.

In general, the range in which automatic registration with the cordless cellular base station 10 is achievable is dictated by the strength of the transmission signal from the cordless cellular base station 10. Preferably, the cordless cellular base station 10 is capable of transmitting an approximately 6.3 mW signal. This translates into an automatic registration range for the cordless cellular base station 10 of approximately 500–1,000 feet. The variation in the registration range is due to the values broadcast on the DCCH of the cordless cellular base station, variations in weather conditions, surrounding EMI interference, and sizes and layouts of the buildings in which the cordless cellular base station 10 may be located.

Location of the Cordless Cellular Base Station by a Mobile Station

As illustrated in FIG. 10, when the mobile station 12 is being served by a control channel and is not currently handling a call, the mobile station 12 searches for the presence of the cordless cellular base station 10 after each selection of a new control channel. Once a new channel is selected, at decision block 140 the cordless cellular base station checks to see if a new digital control channel is selected. If at decision block 140, a new digital control channel is acquired, control passes to action block 142. If at decision block 140, a new digital control channel is not acquired, control passes to decision block 141. If at decision block 141 a new analog control channel is acquired, control passes to action block 142. If at action block 141 a new analog control channel is not acquired, control returns to decision block 140.

At action block 142, the current extended Public Service Profile of the mobile station 12 is compared to all the stored extended Public Service Profiles in the table 78 (FIG. 6) in the mobile station for each of cordless cellular base stations 10 that are stored. For an analog control channel, the extended public service profile preferably contains the CC, SID, ACCH channel number and DCC for the control channel as described above. For a digital control channel, the extended Public Service Profile preferably contains the CC, SID, DCCH channel number, and DVCC as described above. If at decision block 144 there is an extended PSP match, control passes to action block 146. If at decision block 144, there is no extended PSP match, control passes to action block 148.

At action block 146 once an extended PSP match is made, it is possible that the mobile station 12 is within the vicinity of a cordless cellular base station 10 with which it has previously registered. As known to those of skill in the art, the mobile station 12 is provided with a list of frequencies by the cellular network 16 called a neighbor list (NL). As known to those of skill in the art, the neighbor list is a list of frequencies that the neighboring cells operate on and assists the mobile station in selecting nearby cells for control when the signal strength of the current cell is no longer optimal. In a typical mobile station 12, the mobile station scans the channels on the neighbor list to determine if a control channel which is stronger than its current control channel can be located on the channels of the neighboring cells. Once a clearer channel is located, the mobile station automatically "camps onto" the new control channel. Thus at action block 146 when an extended PSP match is made, the mobile station 12 advantageously adds the stored primary and alternate cordless cellular base station frequencies that the digital control channel (DCCH) of the cordless cellular base station 10 was detected on, i.e., $f_0$, $f_1$, $f_2$, $f_3$, for each row in the table 78 (FIG. 6) on which an extended PSP match was found, to the Neighbor List (NL) forming an extended neighbor list (ENL). Thus, at action block 148, each of the frequencies of the neighbor list are sequentially scanned to determine if a clearer control channel can be located. If on one of the frequencies of the neighbor list that the mobile station is scanning, a private system identifier, such as the RSID of the cordless cellular base station, is detected, in accordance with the IS-136 standard, the mobile station 12 synchronizes with that control channel and checks to see if this is an identifier that the mobile station recognizes. At decision block 150, the mobile station compares the identifier that is obtained for the control channel with the extended RSID for the cordless cellular base station that it is scanning for. As described above, an extended RSID is preferably a country code (CC), a System Operator Code (SOC), and a 16-bit Residential System ID (RSID) for the cordless cellular base station 10. If an extended RSID match is detected, control passes to action block 154. If an extended RSID match is not detected, control passes to action block 152 where the mobile station checks to see if the signal strength of any of the frequencies on the neighbor list is strong enough to warrant a channel change. If at decision block 148 the signal strength of one of the channels is strong enough to select a new channel, control returns to decision block 140. If at decision block 152 none of the channels are strong enough to warrant a channel change, control returns to action block 148 where the channels on the neighbor list are continually scanned.

At action block 154, the mobile station deregisters from the regional cellular network. Control passes to action block 156 where the mobile station attempts to register with the cordless cellular base station 10 using the CCBS registration procedure described below in association with FIG. 12. If registration succeeds, the mobile station camps on the cordless cellular base station's Digital Control Channel (DCCH).

Automatic Registration of a Cordless Cellular Base Station (CCBS)

Figure 12:
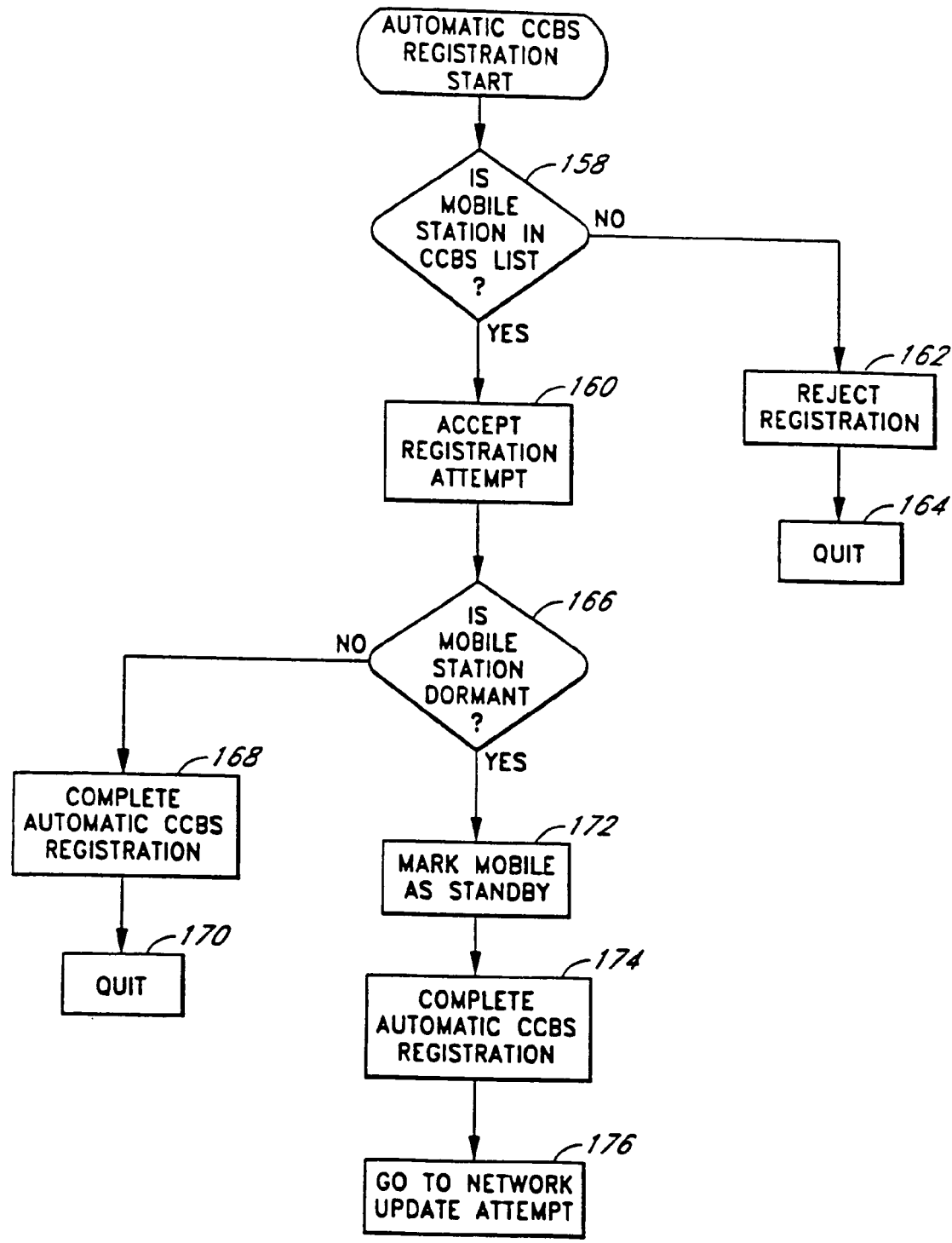
FIG. 12 is a flow chart illustrating the automatic registration of a mobile station to a cordless cellular base station.

When the mobile station 12 has determined that it is in proximity with the cordless cellular base station 10 using the procedures described above, the mobile station 12 attempts to register with the cordless cellular base station 10 using the procedure illustrated in FIG. 12. Initially, at decision block 158 the cordless cellular base station 10 checks to see if the mobile station identification number (MIN) of the mobile station 12 matches a MIN stored in the automatic registration list in the cordless cellular base station 10. If the MIN of the mobile station matches one of the stored MINs, control passes to action block 160. If the MIN of the mobile station 12 does not match one of the stored MINs, control passes to action block 162. At action block 162, the automatic registration attempt is rejected and control passes to action block 164 where the automatic CCBS registration procedure is terminated.

At action block 160, the automatic registration attempt of the mobile station 12 is accepted. Next, at decision block 166, the cordless cellular base station 10 checks the status of the mobile station in the registration list of FIG. 8. If the mobile station 12 is listed as dormant, i.e., not in active or standby modes, control passes to action block 172. If the mobile station 12 is not listed as dormant, control passes to action block 168. At action block 168, the automatic CCBS registration procedure is considered to be completed and control passes to action block 170 where the automatic CCBS registration procedure is terminated.

At action block 172, the status of the mobile station 12 is updated as being in standby mode. At action block 174, the automatic CCBS registration procedure is considered to be completed and control passes to action block 176. At action block 176, the cordless cellular base station 10 proceeds with the network update attempt procedure as described in association with FIG. 13 below.

Network Update Attempt

Figure 13:
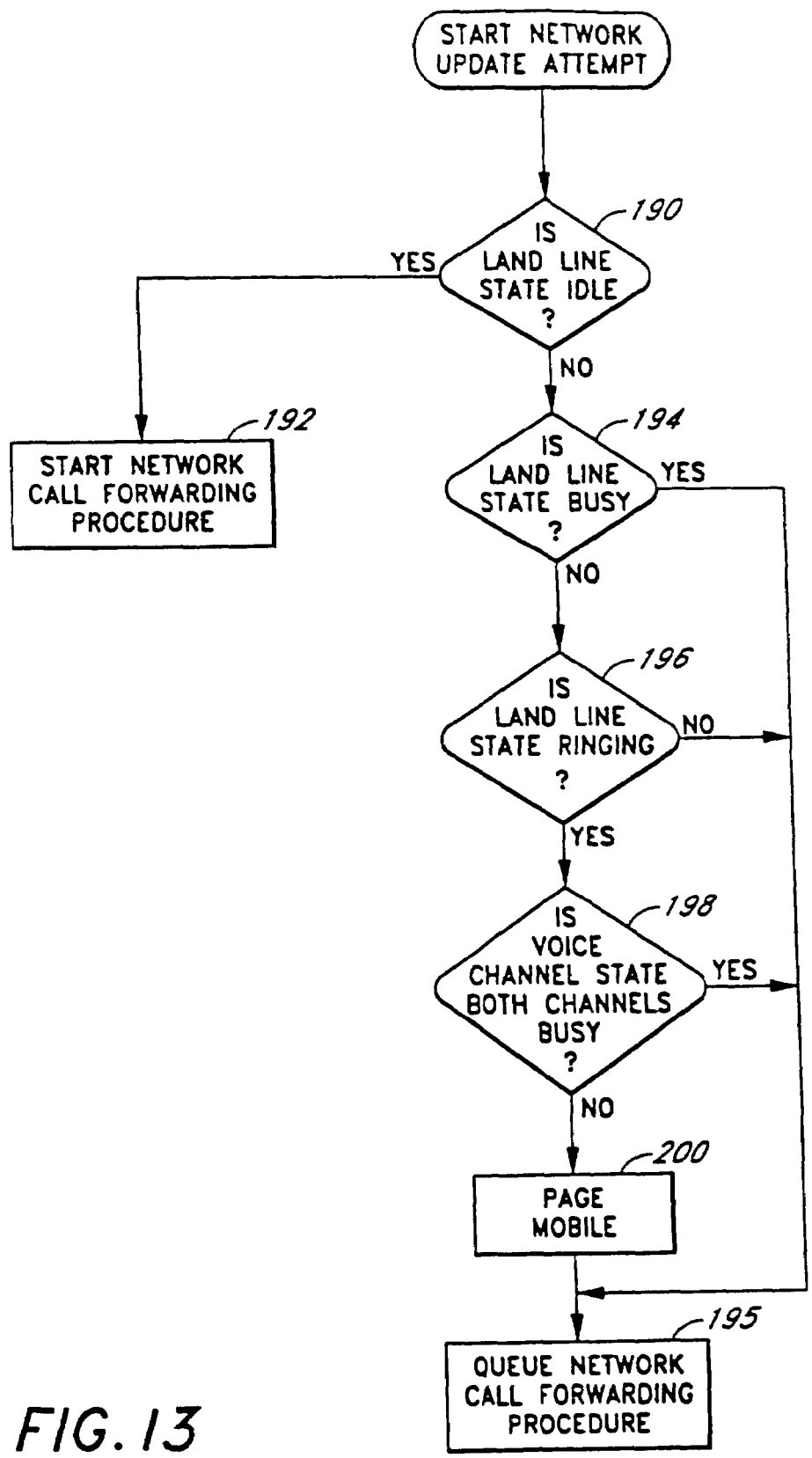
FIG. 13 is a flow chart illustrating the network update attempt procedure of the cordless cellular base station.
Figure 14A:
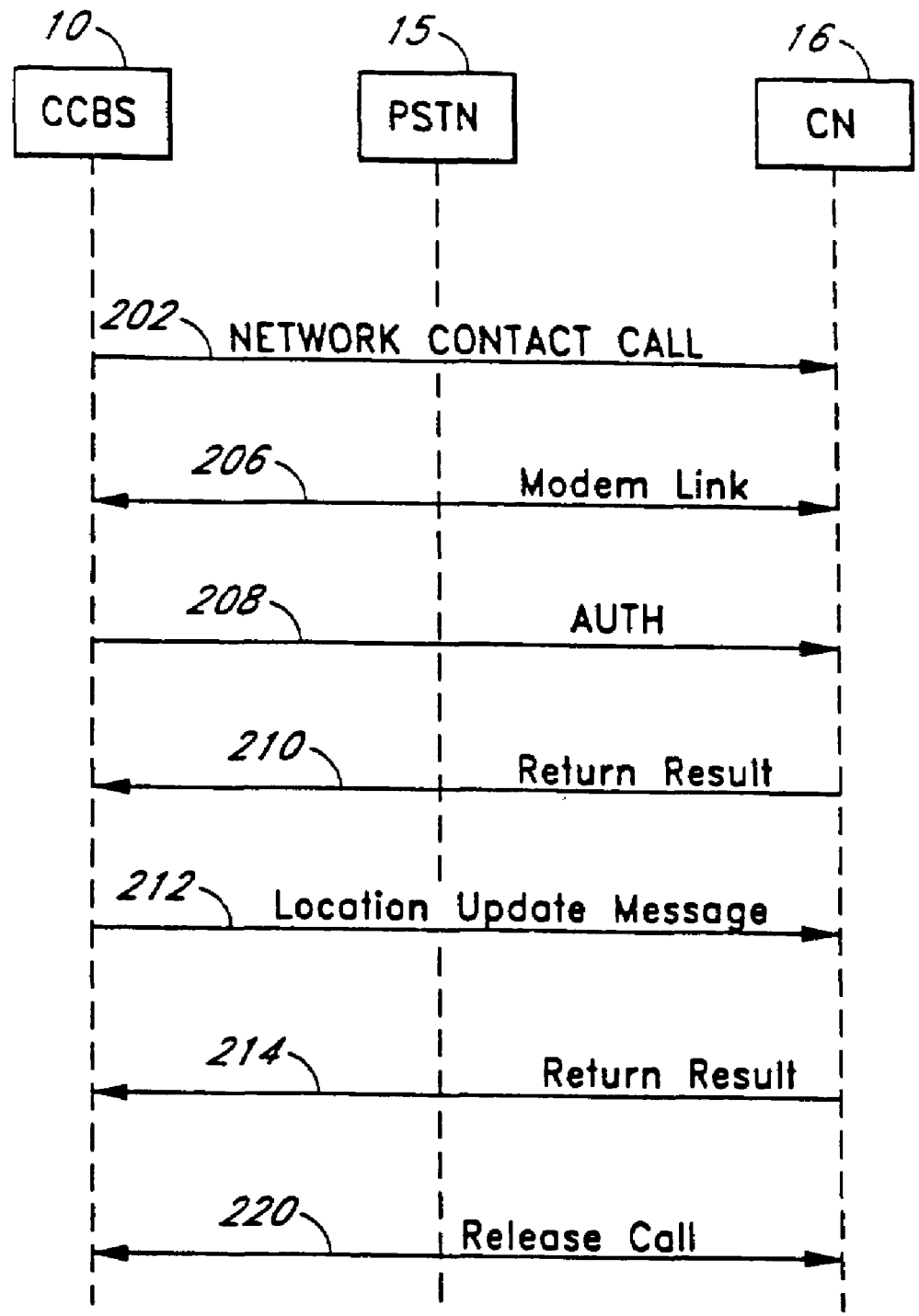
FIG. 14a is a diagram illustrating the steps associated with one embodiment of the cordless cellular base station network update of forwarding feature.
Figure 14B:
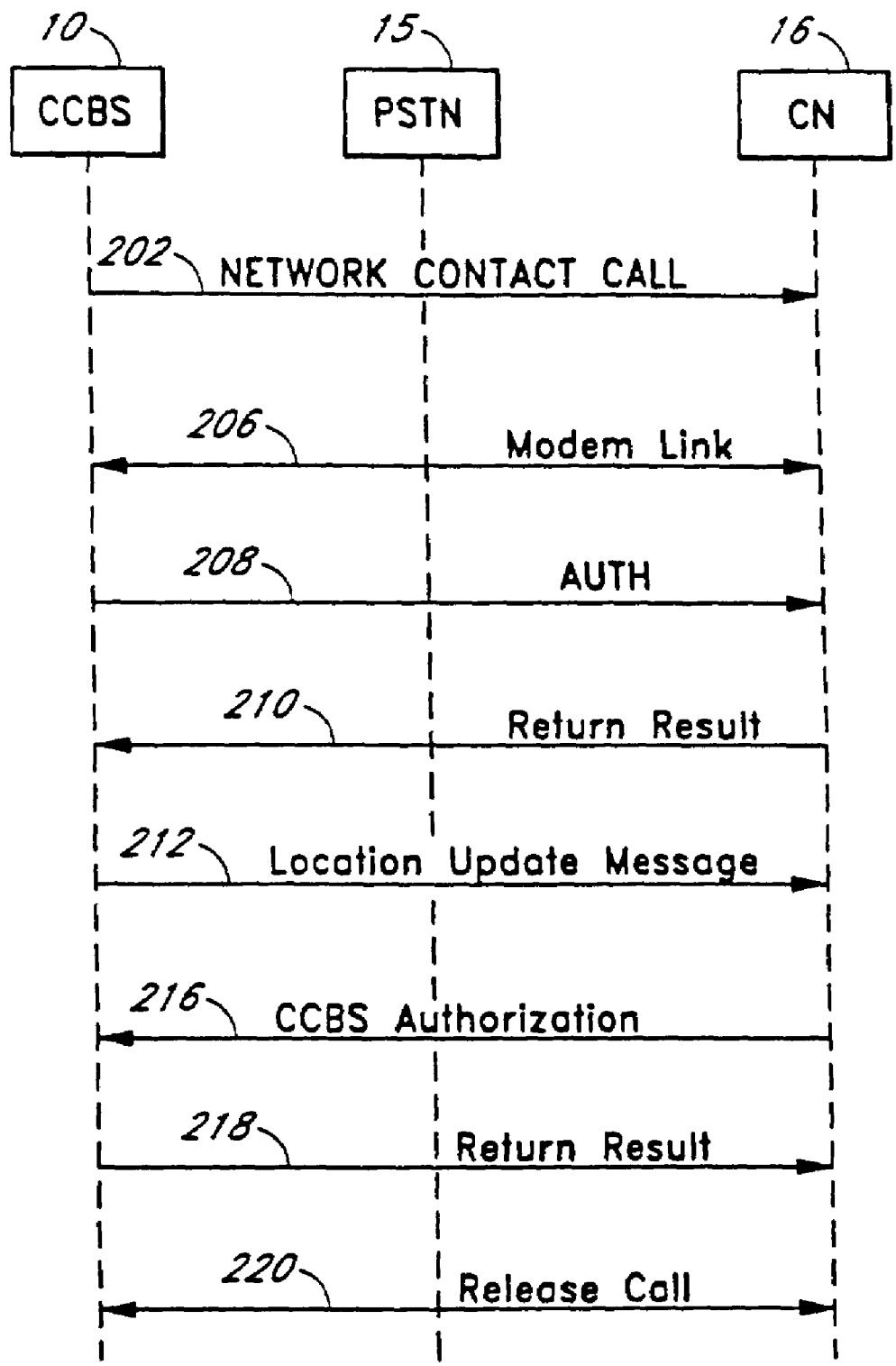
FIG. 14b is a diagram illustrating the steps associated with an alternate embodiment of the cordless cellular base station network update of forwarding feature.

FIG. 13 illustrates the network update attempt procedure that the cordless cellular base station uses to contact the cellular network to inform it of a recent mobile station registration. At decision block 190, the state of the landline 14 associated with the cordless cellular base station 10 is checked to determine if the network call forwarding procedure can be initialized. If at decision block 190, the state of the landline 14 is idle, control passes to action block 192, where the Network Call Forwarding Procedure as described in association with FIGS. 14a and 14b is initiated. If at decision block 190, the state of the landline 14 is not idle, control passes to decision block 194. At decision block 194, the state of the landline is checked to determine if it is busy. If the landline 14 is busy, control passes to decision block 195. If the land line is not busy control passed to decision block 196. At decision block 196, the state of the land line is checked to determine if the landline is ringing. If the land line is not ringing, control passes to action block 195. If the land line is ringing, control passes to decision block 198. At decision block 198, the state of the voice channels for the first and second mobile stations of the cordless cellular base station are checked to see if there is room to add the mobile station onto the ringing call. If both channels are busy, for example, an intercom call between two mobile stations is in progress, control passes to action block 195. If both channels are not busy, control passes to action block 200. At action block 200, the newly added mobile station is paged, in a manner known to those of skill in the art, and can be added on to the present ringing call if the user presses the send key on the mobile station 12. Whether the mobile responds or not, control passes to action block 195.

At action block 195, the Network Call Forwarding Procedure is queued until the cordless cellular base station and the landline are both free and are able to initiate the network call forwarding procedure. The network call forwarding procedure is described below in association with FIGS. 14a and 14b.

Post-Mobile Station Registration

After the mobile station 12 is registered and referring back to FIG. 6, for a new non-primary cordless cellular base station, for a cordless cellular base station that was not previously on the list, the mobile station 12 places the data for this cordless cellular base station 10 in the most recent non-primary cordless cellular base station row 84, just below the row for the primary cordless cellular base station 82. The data for the previous most recent non-primary cordless cellular base station is moved to the next most recent non-primary cordless cellular base station row 86. The row for the least recently used non-primary cordless cellular base station, i.e., the previous next most recent cordless cellular base station row, may be lost. For the most recent non-primary cordless cellular base station row 84, the mobile station 12 places the data regarding the cellular network that it just deregistered from into the table 78. If the cordless cellular base station was already included on the list, the new information simply replaces the information in the old row. The mobile station 12 places the current Country Code in the CC cell, the current System Operator Code in the SOC cell, and the current System Identifier in the SID cell the most recent row as collected from the cordless cellular base station. In addition, the public service profile for the mobile station is inferred from the broadcast neighbor list that is received from the cordless cellular base station 10 as described above.

When the mobile station 12 has registered with the cordless cellular base station 10, the mobile station 12 functions as a cordless telephone mobile station, referred to as operating in the cordless telephone landline service mode. In the cordless mode, the mobile station provides basic and enhanced telephone services over the landline connected to the cordless cellular base station 10. The mobile station supports the enhanced telephone services that are provided by the land network services when it operates in cordless mode, such as call waiting, three-way calling, party line service (i.e., enabling multiple landline numbers to access a single landline), and distinctive ringing services (i.e., different ringing patterns based on the incoming calling number).

Network Call Forwarding

After a successful registration of the mobile station 12 with the cordless cellular base station 10, in a preferred embodiment the cordless cellular base station 10 sends a call forwarding update message to the cellular network 16 requesting that the cellular network 16 route all calls for the mobile station identification number of the registered mobile station 12 to the landline number associated with the cordless cellular base station 10. As indicated above, the CCBS VLR informs the cordless cellular base station during the initial authorization message of which types of registration/deregistration activities the CCBS VLR would like to be informed. For example, some of the types of registrations/deregistrations that the CCBS VLR may want to be informed of include: power down registration, power up registration, location area, forced registration, periodic registration, deregistration, new system registration, ACC to DCCH, or TMSI timeout. In the case when the CCBS VLR wants to be informed of a location area registration, the location update or call forwarding procedure as illustrated in FIG. 14a is executed. The cordless cellular base station (CCBS) 10 dials the stored remote network update number via the PSTN 15 (the cordless cellular base station (CCBS) 10 tries the Remote Network Update Number 1 first and if it is busy it tries the Remote Network Update Number 2) in a network contact calling step 202 (Network Contact Update Call) to contact the cellular network (CN) 16. The cellular network 16 upon answering the call sets up a modem link in step 206. In an authentication step (AUTH) 208, the cordless cellular base station 10 starts an authorization timer and sends an authentication message to the cellular network 16 which includes the mobile system identification number to be updated, the cordless cellular base station identification number and a cordless cellular base station authorization count. The cordless cellular base station authorization count maintains a running count of the number of updates the cordless cellular base station 10 has made over this landline number as a fraud prevention mechanism. The cellular network 16 compares the call number ID (CNI) from the PSTN 15 for the landline number of the cordless cellular base station 10 which made the call with the landline number of the cordless cellular base station 10 stored in a data base on the cellular network 16 and verifies that the mobile system identification number to be updated, the cordless cellular base station identification number and a cordless cellular base station authorization count provided by the cordless cellular base station 10 match the stored values in the cellular network 16. Once the authentication message is processed and validated, a return result message is sent to the cordless cellular base station 10 in step 210 and the cordless cellular base station authorization count is updated. Further, the cellular network sets a message receive timer to see if the cordless cellular base station 10 is going to send it a message in a specified time period. If the authentication message can not be validated, i.e., if any of the above-referenced values do not match, the cellular network 16 breaks the modem connection, releases the call, and exits the procedure.

In the meantime, the cordless cellular base station 10 is waiting to receive the return result message from the cellular network 16. If the return result message is not received during the authentication timer period or if an error result is received, the cordless cellular base station 10 will process the error and may attempt a new connection with the cellular network 16 after a specified period of time has elapsed.

After receiving the return result message, the cordless cellular base station 10 stops the authentication timer, starts a location update timer and sends a location update message to the cellular network 16 in step 212 via a modem link. In a preferred embodiment, the location update message comprises the mobile station identification number (MIN) of the registered mobile station 12 for which the calls are to be forwarded and the landline number to which the cordless cellular base station 10 is connected. The cellular network 16 receives the location update information from the cordless cellular base station 10, verifies that it agrees with the stored parameters in the cellular network 16, and stops the message receive timer. If the parameters received from the cordless cellular base station 10 do not agree with the stored parameters in the cellular network 16, the cellular network 16 sends an error message to the cordless cellular base station 10 and resets the message receive timer. If the message receive timer expires and no message has been received from the cordless cellular base station 10, the cellular network 16 resends the return result message, resets the message receive timer one more time, and waits for a response. If after two timeouts, no message has been received from the cordless cellular base station 10, the network 16 breaks the modem connection, releases the call, and exits the procedure. If the parameters received from the cordless cellular base station 10 agree with the stored parameters in the cellular network 16, the cellular network 16 updates the information stored in the cordless cellular base station visitor location register (CCBS VLR) regarding the mobile station location and sends a return result message in step 214 to the cordless cellular base station 10 over the modem link to verify the receipt of the information.

In the meantime, the cordless cellular base station 10 is waiting to receive the return result message from the cellular network 16. If the return result message is not received during the location update timer period or if an error result is received, the cordless cellular base station 10 will process the error and may attempt to resend the location update message after a specified period of time has passed. Once the return result message has been received by the cordless cellular base station 10, the location update timer is stopped. The cellular network 16 ends the call forwarding update procedure and either the cellular network 16 or the cordless cellular base station 10 releases the call (Release call) in step 220.

FIG. 14b illustrates an alternate embodiment of the call forwarding procedure, which is the same as the procedure in FIG. 14a from steps 202–212. After the location update message is received, the information in the message has been compared with the stored parameters and matches, and the network updates the information regarding the location of the mobile station, the cellular network checks to see if it needs to send an updated authorization message to the cordless cellular base station 10. If the cellular network needs to send an authorization message, instead of sending the return result message 214 as in FIG. 14a, the cellular network 16 sends the cordless cellular base station authorization message which includes the cordless cellular base station identification number and a list of authorized or operational parameters including operational frequencies, which is the same as the initial authorization message described above, and sets a return result timer.

If the location update timer expires and no message have been received from the cellular network 16, cordless cellular base station 10 resends the location update message, resets the timer, and waits for a response. If after two timeouts, no message have been received from the cellular network 16, the cordless cellular base station 10, breaks the modem connection, releases the call, and exits the procedure. If an invalid authorization message is received, the cordless cellular base station 10 sends an authorization error message to the cellular network, resets the timer and may wait for the receipt of a new authorization message.

If a valid authorization message is received by the cordless cellular base station 10 in step 216 over the modem link, the cordless cellular base station 10 updates its operational parameters as received in the message and stops the authorization timer. The cellular network 16 is able to prevent the cordless cellular base station 10 from operating by removing all of its operational frequencies in the cordless cellular base station authorization message. This is a simple way to cancel the service of an unauthorized user. In addition, the network 16 may update the operational parameters, of the cordless cellular base station 10 with the cordless cellular base station authorization message. For example, the cellular network 16 may update the list of operational frequencies of the cordless cellular base station 10, if it is determined that an insufficient number of clear frequencies have been provided to the cordless cellular base station 10. The cordless cellular base station 10 confirms the receipt of the authorization message by sending a return result message to the cellular network 16 in step 218. If the cellular network does not receive the return result message before its return result timer expires, the cellular network 16 resends the CCBS authorization message, resets the return result timer, and waits for a response. If after two timeouts a return result has not been received from the cordless cellular base station 10, the cellular network 16 cancels the call forwarding update, breaks the modem connection, releases the call, and exits the procedure. If the return result message is received, the cellular network 16 ends the call forwarding update procedure and either the cellular network 16 or the cordless cellular base station 10 releases the call (Release call) in step 220.

Figure 15:
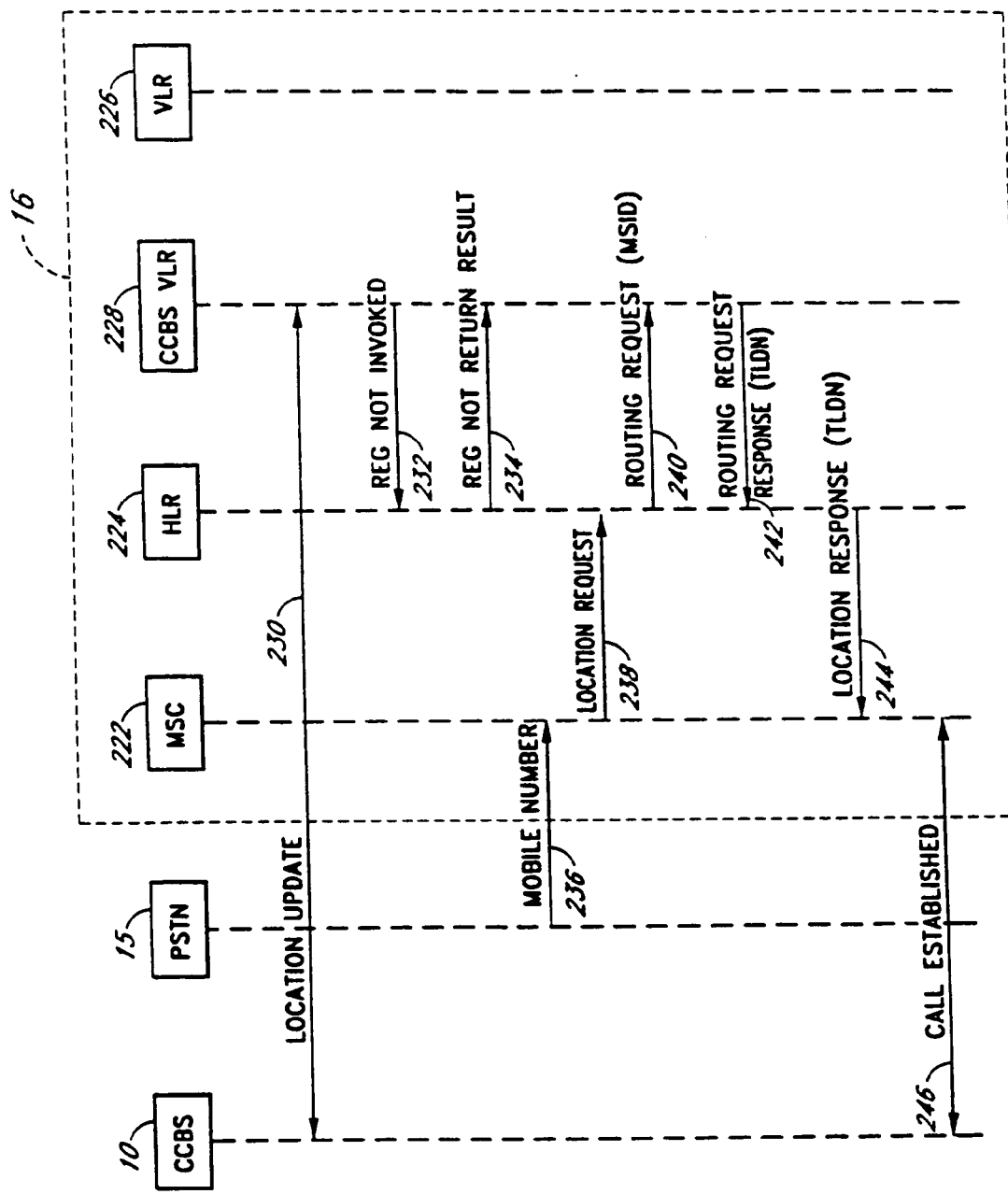
FIG. 15 is a schematic block diagram of the communications between the cordless cellular base station and the cellular network to forward calls for the mobile stations serviced by the cordless cellular base station.

After the call forwarding update process is complete, the cellular network 16 routes all calls for the mobile station identification number of the registered mobile station 12 to the landline number associated with the cordless cellular base station 10. As illustrated in FIG. 15, the cellular network 16 can be broken down into the following components: the mobile switching complex (MSC) 222, the home location register (HLR) 224, a traditional visitor location register (VLR) 226 and the cordless cellular base station visitor location register (CCBS VLR) 228. The mobile switching complex 222, home location register 224 and visitor location register 226 are generally the same as the components that generally exist currently in a standard cellular network, as known to those of skill in the art. The present invention adds the CCBS VLR 228 which is a data base that stores the location, i.e., landline number, of the mobile stations which are being controlled by the cordless cellular base station (CCBS) 10.

When the cordless cellular base station 10 calls the cellular network 16 in step 230, it is communicating with the CCBS VLR 228 to provide the information regarding the location update and location update cancel requests. When the location update request is received by the CCBS VLR 228, the CCBS VLR 228 sends a REG NOT INVOKE message in step 232 to the HLR 224 associated with the mobile station to inform the HLR 224 that the information for routing calls for that particular mobile station identification number is available from the sending CCBS VLR 228. The HLR 224 responds in step 234 with a REG NOT RETURN RESULT message indicating that it has received and accepted the location update message.

When a call is originated by dialing the mobile station identification on the PSTN 15, the call is sent to the MSC 222 in step 236. The originating MSC 222 sends a LOCATION REQUEST message to the mobile station's HLR 224 in step 238. The HLR 224 recognizes that the location of the mobile station is being controlled by the CCBS VLR 228 which contacted it earlier. In step 240, the HLR 224 constructs a ROUTING REQUEST message and sends it to the CCBS VLR 228 that provided the earlier REG NOT INVOKE message providing an update of the mobile's location. THE CCBS VLR 228 locates a TLDN for the landline that the cordless cellular base station is connected to and returns this information to the HLR 224 in a ROUTING REQUEST RESPONSE message in step 242. The HLR 224 adds the MIN and the ESN of the mobile station to the routing information and returns a LOCATION RESPONSE message to the originating MSC 222 in step 244. The MSC 222 places the call over the PSTN 15 and the call is delivered to the landline number for the cordless cellular base station 10 that is routing the calls for the mobile station. The cordless cellular base station 10 pages the mobile stations 12 listed in standby mode as indicated below and the PSTN 15 rings the extension phones attached to the landline number in step 246, thus completing the call forwarding process. If there are two or fewer mobile stations listed in standby mode, the cordless cellular base station pages the mobile station in a conventional manner as a regional cell would page a mobile station, i.e., providing the digital control channel information and the calling number information to enable the mobile station to answer the call if the send button is depressed. If more than two mobile stations are listed in standby mode, all of the mobile stations receive an alert message which enables the phones to ring, but does not include the digital traffic channel information to answer the call. In this case, the cordless cellular base station listens for the first mobile station to depress the send button. The cordless cellular base station will send that mobile station the digital traffic channel information which will enable the mobile station to answer the call. In another embodiment, if the primary user is listed as being in standby mode, the primary user will always be paged with the digital control channel information to answer the call and the remaining mobiles listed as being in standby will be sent the alert message and will ring. If the primary user presses the send button first, the call will be answered immediately. If one of the other mobile stations presses the send button first, the primary user will be unable to answer the call immediately. The cordless cellular base station will send the first responding mobile station the digital traffic channel information. Upon receiving the digital traffic channel information, the other mobile station will be able to answer the call.

Automatic Contact of the Cordless Cellular Base Station by the Cellular Network

In order to enable the cellular network 16 to periodically change the operational parameters of the cordless cellular base station 10, cordless cellular base station 10 preferably includes a preset timer which counts down the amount of time since the cordless cellular base station 10 last contacted the cellular network 16. When the timer expires, the cordless cellular base station 10 automatically contacts the cellular network 16. In the preferred embodiment, the timer is set for thirty days; thus if the cordless cellular base station 10 has not contacted the cellular network 16 within thirty days, for example, to request a location update for a registered mobile station, the cordless cellular base station 10 automatically contacts the cellular network 16. In response the cellular network determines if it is necessary to send the cordless cellular base station a new authorization message. If a new authorization message is required, the cellular network sends the message to the cordless cellular base station. If a new authorization message is not required, the cellular network sends a return result message to the cordless cellular base station. Upon receiving either message from the cellular network, the timer in the cordless cellular base station is reset for thirty days. This feature is advantageous for several reasons.

First, this enables the cellular network 16 to regularly update the operational parameters in the cordless cellular base station 10 to accommodate changes in the service in the area around the cordless cellular base station 10 and to update the cordless cellular base station on any changed features of the cellular network 16. For example, the cellular network 16 may temporarily alter the telephone number that the cordless cellular base station 10 calls to access the location update/call forwarding feature.

In addition, this feature is useful in preventing fraudulent usage of a cordless cellular base station 10. For example, if the owner did not pay the bill for the service and also stopped using the cordless cellular base station 10 or kept the mobile stations exclusively at home but continued the use of the CCBS, it would be difficult for the cellular network 16 to remotely cancel the operation of the cordless cellular base station 10, because the cordless cellular base station 10 may not ever contact the cellular network 16. With the automatic contact feature, the cellular network 16 would automatically contact the cordless cellular base station 10 every thirty days. The network 16 could then send a new authorization message removing all of the operating frequencies from the cordless cellular base station which belonged to the non-paying customer, thus making the cordless cellular base station 10 inoperable.

Call Initiation and Reception

Referring back to FIGS. 1–2, when a call is initiated by a registered mobile station 12 that is in the standby mode, the cordless cellular base station 10 will process the air interface transaction required to establish a cellular originated call and connect it to the landline service. Before connecting the call to the land line 14, however, the cordless cellular base station 10 preferably checks first to see if the phone number matches the MIN for one of the other mobile stations 12 which is listed in standby mode in the registration table 113 (FIG. 8) on the cordless cellular base station 10. If the phone number matches a MIN for the one of the mobile stations 12 listed in standby mode, the cordless cellular base station 10 pages that mobile station 12 and initiates an intercom conversation between the two mobile stations. The intercom feature is described in more detail below. The intercom conversation does not make the landline 14 busy, so the wireline extensions connected to the landline 14 can initiate and receive calls over the landline 14 associated with the cordless cellular base station 10.

If one of the mobile stations calls the landline number associated with the cordless cellular base station 10, only the mobile stations 12 listed as being in standby mode will ring. This is for two reasons. First, the cordless cellular base station 10 does not have the capability of ringing the phones associated with the landline 14 as the ring signal for those phones are provided by the PSTN 15. Further, while it might be possible to set the cordless cellular base station 10 up so it could call the other land line extensions (e.g., by requiring that the CCBS be connected to two separate PSTN lines), this would add some significant expense for very little additional value. Thus, this is not a preferred embodiment.

When a call is received on the landline 14 associated with the cordless cellular base station 10, all the extensions connected to the landline 14 ring and the cordless cellular base station 10 pages all registered mobile stations 12 which are in the standby state. The mobile stations 12 answer the call by pressing a send button on the mobile station 12, the cordless cellular base station 10 transmits the voice signals between the landline 14 and the mobile station 12. Any of the extensions associated with the landline number 14 or any of the mobile stations 12 can answer the ringing.

If more than one mobile station 12 answers the call by pressing a send button on a mobile station 12, the cordless cellular base station 10 bridges the call such that each mobile station 12 acts as an "extension." In the preferred embodiment, the cordless cellular base station 10 can bridge up to two mobile stations 12 on a single call. If a third mobile station or more attempts to add to the call, the additional mobile stations 12 are denied access to the cordless cellular base station 10 and are not added to the call, thus remaining in standby mode. If at any time a call being handled by the cordless cellular base station 10 is in progress and only one mobile station is listed as being active, a second mobile station 12 in standby mode can be added to the call by pressing the send button on the second mobile station 12. The ability to bridge two calls requires sending two voice signals from the cordless cellular base station 10 to the listener mobile stations 12, as described in more detail below is association with FIGS. 16–18. If it would be desirable to add additional mobile stations 12 beyond two mobile stations 12 to the same call, additional transceivers could be added to the cordless cellular base station 10, as known to those of skill in the art.

Bridging Two Calls on the Cordless Cellular Base Station

When there are two mobile stations 12 bridged by the cordless cellular base station CCBS 10 to a call on the PSTN 15, the cordless cellular base station 10 is able to match the functionality and performance of regular extension telephone operation. Each mobile station 12 is able to receive the voice data from both the other mobile station and the signals from the PSTN 15.

Figure 16:
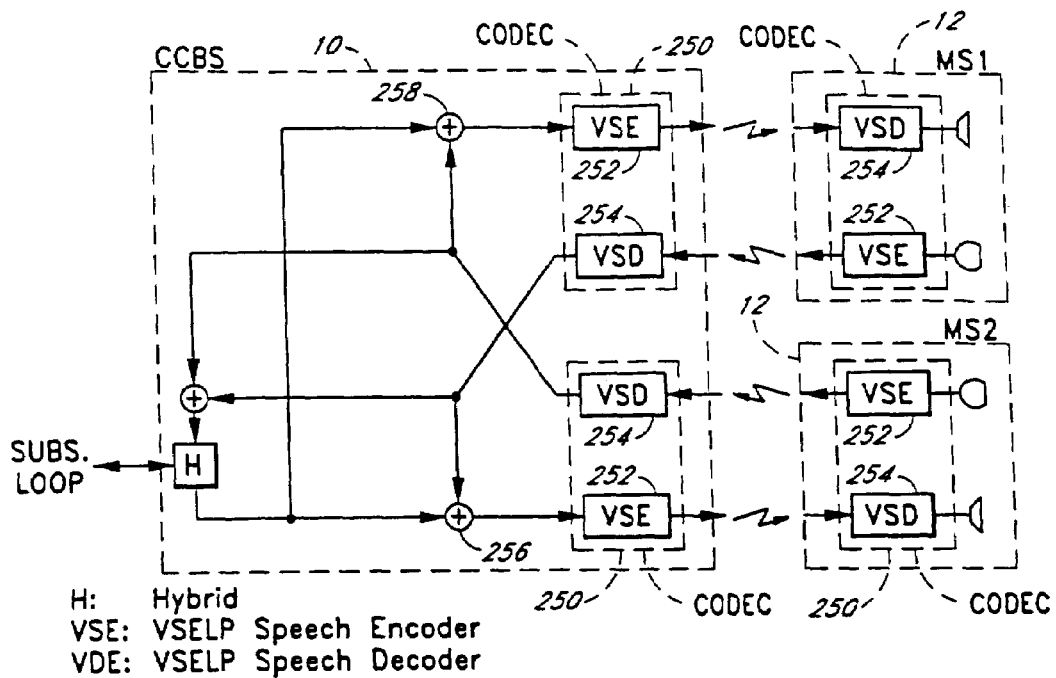
FIG. 16 is a schematic block diagram illustrating one embodiment of the extension voice combining circuitry of the cordless cellular base station.

The preferred embodiment utilizes a system in which the sum of the mobile station 12 and the PSTN 15 voice signals are encoded. As shown in FIG. 16, the cordless cellular base station (CCBS) 10 utilizes a CODEC 250 which contains a VSELP speech encoder (VSE) 252 and a VSELP speech decoder (VSD) 254 as known to those of skill in the art. For simplicity, FIG. 16 shows that two CODECs are used for the cordless cellular base station 10. In the preferred embodiment, only a single CODEC 250 is used and the transmission to/from each mobile station 12 is shifted in time, thus enabling a single CODEC in the cordless cellular base station 10 to encode and decode voice signals for both mobile stations 12. In the preferred embodiment, the communication or voice signals from a first mobile station (MS1) are digitally encoded by the VSELP speech encoder (VSE) 252 and are preferably sent to the cordless cellular base station 10 using the IS-136 cellular communication protocol. The signal is received by the cordless cellular base station 10 and is decoded by the VSELP speech decoder (VSD) 254 to a voice signal. The voice signal from the first mobile station is summed at summer 256 with the voice signal that was received from the PSTN 15 and was coded by the 2-wire to 4-wire hybrid device (H). The summed signal is then encoded by the VSELP speech encoder USE) 252 into a digitally compressed signal which is sent to the second mobile station (MS2) using the IS-136 cellular communications protocol. The second mobile station decodes the digitally compressed signal using the VSELP speech decoder (VSD) 254 to an audio voice signal for the listener to hear. In this way, the user of the second mobile station is able to listen to the voices of both parties on the PSTN 15 and on the first mobile station.

Similarly, the audio communication from the second mobile station (MS2) are digitally encoded by the VSELP speech encoder (VSE) 252 and are sent to the cordless cellular base station 10 using the IS-136 cellular communication protocol. The signal is received by the cordless cellular base station 10 and is decoded by the VSELP speech decoder (VSD) 254 to a voice signal. The voice signal from the second mobile station is summed at summer 258 with the voice signal received from the PSTN 15 and encoded by the hybrid device (H). The summed signal is then encoded by the VSELP speech encoder (VSE) 252 into a digitally compressed signal which is sent to the first mobile station (MS1) using the IS-136 cellular communications protocol. The first mobile station decodes the digitally compressed signal using the VSELP speech decoder (VSD) 254 to an audio voice signal for the listener to hear. In this way, the user of the first mobile station is able to listen to the voices of both parties on the PSTN 15 and on the second mobile station. The voice signal from the second mobile station is summed with the voice signal received from the first mobile station and are encoded by the hybrid device (H) for delivery to the user on the PSTN 15.

Figure 17:
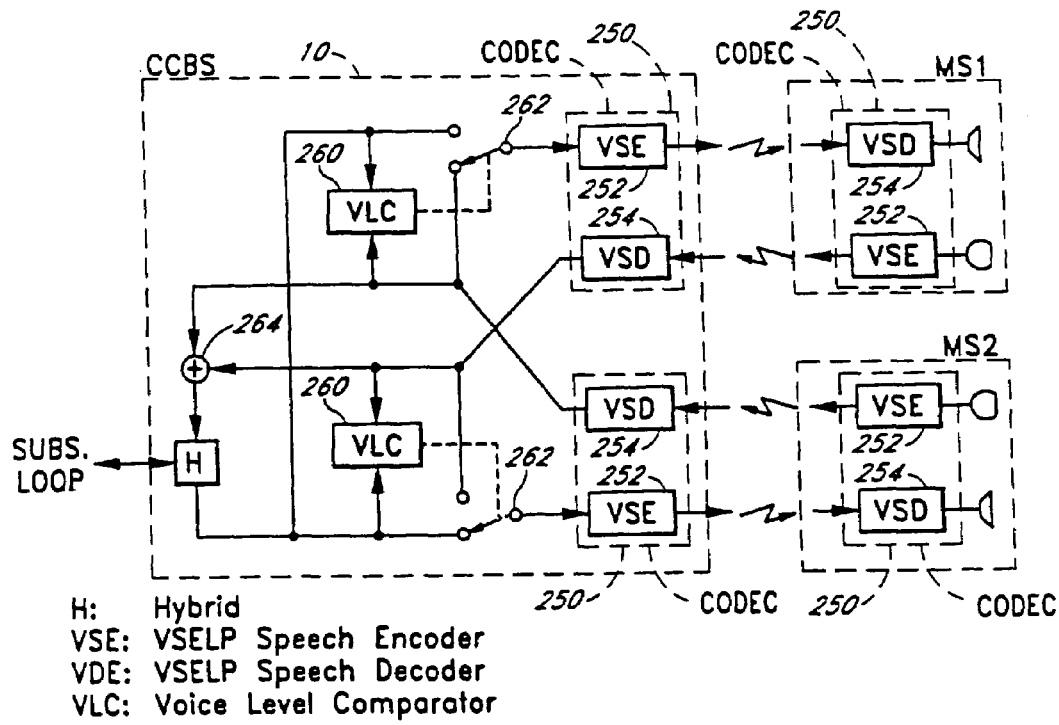
FIG. 17 is a schematic block diagram illustrating a second embodiment of the extension voice combining circuitry of the cordless cellular base station.

In a second embodiment, as shown in FIG. 17, the cordless cellular base station 10 compares a voice signal from one mobile station with the voice signal from the PSTN and whichever is louder is sent to the other mobile station. Similar to the embodiment of FIG. 16, the cordless cellular base station utilizes a CODEC 250 which contains a VSELP speech encoder (VSE) 252 and a VSELP speech decoder (VSD) 254 as known to those of skill in the art. For simplicity, FIG. 17 shows that two CODECs are used by the cordless cellular base station 10. In the preferred embodiment, only a single CODEC 250 is used and the transmission to/from each mobile station is shifted in time, thus enabling a single CODEC in the cordless cellular base station to encode and decode voice signals for both mobile stations. In the preferred embodiment, the communication or voice signals from a first mobile station (MS1) are digitally encoded by the VSELP speech encoder (VSE) 252 and are sent to the cordless cellular base station 10 using the IS-136 cellular communication protocol. The signal is received by the cordless cellular base station 10 and is decoded by the VSELP speech decoder (VSD) 254 to a voice signal. The voice signal from the first mobile station is compared to the voice signal that was received from the PSTN 15 and was coded by the hybrid device (H) by a voice level comparator (VLC) 260. The voice level comparator 260 selects which of the two signals is louder and controls the operation of a switch 262 to enable the louder of the two signal to pass to the VSELP encoder (VSE) 250 for the second mobile station (MS2) which is encoded into a digitally compressed signal which is sent to the second mobile station (MS2) using the IS-136 cellular communications protocol. The second mobile station decodes the digitally compressed signal using the VSELP speech decoder (VSD) 254 to an audio voice signal for the listener to hear. In this way, the user of the second mobile station is only able to listen to the voice of the louder of the parties on the PSTN 15 and on the first mobile station.

Similarly, the communications or voice signals from a second mobile station (MS2) are digitally encoded by the VSELP speech encoder (VSE) 252 and are sent to the cordless cellular base station 10 using the IS-136 cellular communication protocol. The signal is received by the cordless cellular base station and is decoded by the VSELP speech decoder (VSD) 254 to a voice signal. The voice signal from the second mobile station is compared to the voice signal that was received from the PSTN 15 and was coded by the hybrid device (H) by a voice level comparator (VLC) 260. The voice level comparator 260 selects which of the two signals is louder and controls the operation of a switch 262 to enable the louder of the two signal to pass to the VSELP encoder (VSE) 252 for the first mobile station (MS1) which is encoded into a digitally compressed signal which is sent to the first mobile station (MS1) using the IS-136 cellular communications protocol. The first mobile station decodes the digitally compressed signal using the VSELP speech decoder (VSD) 254 to an audio voice signal for the listener to hear. In this way, the user of the first mobile station is only able to listen to the voice of the louder of the parties on the PSTN 15 and on the second mobile station. Further, the voice signal from the second mobile station is summed with the voice signal received from the first mobile station at summer 264 and are encoded by the hybrid device (H) for delivery to the user on the PSTN 15. In this way, the user on the PSTN 15 can listener to both of the mobile stations regardless of which one is louder.

Figure 18:
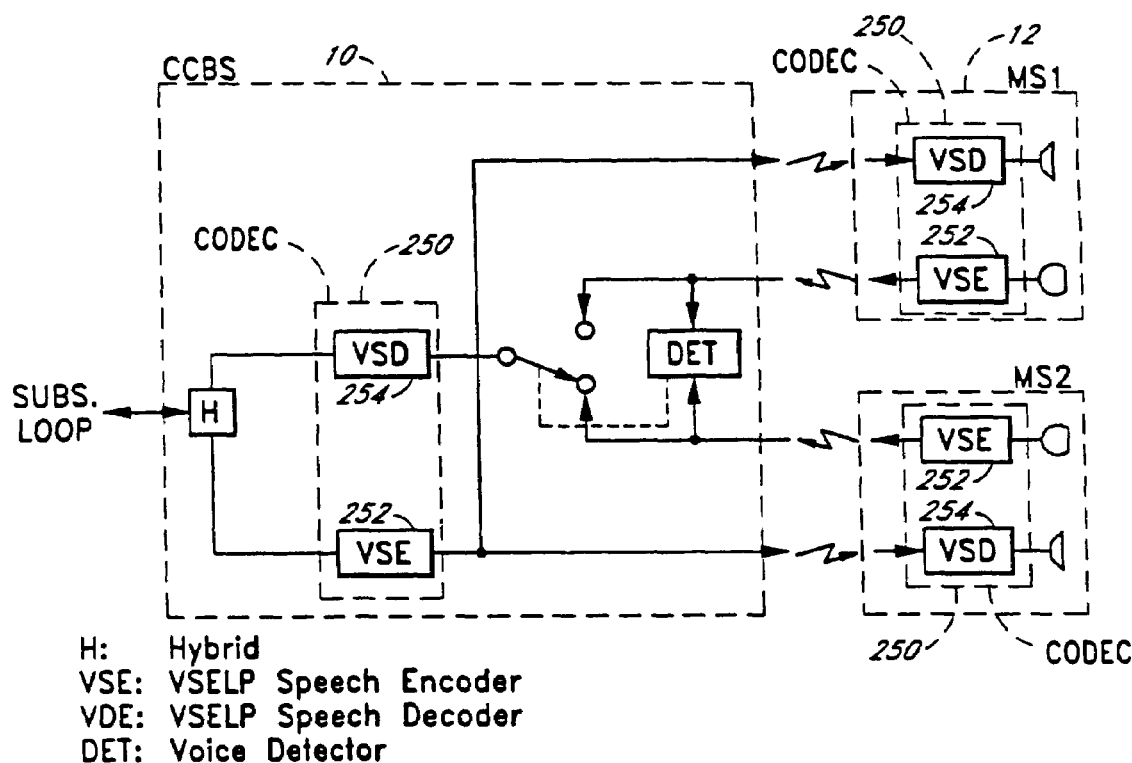
FIG. 18 is a schematic block diagram illustrating a third embodiment of the extension voice combining circuitry of the cordless cellular base station.

In a third embodiment, as shown in FIG. 18, the cordless cellular base station 10 listens for whichever of the two mobile stations is sending the louder signal and accepts the voice communication from that mobile station. The cordless cellular base station 10 utilizes a CODEC 250 which is made up of a VSELP speech encoder (VSE) 252 and a VSELP speech decoder (VSD) 250 as known to those of skill in the art. In the preferred embodiment, a single CODEC 250 is used to encode and decode voice signals for both mobile stations. In the preferred embodiment, the communication or voice signals from a first mobile station (MS1) are digitally encoded by the VSELP speech encoder (VSE) 252 and are sent to the cordless cellular base station 10 using the IS-136 cellular communication protocol. Similarly, the communication or analog voice signals from a second mobile station (MS2) are digitally encoded by the VSELP speech encoder (VSE) 252 and are sent to the cordless cellular base station 10 using the IS-136 cellular communication protocol. A detector 266 determines which of the two signals is the louder and passes that signal to the VSELP speech decoder (VSD) 254 which is decoded to a voice signal and is sent to the hybrid for the listener on the PSTN 15 to hear. The signal from the PSTN 15 is sent through the hybrid and to the VSELP encoder (VSE) 252 where the signal is digitally compressed. The signal from the VSELP encoder (VSE) 252 is sent to both the first and second mobile station (MS2) using the IS-136 cellular communications protocol. Once the signal is received at each of the mobile stations (MS1/MS2), they respectively decode the digitally compressed signal using the VSELP speech decoder (VSD) 254 to an audio voice signal for the listeners to hear. In this way, the users of the first and second mobile stations are able to listen to the voice of the party on the PSTN 15; however, the user of each of the mobile stations is unable to hear what is being said by the user of the other mobile station.

Intercom Feature

If no call is in progress, the cordless cellular base station 10 has an intercom capability to connect the standby registered mobile stations 12 with each other through the cordless cellular base station 10. Using FIG. 16 as an example of the cordless cellular base station 10 circuitry, in the intercom feature, two mobile stations 12 are connected to the cordless cellular base station 10, and there is no speech connection to the PSTN 15. The cordless cellular base station 10 relays the encoded speech data stream from each mobile station 12 to the other without decoding in the cordless cellular base station 10. Each mobile station 12 decodes the received encoded speech data from the other mobile station 12 for the user to hear. Thus, the VSELP processing in the cordless cellular base station described in association with FIGS. 16–18 is bypassed when the intercom feature is used.

Mobile Station Deregistration

The mobile station 12 sends a Power-Down deregistration (which is an IS-136 message) to the cordless cellular base station 10 when the power to the mobile station 12 is turned off. In addition, the mobile station 12 deregisters from the cordless cellular base station 10 when the cordless cellular base station's signal becomes too weak, i.e., when the mobile station 12 moves out of the range of the cordless cellular base station 10 or when the user presses a soft key sequence on the keypad of the mobile station 12 and forces a deregistration. Upon receipt of any of the deregistration requests listed above, the cordless cellular base station 10 updates the status of the mobile station 12 in the registration list (FIG. 8) from an "active" or "standby" status to a dormant status. Further, the cordless cellular base station 10 preferably informs the cellular network 16, so that the routing of calls for the mobile station identification number (MIN) to the landline number is disabled. The mobile station 12 may then register with the regional cellular network 16, using measurements of the received signal strengths for the neighboring cells, as is known to those of skill in the art.

In an alternate embodiment, the cordless cellular base station 10 may request that the mobile station 12 register periodically. In one preferred embodiment, the mobile station 12 registration period is approximately every five minutes; that is, the mobile station 12 needs to register with the cordless cellular base station 10 at least every five minutes to maintain a connection with the cordless cellular base station 10. If the registration of the mobile station 12 is not detected during the five minute registration period, the cordless cellular base station 10 automatically deregisters the mobile station 12, utilizing the deregistration procedure described above.

As described above, typically, when the mobile station 12 severs contact with the cordless cellular base station 10, the cordless cellular base station 10 sends a network forwarding cancellation message to the CCBS VLR to cancel the forwarding of calls for the mobile station identification number to the landline number associated with the cordless cellular base station 10. The cordless cellular base station 10 is informed during the initial authorization message of which types of registration/deregistration activities that the CCBS VLR wants to be informed. Some examples of types of deregistration events for which the network may want to be contacted are: when the mobile station is turned off, i.e., a power down deregistration, when a manual cancellation of the cordless service mode occurs, i.e., forced deregistration, etc. If one of the specified deregistration events occur, the cordless cellular base station sends a network cancellation message to the CCBS VLR. If the cordless cellular base station 10 is unable to complete the network cancellation of the call forwarding feature on the first attempt, a second attempt is made. If the second attempt is also unsuccessful, no additional actions are required of the cordless cellular base station 10. The calls for the mobile station 12, however, will continue to be forwarded to the landline number associated with the cordless cellular base station 10 until the mobile station 12 registers with the cellular network 16 which will automatically update its location and will therefore cancel the old call forwarding message.

Network Forwarding Cancellation

Typically, when the mobile station severs contact with the cordless cellular base station 10, the cordless cellular base station 10 sends a network forwarding cancellation message to the cellular network 16 to cancel the forwarding of calls for the mobile station identification number to the landline number associated with the cordless cellular base station 10. As indicated above, the CCBS VLR informs the cordless cellular base station during the initial authorization message of which types of registration/deregistration activities that the CCBS VLR would like to be informed.

Figure 19A:
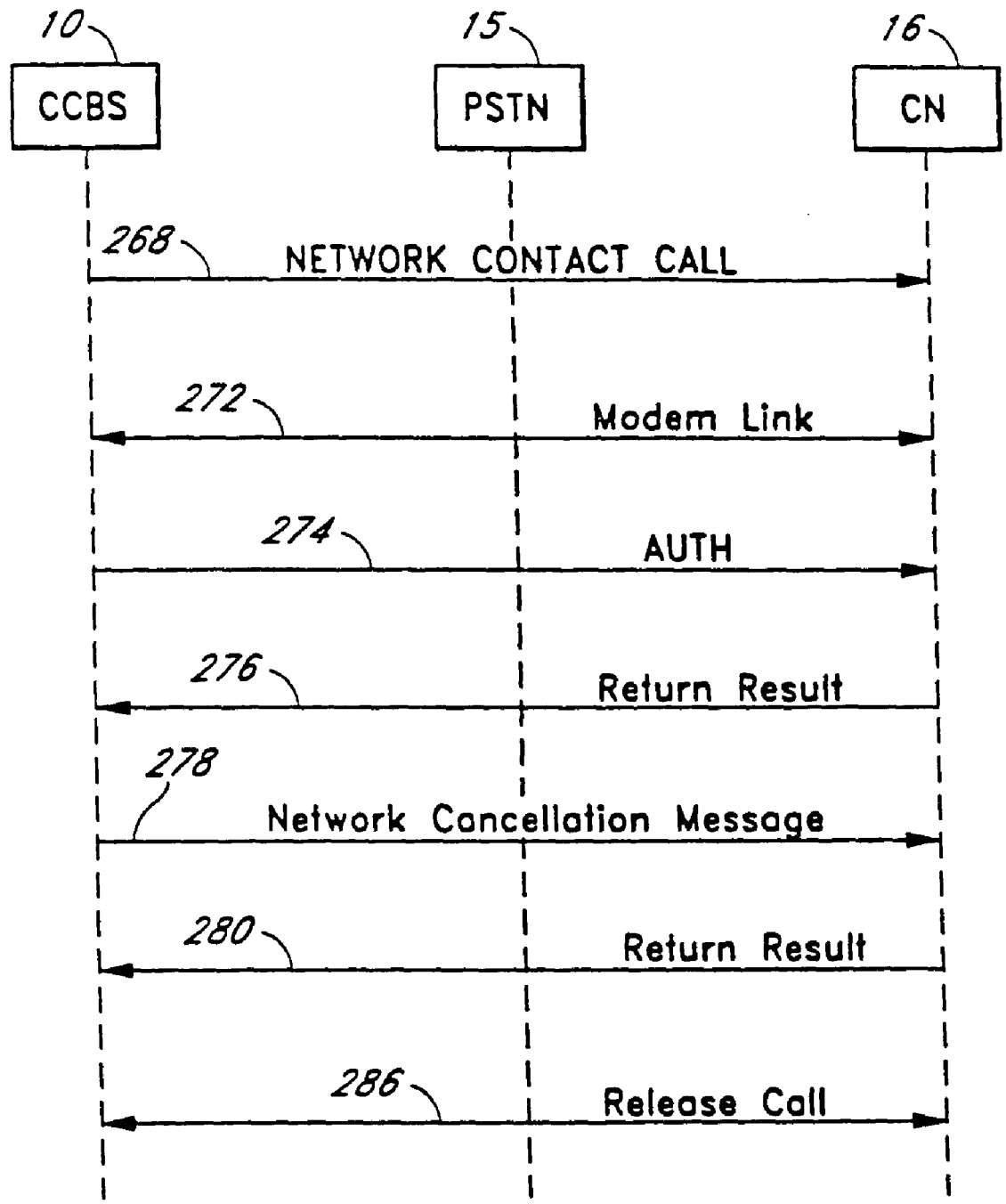
FIG. 19a is a diagram illustrating the steps associated with one embodiment of the cordless cellular base station network cancellation of forwarding feature.

When it is appropriate to notify the CCBS VLR of the deregistration of the mobile station, the network forwarding cancellation procedure as illustrated in FIG. 19*a* is initiated. The cordless cellular base station (CCBS) 10 calls the remote network update number (the CCBS 10 tries the Remote Network Update Number 1 first and if it is busy it tries the Remote Network Update Number 2) in a network contact calling step (Network Contact Call) 268 via the public switched telephone network 15, to contact the cellular network (CN) 16. The cellular network 16 upon answering the call sets up a modem link in step 272. In an authentication step (AUTH) 274, the cordless cellular base station 10 starts an authorization timer and sends an authentication message to the cellular network 16 which includes the cordless cellular base station identification number and a cordless cellular base station authorization count for the landline number. Further, the authentication message may include the mobile system identification number for which the call forwarding message is to be canceled. If a mobile system identification number is not included, the cellular network 16 will cancel the call forwarding for all of the mobile stations currently registered with the cordless cellular base station 10. The cordless cellular base station authorization count maintains a running score of the number of updates the cordless cellular base station 10 has made over this landline number as a fraud prevention mechanism. The cellular network 16 compares the call number ID (CNI) from the PSTN for the landline number of the cordless cellular base station 10 which made the call with the landline number for the cordless cellular base station 10 stored in a data base on the cellular network 16. In addition, the cellular network 16 verifies that the mobile system identification number to be updated, if included, the cordless cellular base station identification number and a cordless cellular base station authorization count provided by the cordless cellular base station 10 match the stored values in the cellular network 16. Once the authentication message is processed and validated, a return result message is sent to the cordless cellular base station 10 in step 276 and the cordless cellular base station 10 authorization count is updated. Further, the cellular network 16 sets a message receive timer to see if the cordless cellular base station 10 is going to send it a message. If the authentication message cannot be validated, i.e., if any of the above-referenced values do not match, the cellular network 16 breaks the modem connection, releases the call, and exits the procedure.

In the meantime, the cordless cellular base station 10 is waiting to receive the return result message from the cellular network 16. If the return result message is not received during the authentication timer period or if an error result is received, the cordless cellular base station will process the error and may attempt a new connection with the cellular network 16 after a specified period of time has elapsed.

After receiving the return result message, the cordless cellular base station 10 stops the authentication timer, starts a message receive timer and sends a network cancellation message to the cellular network 16 to cancel the forwarding of calls to the cordless cellular base station in step 278 via a modem link. In a preferred embodiment, the network cancellation message comprises at least the landline number to which the cordless cellular base station 10 is connected. In addition, the network cancellation message may include the mobile system identification number for the mobile station to which the call forwarding cancellation is to apply. If the mobile station identification number is not provided, the cellular network 16 cancels the call forwarding feature for all mobile stations which are serviced by the cordless cellular base station 10 that is connected to the designated landline. The cellular network 16 receives the network cancellation message from the cordless cellular base station 10, verifies that it agrees with the stored parameters in the cellular network 16, and stops the message receive timer. If parameters received from the cordless cellular base station 10 do not agree with the stored parameters in the cellular network 16, the cellular network 16 sends an error message to the cordless cellular base station 10 and resets the message receive timer. If the message receive timer expires and no message has been received from the cordless cellular base station 10, the network 16 resends the return result message, resets the message receive timer, and waits for a response. If after two timeouts, no message has been received from the cordless cellular base station 10, the network 16 breaks the modem connection, releases the call, and exits the procedure. If the parameters received from the cordless cellular base station 10 agree with the stored parameters in the cellular network 16, the cellular network 16 updates the information stored in the cordless cellular base station visitor location register (CCBS VLR) regarding the location of the mobile station and sends a return result message in step 280 to the cordless cellular base station 10 over the modem link to verify the receipt of the information.

In the meantime, the cordless cellular base station 10 is waiting to receive the return result message from the cellular network 16. If the return result message is not received during the message receive timer period or if an error result is received, the cordless cellular base station 10 will process the error and may attempt to resend the location update message after a specified period of time has passed. Once the return result message has been received by the cordless cellular base station 10, the message receive timer is stopped. The cellular network ends the call forwarding cancellation procedure and either the cellular network 16 or the cordless cellular base station 10 releases the call (Release call) in step 286.

Figure 19B:
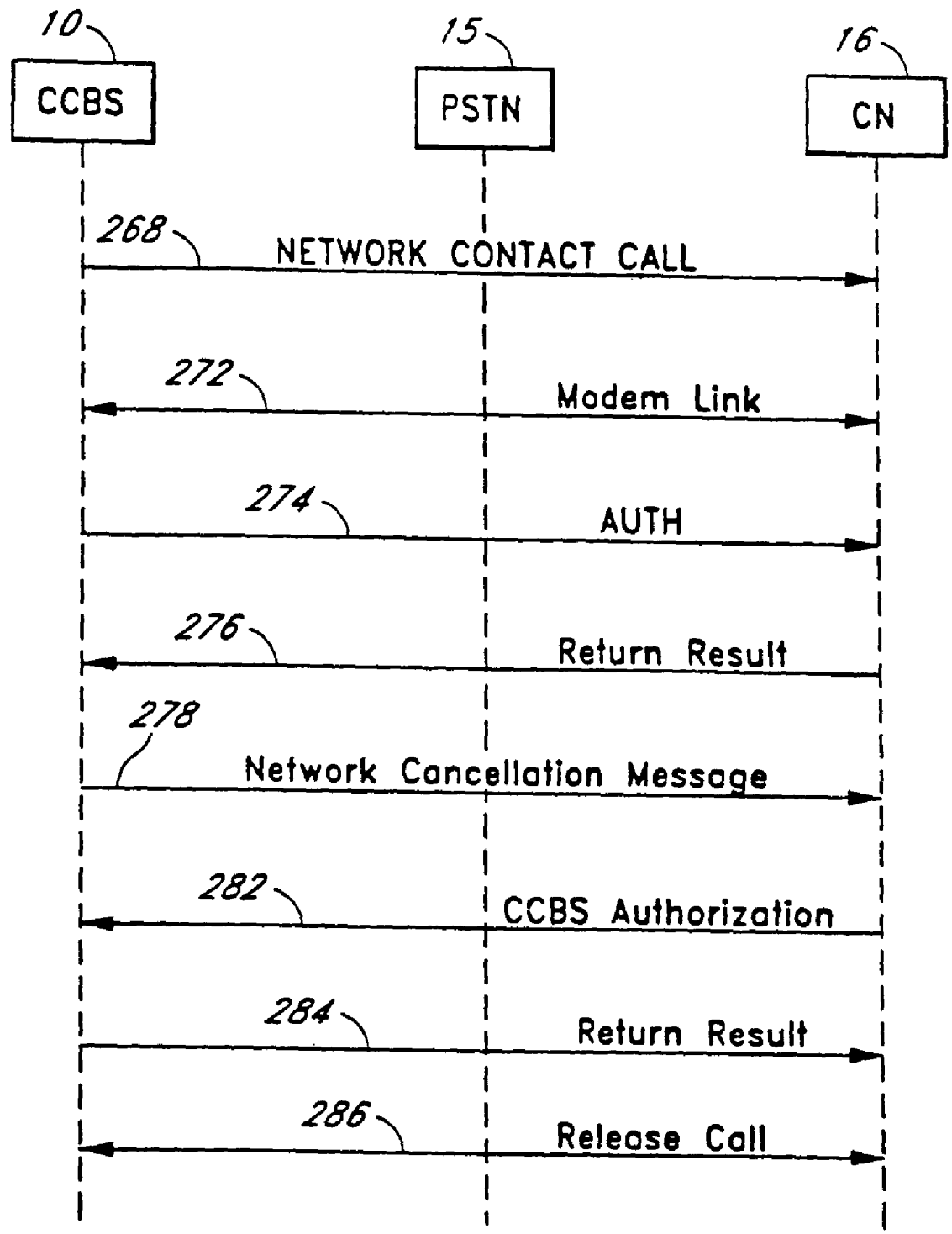
FIG. 19b is a diagram illustrating the steps associated with an alternate embodiment of the cordless cellular base station network cancellation of forwarding feature.

FIG. 19b illustrates an alternate embodiment of the network forwarding cancellation procedure, which is the same as the procedure in FIG. 19a from steps 268–278. After the network cancellation message is received, the information in the message has been compared with the stored parameters and matches, and the network updates the information regarding the location of the mobile station, the cellular network checks to see if it needs to send an updated authorization message to the cordless cellular base station 10. If the cellular network needs to send an authorization message, instead of sending the return result message as in FIG. 19a, the cellular network 16 sends the cordless cellular base station authorization message in step 282, which includes the cordless cellular base station identification number and a list of operational frequencies, which is the same as the initial authorization message described above, and sets a return result timer. If the message receive timer expires and no message has been received from the cellular network 16, cordless cellular base station 10 resends the network cancellation message, resets the timer, and waits for a response. If after two timeouts, no message has been received from the network 16, the cordless cellular base station 10 breaks the modem connection, releases the call, and exits the procedure. If an invalid authorization message is received, the cordless cellular base station 10 sends an authorization error message to the cellular network 16, resets the timer, and may wait for the receipt of a new authorization message.

If a valid authorization message is received by the cordless cellular base station 10 in step 282 over the modem link, the cordless cellular base station 10 updates its operational parameters as received in the message and stops the authorization timer. The cellular network 16 is able to revoke the cordless cellular base station's operational authority or update the operational parameters of the cordless cellular base station 10 with the cordless cellular base station authorization message. The cordless cellular base station 10 confirms the receipt of message by sending a return result message to the cellular network 16 in step 284. If the cellular network 16 does not receive the return result message before its return result timer expires, the cellular network 16 the CCBS authorization message, resets the return result timer, and waits for a response. If after two timeouts no message has been received from the cordless cellular base station 10, the cellular network 16 cancels the call forwarding update, breaks the modem connection, releases the call, and exits the procedure. If the return result message is received, the cellular network ends the call forwarding cancellation procedure and either the cellular network 16 or the cordless cellular base station 10 releases the call (Release call) in step 286.

After the call forwarding cancellation process is complete, the cellular network 16 no longer routes all calls for the mobile station identification number of the registered mobile station 12 to the landline number associated with the cordless cellular base station 10. The procedure for how the cancellation is updated within the cellular network is similar to the process described in association with FIGS. 19a and 19b above for the initiation of the call forwarding except that the CCBS VLR 228 revokes its location change request from the HLR 224, and it lets the HLR 224 handle all of the requests for the mobile station 12.

Interference Measurement and Avoidance

General Overview of Procedure

Referring back to FIGS. 1 and 2, the cordless cellular base station 10 is designed to operate in the residential home or office environment. This environment can be potentially very noisy because potentially no dedicated frequency spectrum is allocated for the cordless cellular base station operation coupled with the fact that the CCBS frequency usage is not explicitly coordinated with the regional cellular network's frequency use. The cordless cellular base station 10 has to co-exist in the same cellular band used by the regional cellular network 16 and views the regional cellular network 16 as a source of background interference. The cordless cellular base station 10 attempts to avoid the potential interference by the cellular network 16 by choosing frequencies which, as far as the cordless cellular base station 10 can determine, are not being used by nearby regional cells 18 or by other nearby cordless cellular base stations 10.

Since the regional cellular network 16 is unaware of the operating frequency of the cordless cellular base station 10, it is likely that this system will occasionally assign voice or control traffic to a channel on which the cordless cellular base station is operating. Further, it is possible that another cordless cellular base station 10 located close by could be using the same frequency. When such a "collision" between the cordless cellular base station 10 and a regional cellular network 16 happens, priority is given to the regional cellular base station 18.

Preferably, the cordless cellular base station 10 implements a channel selection algorithm using software instructions, which are stored in the memory of the cordless cellular base station 10. The processor of the cordless cellular base station preferably operates on the instructions to implement the channel selection algorithm. Since the uplink and downlink channels are assigned in pairs, it is not necessary to constantly monitor both the uplink and downlink frequencies of each pair to determine if the pair is clear. The channel selection algorithm of the preferred embodiment scans the downlink frequencies in the cellular band and determines the best and the next-best downlink cellular frequencies for cordless operation at all times, as described in more detail below. In brief, the cordless cellular base station 10 periodically measures received signal strength (RSS) for each of the authorized downlink frequencies of the cordless cellular base station 10. In addition, the cordless cellular base station takes RSS measurements on the current uplink operational frequency. Finally, when a call is in progress, the cordless cellular base station also makes uplink word error rate (WER) measurements. All of these measurements are known to those of skill in the art. Under certain conditions, the above measurements may also be made by the mobile stations using the IS-136 MAHO measurement capabilities known to those of skill in the art. The mobile station 12 then relays its measurements to the cordless cellular base station 10. The cordless cellular base station 10 translates the RSS and WER measurements into a score increment or decrement value based upon a stored score increment table. After each measurement, the current score increment/decrement value is added to the previous score value. The score for a frequency is a measure of the amount of interference encountered on that frequency, with a higher score representing more interference, and a lower score representing lower interference. In the absence of interference, the score value will gradually decay towards zero as more measurements are made. In addition, when frequencies are found to have significant interference, they are quickly removed from consideration and are only reconsidered after some significant quiet period in accordance with the scoring mechanism and thresholds described in more detail herein.

The cordless cellular base station 10 uses the interference score measurements in making the choice of an operating frequency. By selecting a frequency from those with the lowest interference scores, and by using appropriate channel abandonment thresholds described below, the cordless cellular base station 10 attempts to avoid transmitting on any frequency which is already in use by the public cellular network 16 or by other cordless cellular base stations 10 within range. Preferably, the cordless cellular base station selects for its initial operational frequency the frequency with the lowest interference score. The cordless cellular base station 10 selects for its backup frequencies a specified number of downlink frequencies whose scores are below a high threshold value (Ht). Preferably, depending upon whether a call is in progress or if a primary mobile station is registered, if the interference score of the current operational frequency rises above a first low threshold (Lt) or above the high threshold (Ht), the cordless cellular base station 10 automatically switches its operational frequency to the first backup frequency as described in more detail below. The cordless cellular base station 10 also removes backup frequencies from the back-up frequency list if the interference score rises above the high threshold (Ht). The cordless cellular base station needs to locate a specified number of downlink frequencies (referred to herein as M) having score values below the high threshold value (Ht). If a sufficient number of frequencies are not available, i.e., less than M frequencies are available, the cordless cellular base station 10 notifies the cellular network 16 of the problem. In one embodiment, the cellular network will provide the cordless cellular base station with a list of alternative frequencies for operation. In another embodiment, the cellular network 16 will temporarily disable the cordless cellular base station 10 for a specified period of time and then will enable its operation on the same frequencies which are hopefully free from interference at this later time. The remainder of the interference measurement procedure is described in more detail below.

Interference Measurement

The cordless cellular base station 10 has a variety of different modes of operation that affect the number and type of interference measurements that are performed. In the basic operational mode when the cordless cellular base station 10 is authorized for use and none of its registered mobile stations 12 are processing a call, i.e., are in an active state, the cordless cellular base station 10 performs an interference measurement during time slot 4 (40) of the cordless cellular base station transmit time frame 36. Referring to FIG. 4, if either zero or one call is being processed by the cordless cellular base station 10, the receiver will be silent on timeslot 5 (41) of the receive time frame 35 because the mobile station will not be sending voice information for the digital traffic channel of the second mobile station (DT2). Further, the transmitter does not transmit any information on timeslot 4 (40) of the transmit time frame 36, the cordless cellular base station 10 will not be generating any of its own interference and thus can make an accurate measurement of the interference generated by its environment. When the cordless cellular base station 10 measures the interference on its own operating frequency, the strength of the interference received on the receiver is measured when no transmission is specifically broadcast to the receiver of the cordless cellular base station, as known to those of skill in the art.

When the cordless cellular base station 10 measures activity on a downlink frequency other than the operating frequency, the received signal strength (RSS) in dBm is the noise plus interference power (NPIP). The cordless cellular base station 10 can measure signal strength on the downlink operating frequency, i.e., the frequency used by the cellular base station to communicate with the mobile station 12, during the cordless cellular base station's silent transmission period in Time Slot 4 (40) of the TDMA transmission frame 36. If fewer than two mobile stations 12 are active, the cordless cellular base station 10 measures the receive signal strength on the uplink operating frequency, i.e., the frequency used by the cellular base station to communicate with the mobile station 12, during unused time slots as described in more detail below.

When the cordless cellular base station 10 measures signal strength and word error rate (WER) in a digital traffic channel (DTC) time slot on the uplink operating frequency, the RSS includes both the desired signal and the noise and interference. For these measurements, the cordless cellular base station 10 first converts the measured word error rate (WER) into an equivalent signal to noise-plus-interference ratio (SNIR), using the conversation factors known to those of skill in the art. Once the SNIR has been determined, the cordless cellular base station 10 estimates the noise-plus-interference signal strength as:

$$NPIP = \frac{RSS}{SNIR}$$

where RSS is the total received power.

The measurement result is expressed as a power equivalent (in dBm) of the noise plus interference (NPIP) value.

Interference Measurements in Various Modes of Operation

As indicated above, the cordless cellular base station 10 has several different modes of operation that affect the number and type of measurements that can be performed. Each of the modes of operation and the types of measurements made in each mode are described in more detail in the subsections below. In addition, all of the modes of operation and the types of measurements which can be performed in each mode are summarized in Table 1 below.

TABLE 1

Cordless Cellular Base Station Measurement Modes

| Cordless Cellular Base Station Mode | Measurements Made By: | |
|---|---|---|
| | cordless cellular base station | mobile station |
| Silent, prior to receipt of a list of allowed frequencies | none | none |
| Silent, with list of allowed frequencies | downlink RSS on all authorized frequencies; fast measurement | none |
| DCCH only, no mobile station present or mobile station in standby | downlink RSS on all authorized frequencies and uplink RSS on $f_0$ | none |
| DTC, one mobile station call-connected | optional downlink RSS on all authorized frequencies, uplink RSS on $f_0$ only uplink WER | MAHO, downlink WER |
| DTC, two mobile stations call-connected | uplink WER only | MAHO, downlink WER |

Cordless Cellular Base Station Measurements in Silent Mode

The silent mode encompasses all states in which the cordless cellular base station's transmitter is turned off. The cordless cellular base station's transmitter is turned off for a number of reasons: (1) the cordless cellular base station 10 has not received network authorization to transmit; (2) transmit authorization has been received, but there are an insufficient number of acceptable operating frequencies, i.e., frequencies with interference scores below Ht; (3) the cordless cellular base station 10 has found an insufficient number of initially acceptable operating frequencies when it abandoned its last operating frequency; or (4) transmit authorization has been revoked.

Silent Mode, Prior to Receipt of a List of Authorized Frequencies

In silent mode, prior to the receipt of a list of authorized frequencies from the cellular network during the initial authorization procedure, the cordless cellular base station 10 is not required to make interference measurements. In addition, since the list of authorized frequencies has not been received, no mobile stations 12 have been allowed to register with the cordless cellular base station 10, so no mobile stations 12 have to report any measurements either.

Silent Mode, After Receipt of a List of Authorized Frequencies

After the receipt of a list of authorized frequencies, the cordless cellular base station 10 may for a period of time have an insufficient number of acceptable clear channels so the transmitter is silent. In another case, the cordless cellular base station 10 may have an insufficient number of acceptable channels when it abandoned its last operating frequency and is temporarily silent. Without at least one clear channel, the cordless cellular base station 10 cannot communicate with any of the mobile stations so the cordless cellular base station has no phone related transmission or reception duties. Therefore, the cordless cellular base station can make interference measurements on all of the time slots 1–6. Because additional time slots are available for making interference measurements, the cordless cellular base station is referred to as being in a fast interference measurement mode. In the fast interference measurement mode, the measurement rate is expected to be substantially higher than one measurement per TDMA frame. Further, in this mode the cordless cellular base station only measures the down link frequencies so it can establish a sufficient number of clear channels below the Ht threshold. In a preferred embodiment, the cordless cellular base station should have M channels with interference scores below Ht before initial operation can begin. Once the cordless cellular base station finds a sufficient number of clear channels with scores below the Ht threshold, the cordless cellular base station preferably selects the frequency with the lowest interference score to be the downlink operating frequency and starts broadcasting its DCCH on this frequency. At this point, the cordless cellular base station moves into its authorized mode.

Cordless Cellular Base Station Measurements in Authorized Mode

On receipt of authorization to transmit, the cordless cellular base station 10 first notes the list of allowed frequencies given in the authorization transaction. Interference measurements are restricted to this set of allowed frequencies. Note that this list could include all frequencies in the cellular frequency range.

When the cordless cellular base station 10 is authorized for operation (transmitting a DCCH), the cordless cellular base station 10 makes several types of measurements, depending on the operating mode.

No Mobile Stations in Active Mode

When no mobile stations 12 are active, the cordless cellular base station 10 makes downlink RSS measurements for all of the authorized downlink frequencies using the scheme described below and uplink RSS measurements for the current uplink frequency only. When no mobile stations 12 are in an active mode, the cordless cellular base station 10 is transmitting its half-rate digital control channel on time slot 1, there are no required transmissions on time slots 2, 3, 5, and 6 besides idle codes because there is no call in progress to send voice information for DTC1 or DTC2. Further, as described above the cordless cellular base station 10 will normally be silent during Time Slot 4 and during this silence in time slot 4 of the transmission frame, at a time when neither the transmitter nor the receiver is in use, the cordless cellular base station 10 will make interference measurements, as described below.

Preferably, the cordless cellular base station 10 nominally makes one downlink interference measurement in time slot 4 per TDMA frame. The downlink frequency to be measured are chosen as follows: (1) in 50% of the 40 ms frames in which a measurement is made, the cordless cellular base station 10 measures the current downlink operating frequency; (2) in 25% of the 40 ms frames in which a measurement is made, the cordless cellular base station 10 measures one of the three downlink backup frequencies; (3) in 20% of the 40 ms frames in which a measurement is made, the cordless cellular base station 10 measures one of the other allowed downlink frequencies whose score is below the low threshold (Lt); (4) in 5% of the 40 ms frames in which a measurement is made, the cordless cellular base station 10 measures one of the other allowed downlink frequencies whose score is at or above the low threshold (Lt).

When the downlink operating frequency is measured, the estimated noise plus interference is correlated with all other estimates of noise plus interference on the operating frequency available for this 40 ms TDMA frame. The largest interference estimate is used, and any others are ignored. The cordless cellular base station 10 scores this frequency, as discussed below.

The uplink RSS measurements are made as follows. Since no mobile stations are active on receive time slots 2, 3, 5 and 6, the cordless cellular base station 10 measures uplink RSS at least once per frame in one of these time slots. The RSS measurement is used as an estimated noise-plus-interference signal strength on the operating frequency. This estimate is compared with other estimates of the noise plus interference on the operating frequency and the largest interference estimate is determined. The cordless cellular base station 10 scores this frequency, as discussed below.

One Mobile Station in Active Mode

In one embodiment, when one mobile station 12 is active, the cordless cellular base station 10 makes uplink RSS and WER measurements for the current uplink frequency only and the mobile station 12 makes downlink WER measurements and forwards them to the cordless cellular base station. In the preferred embodiment, the cordless cellular base station also makes downlink RSS measurements of all of the authorized downlink frequencies using the scheme described below. However, in other embodiments, the cordless cellular base station may not make downlink RSS measurements.

The cordless cellular base station 10 nominally makes one downlink RSS interference measurement on time slot 4 per TDMA frame. The downlink frequency to be measured is chosen as follows: (1) in 50% of the 40 ms frames in which a measurement is made, the cordless cellular base station 10 measures the current downlink operating frequency; (2) in 25% of the 40 ms frames in which a measurement is made, the cordless cellular base station 10 measures one of the three backup downlink frequencies; (3) in 20% of the 40 ms frames in which a measurement is made, the cordless cellular base station 10 measures one of the other allowed downlink frequencies whose score is below Lt; (4) in 5% of the 40 ms frames in which a measurement is made, the cordless cellular base station 10 measures one of the other allowed downlink frequencies whose score is at or above Lt.

When the downlink operating frequency is measured, the estimated noise plus interference is correlated with all other estimates of noise plus interference on the operating frequency available for this 40 ms TDMA frame. The largest interference estimate is used, and any others are ignored. The cordless cellular base station 10 scores this frequency, as discussed below.

When one mobile station 12 is active, the CCBS establishes the digital traffic channel on receive time slots 3 and 6, i.e., DTC1. However, time slots 2 and 5 are still unused, therefore the cordless cellular base station 10 may attempt to measure uplink RSS at least once per frame in one of these available time slots. Preferably, the uplink RSS measurement is made during the receive time slot 5 as it is most likely not to receive interference from the transmission of the DCCH of the cordless cellular base station. The RSS measurement is used as an estimated noise-plus-interference signal strength on the operating frequency. This estimate is compared with other estimates of the noise plus interference on the operating frequency and the largest interference estimate is determined.

Besides measuring the RSS uplink information, the cordless cellular base station 10 also measures the uplink WER for the Digital Traffic Channel (DTC) being received from that mobile station 12 at least once, and more preferably twice, per 40 ms TDMA frame. The uplink WER and uplink RSS measurements are combined per the equation described above to achieve an uplink noise plus interference measurement for the operating frequency. This estimate is compared with all other estimates of noise plus interference available for this 40 ms TDMA frame (for example signal quality reports from the mobile) and the largest interference estimate is determined. The cordless cellular base station 10 scores this frequency, as discussed below.

When one of the cordless cellular base station's mobile stations is in the active mode, the mobile station, in compliance with IS-136, will be making downlink MAHO RSS and WER interference measurements of its own since the CCBS will command it to do so. The cordless cellular base station 10 receives these measurements from the mobile station 12 and scores them as discussed below.

In order to ensure that proper communication is maintained with the mobile station 12, besides receiving interference measurement scores from the mobile station 12, the cordless cellular base station 10 updates the mobile's MAHO neighbor list each two to ten seconds. Preferably, the mobile's MAHO neighbor list is updated every five seconds. As specified in the IS-136 standard, the digital control channel DCCH from a base station to a mobile station 12 can send control information using one of two control channel formats, the fast associated control channel (FACCH) and the slow associated control channel (SACCH) formats.

The SACCH format uses a concatenated set of 12-bit fields from multiple TDMA bursts to transmit control information during the normal DTC. The FACCH format is used when the control information is longer and cannot wait for the next DTC time slot to send the balance of the message. Since the FACCH message steals voice capacity from the digital traffic channel, it is preferable to wait to send the FACCH message until there is a detectable silence in the conversation on the digital traffic channel so the users will not detect the interruption during which the FACCH message is sent. The neighbor list update is sent using the FACCH, therefore the cordless cellular base station 10 is required to detect voice activity (possibly based on the R0 level of the VSELP codec) to determine when a quiet period has occurred during the conversation to send the neighbor list update message for minimum degradation of voice quality. The neighbor list update message is preferably sent at the first opportunity (i.e., when silence in the voice signal from the cordless cellular base station 10 to the mobile is detected) after the MAHO report from the previous list has been received. If there is no opportunity within ten seconds, the cordless cellular base station 10 sends the neighbor list update message regardless.

As per the IS-136 standard, the MAHO neighbor list preferably comprises up to twenty-four downlink frequencies. In the case of the cordless cellular base station, the twelve downlink frequencies are chosen from the list of authorized downlink frequencies assigned to the cordless cellular base station. In the preferred embodiment, the twelve downlink frequencies comprise the three backup frequencies selected by the cordless cellular base station, plus nine from the remaining authorized downlink frequencies for the cordless cellular base station. Preferably, seven of the nine frequencies are selected among the frequencies whose score is below Lt. If there are fewer than seven such frequencies, the cordless cellular base station 10 includes all the frequencies whose interference scores are below Lt. The balance of the nine frequencies are selected from among the remaining frequencies, other than the current operating frequency.

Two Mobile Stations in Active Mode

With two mobile stations 12 connected to a call (two DTCs in use), the cordless cellular base station 10 cannot measure signal strength during Time Slot 4 of the CCBS transmit frame. This is because time slot 5 of the CCBS receive frame occurs at the same time as transmit time slot 4, and the cordless cellular base station's receiver is used during the receive frame time slot 5 as part of the second digital traffic channel (DTC2) for the second mobile station 12. In this mode, the cordless cellular base station can only monitor the uplink WER and RSS for each of the mobile stations. Thus, the cordless cellular base station 10 must rely on the downlink RSS MAHO measurements and the downlink WER measurements from the two mobile stations 12, which necessarily excludes the measurement of the current operating frequency of each of the mobile stations. Thus the cordless cellular base station 10 loses the ability to measure the RSS of interference on the operating frequency, unless the interference is large enough to affect the word error rates (WERs).

Thus, in compliance with IS-136, both of the mobile stations will be making MAHO downlink RSS and downlink WER interference measurements of their own. The cordless cellular base station 10 receives these measurements from either one of the mobile stations 12 and scores the measurements as discussed below.

With two mobile stations 12 in an active state, the only measurement that the cordless cellular base station 10 can make itself is the uplink WER and RSS measurements for each of the digital traffic channels (DTC) of the mobile stations 12. The uplink WER measurement is made twice per 40 ms TDMA frame per digital traffic channel (DTC). The uplink WER measurements from the cordless cellular base station 10 is combined with the downlink RSS MAHO measurement and the downlink WER measurement made by one of the mobile stations and used as a measurement of downlink noise plus interference. The cordless cellular base station 10 scores this frequency, as discussed below.

Score Determination

In the preferred embodiment, the interference measurements are translated into a score increment or decrement. The interference score for each frequency can preferably range from 0 to $2^{22}-1$. In addition, the CCBS VLR provides the cordless cellular base station 10 with the initial score value for each of the operational frequencies in the authorization message that is sent by the cellular network 16. In another embodiment, the initial score value is set to be a default value when the CCBS is manufactured. In a preferred embodiment, on power-up or reset, the cordless cellular base station 10 initializes the frequency scores to a value equivalent to the high threshold (Ht)+7500. This makes these frequencies initially unacceptable for use but available if they stay clear for 5 minutes, which is equivalent to 7500 40 ms TDMA frames. On subsequent receipt of a new list of allowed frequencies, the cordless cellular base station 10 initializes scores on any frequencies that were not previously allowed to Ht+7500. In another embodiment, certain of the new frequencies on the allowed frequency list may be sent with preassigned initial values. The frequencies which are sent with preassigned initial values will override the initial value set at the time of manufacturing or previously provided by the CCBS VLR.

Figure 20:
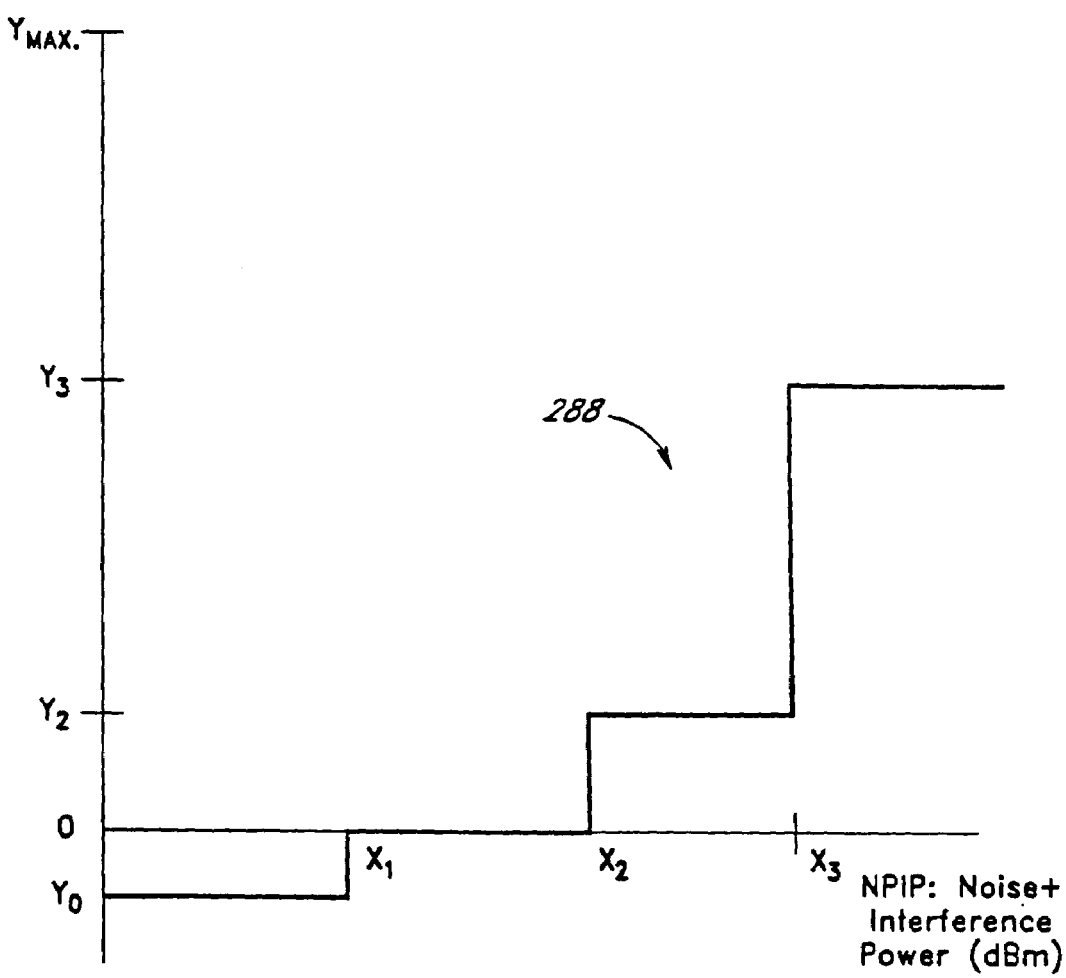
FIG. 20 is a graph of the staircase function used to translate the noise plus interference power level into a score increment.

The cordless cellular base station 10 takes the interference measurement for each frequency which is expressed as a power equivalent (in dBm) of the noise plus interference and translates the measured noise plus interference power level into a score increment or decrement using a staircase function 288 in FIG. 20. The cordless cellular base station 10 determines between which X values the interference measurement occurs and reads the appropriate decrement or increment value from the Y axis.

As indicated below in the preferred embodiment the X values for a mobile station measurement are different from the X values for the cordless cellular base station measurement. The reason for this difference is that the mobile station 12 will be able to move from inside the home or office environment to outside of the home or office environment and it is believed that it will be subject to a slightly elevated level of interference because of its ability to be located outside. The cordless cellular base station 10, on the other hand, is stationary and will remain inside where it is believed that it will be subjected to less interference. To reconcile this difference, less interference detected by the cordless cellular base station 10 is required to make a larger jump in the interference score. For example, in the preferred embodiment, a −90 dBm measurement by the cordless cellular base station 10 would result in an interference score at the $Y_3$ level, whereas −90 dBm measurement by the mobile station 12 would result in an interference score at the $Y_2$ level.

The preferred X values for FIG. 20 are shown in Table 2 below:

TABLE 2

Preferred 'X' Coordinate Values for the Staircase Function

|  | mobile station | cordless cellular base station |
|---|---|---|
| $X_1$ | −112 dBm | Nfloor + 6 dBm |
| $X_2$ | −95 dBm | −100 dBm |
| $X_3$ | −85 dBm | −90 dBm |

As shown in the table, the value for $X_1$ for the cordless cellular base station is set at 6 dBm above the receiver's noise floor. In the preferred embodiment, the receiver's noise floor is −118 dBm, thus the preferred value for $X_1$ for the cordless cellular base station is −112 dBm.

The preferred Y values for FIG. 20 are shown in Table 3 below:

TABLE 3

Preferred 'Y' Coordinate Values for the Staircase Function

|  | 1 measurement per TDMA frame | 1 measurement per N TDMA frames |
|---|---|---|
| $Y_0$ | −1 | −N |
| $Y_2$ | $Y_{max}/50$ | $Y_{max}/50$ |
| $Y_3$ | $Y_{max}/2$ | $Y_{max}/2$ | where $Y_{max}$ is the full-scale (saturation) value of the score. In the preferred embodiment, $Y_{max}$ is $2^{22}-1$. When an mobile station 12 is present and in active (conversation) mode, the value of N in this table is replaced by N/2. In effect, this gives the cordless cellular base station 10 and mobile station 12 measurements each half of the total weight.

As shown in the preferred Y value table, the values of $Y_0$ and $Y_2$ are proportional to the interval between successive measurements on the frequency in question. This normalizes the measurements, making the decay rate for a score on a clear frequency independent of the measurement rate. For example, once a particular score reaches the saturation value, removal of the interference will cause the score to decay to zero in $2^{22}-1$ times 40 ms; about 2 days. The values of $X_1$, $X_2$, $X_3$, $Y_0$, $Y_2$ and $Y_3$, as well as the number of steps in the staircase function 288, are the currently preferred values. It is contemplated that these values would be changed depending upon the actual use of the system in order to maintain the goals of quickly removing frequencies from consideration when they are found to have significant interference and only reconsider new frequencies after some significant quiet period.

The cordless cellular base station 10 adds the increment or decrement value read from the Y axis to the previous interference score for the measured frequency. The increment values of the Y axis were chosen such that interference above the $X_3$ value will cause a large jump in the interference score and will quickly make this channel undesirable for use as either a backup frequency or an operating frequency. Whereas, interference between the $X_3$ value and the $X_2$ value will cause a medium size jump in the interference score which should make it undesirable for use as an operating frequency, but could make it useable as a backup frequency depending upon how persistent this level of interference is. Interference between the $X_2$ value and the $X_1$ will not change the present score value, so the channel will remain in its current use level. Interference below the $X_1$ value will enable the interference score to be decremented, thus making it more desirable for use as a potential backup or operational frequency. The increment and decrement values were chosen such that continual interference measurements on the same frequency causes the score to increase rapidly to quickly alert the cordless cellular base station 10 of the interference. Further, occasional interference which is bursty in nature, i.e., sometimes detected on the channel sometimes not detected on the channel, causes the score to increase more slowly but if persistent it eventually can lead to the channel scoring unacceptably high. Finally, when there is little or no interference, i.e., below the $X_1$ value, a decrement allows the score to slowly decay toward zero.

Score Storage

The cordless cellular base station 10 stores the scores for each of the operational frequencies in a data base, such as the date base shown in Table 4 below. The cordless cellular base station 10 normalizes the score increments and decrements according to the interval between measurements. Therefore, the table below also stores the number of TDMA frames which have occurred between measurements to normalize the interference scores as described in more detail below. In a preferred embodiment, the cordless cellular base station 10 is able to operate on any of the available four hundred sixteen "A" side or "B" side pairs of uplink and downlink frequencies in the cellular frequency bands. In one embodiment, as described above, the cellular network 16 offers the cordless cellular base station 10 a list, or range of frequencies, carved out of the cellular frequency bands within which to operate. To efficiently use the measurement capabilities of the cordless cellular base station 10 and its mobile stations 12, the cordless cellular base station 10, once authorized by the cellular network 16 with such a frequency list supplied, does not update or otherwise maintain the scores of frequencies which are not on the network-supplied list of frequencies that the cordless cellular base station 10 is enabled to use.

TABLE 4

Interference Scores Maintained by Cordless Cellular Base Station

| | | Number N of TDMA frames since the last measurement by: | | |
|---|---|---|---|---|
| frequency | Interference score | cordless cellular base station | mobile station 1 | mobile station 2 |
| 1 | | | | |
| 2 | | | | |
| 3 | | | | |
| ... | | | | |
| 416 | | | | |

Normalizing Measurements

Since measurement rates are not uniform over time, the cordless cellular base station 10 must normalize the score increments and decrements according to the interval between measurements. The score updating process requires the cordless cellular base station 10 to track the update rate. The update rate is expressed as the number N of 40 ms TDMA frames since the last interference measurements on any given frequency. Any one frequency may have different update rates from different measurement sources. The range of possible values for N is limited depending upon the measurement mode, as described below.

The value of N will, in general, be different for measurements made by the cordless cellular base station 10, the first mobile station 12, and the second mobile station 12. The value of N depends on the measurement mode, and can be calculated as indicated in Table 5 below. The following abbreviations are used in the table: (1) $f_{od}$ is the operating downlink frequency; (2) $f_{ou}$ is the operating uplink frequency; (3) $f_1$, $f_2$ and $f_3$ are the three backup frequencies; (4) $n_b$ is the number of backup frequencies; (5) $n_{low}$ is the number of allowed frequencies other than $f_0$–$f_3$ which have scores less than Lt; and (6) $n_{high}$ is the number of allowed frequencies other than $f_0$–$f_3$ which have scores greater than or equal to Lt.

TABLE 5

Preferred Interference Measurement Rates

| cordlesss cellular base station mode | Number N of TDMA frames since the last measurement | | |
|---|---|---|---|
| | cordless cellular base station | mobile station 1 | mobile station 2 |
| Silent, with a list of allowed frequencies | 416/6 measurements | no measurements | no |
| DCCH only, no mobile stations present or mobile stations in standby | $f_{od}$: 2/0.875<br>$f_{ou}$: 0.5<br>$f_{1-3}$: $4n_b$/0.875<br><Lt: $5n_{low}$/0.875<br>>Lt: $20n_{high}$//0.875 | no measurements | no measurements |
| DTC, mobile station 1 active, mobile station 2 not | $f_{od}$: 2/0.875<br>$f_{ou}$: 1 [measured each frame]<br>$f_{1-3}$: $4n_b$/0.875 | $f_{od}$: 75<br>$f_{1-3}$: 75<br><Lt: $75n_{low}$/7<br>>Lt: $75n_{high}$/2 | no measurements |

TABLE 5-continued

Preferred Interference Measurement Rates

| cordlesss cellular base station mode | Number N of TDMA frames since the last measurement | | |
|---|---|---|---|
| | cordless cellular base station | mobile station 1 | mobile station 2 |
| present or in standby DTC, two mobile stations active | <Lt: $5n_{low}/0.875$ >Lt: $20n_{high}/0.875$ $f_{od}$: no measurements $f_{ou}$: 1 [measured each frame] | | $f_{od}$: 75 $f_{1-3}$: 75 <Lt: $75n_{low}/7$ >Lt: $75n_{high}/2$[all measured by one mobile station] |

For example, consider the measurements made by the cordless cellular base station 10 with one mobile station 12 in active mode (third row, first cell of the above table). In this example, the cordless cellular base station 10 measures downlink interference on the operating frequency $f_{od}$ once every two frames, except that 1 of 8 such measurements is preempted by an idle code transmission as described above. This pre-emption of downlink measurements accounts for the divisor 0.875 here and elsewhere in the cordless cellular base station 10 column of the table. With one mobile active, as described above, the cordless cellular base station 10 measures uplink interference of the operating frequency $f_{ou}$ once per frame. Since these measurements do not occur in Time Slot 4, they are never preempted for an idle code transmission, thus N is 1. The cordless cellular base station 10 measures downlink interference on one of the downlink backup frequencies $f_{1-3}$ at an average interval of four frames (25 percent of the measurement frames as describe above). Thus, to measure all the backup frequencies one time requires $4n_b$ frames, and again the 0.875 divisor must be applied because the measurements are preempted for the occasional idle code transmission in time slot 4. In 20 percent of the measurement frames, the cordless cellular base station 10 measures downlink interference on one of the allowed frequencies with scores below Lt. This means an average of 5/0.875 frames between non-preempted measurements, or $5n_{low}/0.875$ frames before all these frequencies can be measured once. In 5 percent of the measurement frames, the cordless cellular base station 10 measures downlink interference on one of the allowed frequencies with scores equal to or greater than Lt. This means an average of 20/0.875 frames between non-preempted measurements, or $20n_{high}/0.875$ frames before all these frequencies can be measured once.

The mobile station's measurements in active (conversation) mode are listed in the third row, second cell of the above table. These values assume an average of three seconds (IS-136's allowable range is two to ten seconds) between successive MAHO reports. The measurements are as follows: One indirect measurement of downlink interference on the operating frequency every 75 frames (=three seconds) is taken. For this measurement, the cordless cellular base station 10 combines the mobile station's downlink WER and downlink RSS results using the equation described above to achieve the noise plus interference measurement. One direct measurement of downlink interference on each backup frequency is taken every 75 frames. As described above, all downlink backup frequencies are on every MAHO list. Every 75 frames, measurements of downlink interference on seven of the allowed frequencies on the MAHO list with scores below Lt are taken. This works out to $75n_{low}/7$ frames to measure each of these frequencies once. Every 75 frames, measurements of downlink interference are taken on two of the allowed frequencies with scores equal to or greater than Lt. This works out to $75n_{low}/2$ frames to measure each of these frequencies once.

Frequency Selection

The cordless cellular base station 10 uses its interference scores as the input to its decisions to select, retain, or abandon an operating frequency or a backup frequency. Changes in operating or backup frequencies result from the score on the frequency exceeding a specified threshold. The two thresholds used by the cordless cellular base station 10 are the high threshold, Ht, and the low threshold, Lt. In the preferred embodiment, Ht is set to $Y_{max}/2$, equal to $2^{21}$, and Lt is set to $Y_{max}/8$, equal to $2^{19}$. In one embodiment, the low and high thresholds are set to be equal.

The cordless cellular base station 10 forms a ranked list of 4M, or four times M, downlink frequencies with the lowest acceptable interference scores from the above list of all frequency scores. Only downlink frequencies whose interference scores are below the High Threshold (Ht) are eligible for inclusion in this list. Therefore, under some conditions the list will contain fewer than 4M frequencies. In the preferred embodiment, the cordless cellular base station 10 recompiles this ranked list every two seconds.

The cordless cellular base station 10 also maintains an unranked list of all frequencies with interference scores less than a Low Threshold (Lt). In the preferred embodiment, the cordless cellular base station 10 recompiles this list at least once every two seconds.

Figure 21:
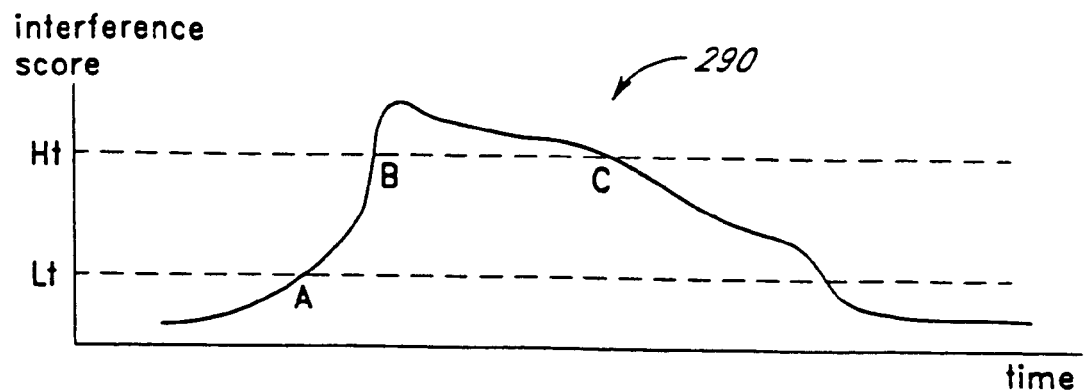
FIG. 21 is a graph of the variations in an exemplary interference score over time.

FIG. 21 shows a simplified example of the interference score 290 for a particular frequency (note this example does not take into consideration the status of a call or if a primary mobile station is registered with the cordless cellular base station). At point A, when the interference score rises above Lt, the cordless cellular base station 10 would abandon this frequency if this were the operating frequency and if the other scores were below Lt. At point B, when the interference score rises above Ht, this frequency is unconditionally rejected for use as either an operating or backup frequency. At point C, when the interference score decays below Ht, this frequency once again becomes eligible for selection as a backup or operating frequency.

Initial Selection and Reselection of the Operating Frequency

The initial downlink operating frequency is preferably the frequency on the authorized frequency list with the lowest interference score, namely the frequency at the top of the ranked list. If fewer than M frequencies have scores below Ht, the cordless cellular base station 10 will preferably not begin transmitting and will alert the CCBS VLR of the problem.

Whenever the score of the current downlink operating frequency is updated, the cordless cellular base station 10 evaluates the new score to decide whether or not to change the operating frequency. In the preferred embodiment, the rules for changing the operating frequency also depend upon whether the primary mobile stations are registered or if a call is in progress. Thus, in the preferred embodiment, if the cordless cellular base station's primary mobile station 12 is in active or standby mode or if any of the registered mobile stations are on a call,: the cordless cellular base station 10 will no longer operate on the current operating frequency if: its interference score equals or exceeds Lt and if the first backup frequency's interference score is lower than the operating frequency's score. If the cordless cellular base station's primary mobile station 12 is in the dormant mode, and if no digital traffic channel (DTC) is active, i.e., none of the registered mobile stations are on a call: the cordless cellular base station 10 will no longer operate on the current operating frequency if: its interference score equals or exceeds Ht, otherwise, the cordless cellular base station will remain on its current operating frequency until the primary mobile station user registers with the cordless cellular base station or the interference level exceeds Ht. This feature is provided, so that the primary user's phone can automatically locate its cordless cellular base station 10 when it comes into proximity with it. If the cordless cellular base station 10 were frequently changing its operating frequency when the primary mobile station was not registered, it would be possible for the mobile station 12 to change frequencies such that the current operational frequency was not on the list of the operating and backup frequencies that the mobile station 12 stored when it last registered with the cordless cellular base station 10. Thus, the primary mobile station would not be able to automatically locate and register with the cordless cellular base station 10, because it would not be aware of the current operating frequency of the base station 10, and would therefore not know where to look for its new frequency. In this situation, the user would need to manually invoke a test registration by the mobile station.

If the cordless cellular base station 10 ceases to operate on the current operating frequency, the replacement operating frequency is the first backup frequency $f_1$. If a call is active at the time the cordless cellular base station 10 abandons the operating frequency, the cordless cellular base station 10 preferably performs a handoff to the new frequency, using a handoff procedure known to those of skill in the art. However, in a typical handoff the mobile station would be switching from one cell to another. In the case of a handoff initiated by the cordless cellular base station, the mobile station remains in the same cell (the cordless cellular base station cell) and changes its operating frequencies. Since the same radio transceiver remains in control of the call while switching frequencies, the handoff procedure is carefully controlled to ensure that the transceiver does not lose the call while it tunes to the new frequency. If a call is not in progress, the cordless cellular base station 10 will change its operating frequency to the first backup frequency $f_1$ and will notify the mobile stations 12 listed in standby mode by sending the new operating frequency in the next neighbor list message as described above.

If, at the time the cordless cellular base station 10 abandons its operating frequency, fewer than M frequencies have scores below Ht, the cordless cellular base station 10 preferably contacts the CCBS VLR and informs the CCBS VLR that it does not have enough clear channels for operation. The CCBS VLR may send the cordless cellular base station an new set of channels, or may send it a lower M value, or may send the cordless cellular base station an empty list of authorized frequencies which will cause it to cease transmission until a new set of authorized frequencies are provided. The cordless cellular base station 10 will make its own measurements and maintain interference scores for the newly supplied list of authorized frequencies. Once there are M or more frequencies with scores below Ht, the cordless cellular base station 10 begins transmitting on one of the frequencies with an interference score below Ht.

In an alternate embodiment, at the time the cordless cellular base station 10 abandons its operating frequency, fewer than M frequencies have scores below Ht, the cordless cellular base station 10 ceases to transmit its DCCH. The cordless cellular base station 10 will make its own measurements and maintain interference scores, regularly and frequently checking the number of frequencies whose scores are below Ht. Once there are M or more frequencies with scores below Ht, the cordless cellular base station 10 randomly chooses a waiting time, uniformly distributed between 0 and 5 minutes. After this waiting time expires, and provided that there are still M or more frequencies with scores below Ht, the cordless cellular base station 10 begins transmitting, preferably on the frequency with the lowest score.

In order to avoid dropping a call in progress, the cordless cellular base station 10 temporarily sets M=1 while a digital traffic channel (DTC) is in use. When the call ends (i.e., when neither DTC is in use), the cordless cellular base station 10 will reset M to its true value. If the cordless cellular base station 10 changed its operating frequency during the call, the cordless cellular base station 10 applies the following congestion test after the end of the call: If fewer than M frequencies have scores below Ht, the cordless cellular base station 10 preferably contacts the CCBS VLR and informs the CCBS VLR that it does not have enough clear channels for operation. The CCBS VLR may send the cordless cellular base station a new set of channels, or may send a lower M value, or may send the cordless cellular base station an empty list of frequencies which will cause it to cease transmission until a new set of authorized frequencies are provided.

Initial Selection and Reselection of Backup Frequencies

For both initial and subsequent selection, the cordless cellular base station 10 chooses each backup frequency equiprobably from the top 2M (two times M) frequencies in the ranked list of the best acceptable frequencies maintained in the cordless cellular base station 10 score table. The operating frequency is removed from the ranked list before the backup frequency is chosen. The reason that the backup frequencies are equiprobably chosen from the list of possible frequencies rather than being chosen deterministically is that it prevents two neighboring cordless cellular base stations from selecting the same set of backup frequencies. If the best interference scores where chosen, it would be highly likely that two neighboring cordless cellular base stations would have similarly ranked interference score measurements for similar channels. If similar backup frequencies were chosen for neighboring cordless cellular base stations, the chances of the neighboring cordless cellular base stations selecting the same frequency as their new operation frequency and resulting in the occurrence of a collision would be very high. By equiprobably choosing the backup frequencies from the list of suitable frequencies, the chances of two neighboring cordless cellular base stations having the same set of backup frequency is greatly lessened. Whenever the score of one of the backup frequencies is updated, the cordless cellular base station 10 evaluates the new score to decide whether or not to change this backup frequency. If the interference score of a backup frequency exceeds Ht or exceeds the (4M)-th position in the overall ranking, the cordless cellular base station 10 replaces this backup frequency.

When replacing a backup frequency, the cordless cellular base station 10 maintains the ordering of the backup frequency list $\{f_1, f_2, f_3\}$ for proper ordering in the broadcast neighbor list. The replacement backup frequency becomes $f_3$. If the old $f_3$ was not replaced, it becomes $f_2$. If the old $f_2$ was not replaced, it becomes $f_1$.

Example of Score-Based Frequency Selection and Reselection

Figure 22:
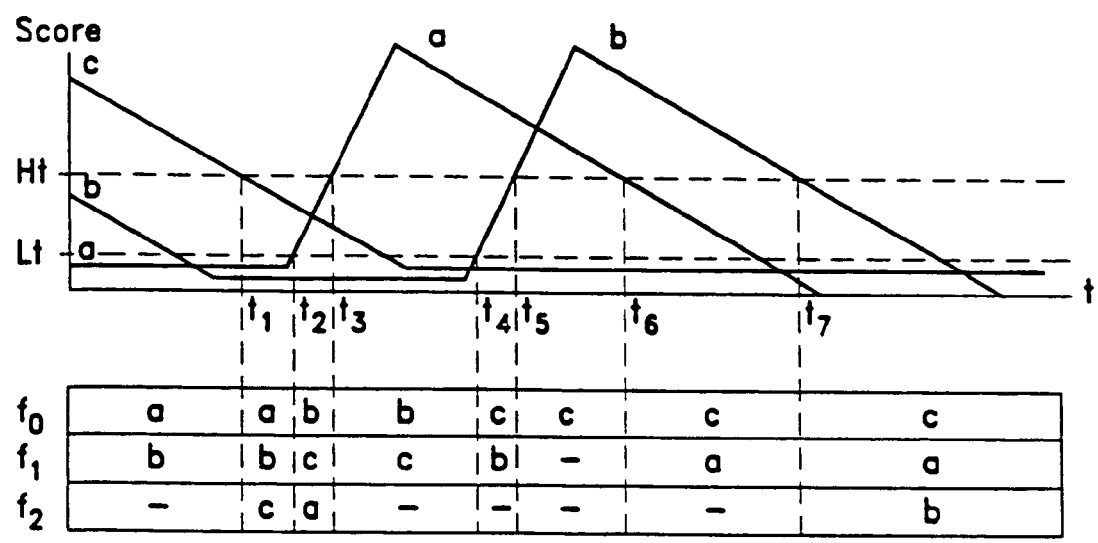
FIG. 22 is a drawing of an exemplary score of a variety of frequencies over time.

The following example described in association with FIG. 22 is used to help clarify the frequency selection concepts. In this example, there are three allowed frequencies, labeled a, b, and c. In addition, for this example, M is set at two, thus two frequencies having a score below Ht must be available to enable operation of the cordless cellular base station and it is assumed that a primary mobile station is registered with the cordless cellular base station. FIG. 22 shows the interference scores for these three frequencies as a function of time, and the cordless cellular base station's selection of operating frequency $f_0$ and backup frequencies $f_1$ and $f_2$ as a function of time. Initially frequencies (a) and (b) are acceptable for use. Since frequency (a) has the lower score, it becomes the operating frequency and (b) becomes the first backup. At time $t_1$, frequency (c) becomes acceptable and is added as the second backup.

At time $t_2$, the score for the operating frequency (a) exceeds Lt. The first backup frequency (b), which has a lower score than does frequency (a), becomes the new operating frequency. The second backup moves up to first position, and the former operating frequency (a) is chosen as the replacement backup frequency.

At time $t_3$, the score for the second backup frequency (a) exceeds Ht and it is therefore removed from the backup list.

At time $t_4$, the score for the operating frequency (b) exceeds Lt and in the preferred embodiment, the primary mobile station is registered with the cordless cellular base station. The first backup frequency (c), which has a lower score than does frequency (b), becomes the new operating frequency. Due to the intermittent or weak nature of the interference, the interference score for the former operating frequency (b) it still below Ht. Therefore frequency (b) is chosen as the replacement backup frequency.

At time $t_5$, the score for the first backup frequency (b) exceeds Ht and it is therefore removed from the backup list. This leaves only one frequency with an acceptable score. Although this would seem to violate the rule that the minimum number of frequencies below Ht (M) must be at least 2, this constraint is only enforced at the time the cordless cellular base station 10 changes its operating frequency. For intermittent or weak interference, the constraint is M−1 acceptable frequencies for continued operation, versus M acceptable frequencies for initial operation. Thus the cordless cellular base station 10 continues to transmit at time $t_5$.

At time $t_6$, frequency (a) becomes acceptable and is added as the first backup. At time $t_7$, frequency (b) becomes acceptable and is added as the second backup.

Quick Start

The quick start feature enables the cordless cellular base station 10 to quickly become operable using a few frequencies, referred to as "quick start frequencies", supplied by the cellular network 16 which are known to be clear channels in the area where the cordless cellular base station is located. The goal for the use of the quick start frequencies is to get the cordless cellular base station operating quickly using these dedicated frequencies and then to migrate them off of these frequencies to other channels as they are found to be clear. In one embodiment, these cordless cellular base station downlink frequencies are set aside by the registered cellular network to permit the use of the cordless cellular base station as a sort of safe haven. In a preferred embodiment, in the initial authorization message, the cordless cellular base station 10 is sent two sets of frequencies. The first set is a short list of frequencies known to be clear by the cellular network 16, referred to as quick start frequencies," which are provided with a low initial interference score. The second set is a large set of frequencies with high initial interference scores. Preferably, the initialization score for the quick start frequencies is at least close to the high threshold Ht. By starting out with a low initial interference score, the quick start frequencies will quickly become available for use as an operating frequency as their score will continue to decrement, since the frequency is clear, until at least one of the frequencies falls below the high threshold (Ht) and can be used as the initial operating frequency. In a more preferred embodiment, the initialization score for the quick start frequencies is below the high threshold Ht, so all of the quick start frequencies will immediately be available for use as the operating frequency. In addition to the two sets of frequencies, the cellular network 16 will provide an initial value $M_i$ for M, the minimum number of clear channels the cordless cellular base station needs to operate. In the initial authorization message, M is equal to the number of quick start frequencies provided. This scheme would be useful in a spectrally congested are such as a tall building.

After a specified period of time X, the cellular network 16 will try to migrate the cordless cellular base station 10 off the quick start frequencies. In the preferred embodiment, this period of time X will be forty-eight hours. During the next network update (either a location update or a network cancellation) after the expiration of X, the cellular network 16 will increase M to $M_n$, the requirement for the minimum number of clear channels for the cordless cellular base station to maintain operation. This information is given to the cordless cellular base station in an authorization message which is sent back from the cellular network to the cordless cellular base station 10 after the location update or network cancellation process has been completed as described in more detail above. If the cordless cellular base station 10 does not have the minimum number of operating frequencies, it will send an alarm message to the cellular network 16. At this point, the cellular network will allow the cordless cellular base station 10 to operate with both sets of frequencies until $M_i$ can be increased to $M_n$ and the cordless cellular base station has enough cellular frequencies for operation. If the cordless cellular base station 10 has the required number of operating frequencies, the cellular network may remove the original "quick start frequencies" and allow it operate on the remaining clear channels. It will remove the "quick start frequencies" during the next network update exchange using the authorization message. The authorization message will include only the second set of frequencies, i.e., excluding the "quick start frequencies," and a new M value equal to $M_n - M_i$.

Local Frequency Monitor

As described above, the cordless cellular base station periodically initiates a phone call to the CCBS VLR. In a preferred embodiment, after initiation of the phone call, the cordless cellular base station 10 advantageously downloads all of the stored interference scores measured using the above described algorithm for all of its authorized frequencies. The CCBS VLR forwards the interference score information to a data collection node (DCN) in the cellular network.

In an alternate embodiment, the CCBS VLR periodically sends the cordless cellular base station a new authorization message with the telephone number for the data collection node instead of the telephone number for the location update information. The cordless cellular base station calls the new telephone number and reports the interference data directly to the data collection node. In one embodiment, after a specified period of time, during the next network contact between the CCBS and the network, the CCBS VLR sends the cordless cellular base station a new authorization message to reinstate the telephone number to report its location update messages. In another embodiment, the data collection node sends the cordless cellular base station a new authorization message to reinstate the telephone number of the CCBS VLR to report its location update messages.

Advantageously, the cellular network can use these interference scores to assist in learning about the peak interference periods for the cell containing the CCBS. Further, the interference scores are useful in assigning or re-assigning the operational frequencies for the regional cells.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

The invention claimed is:

1. A method for controlling a wireless communication system, including a base station coupled to a cellular telephone network and coupled to a second network via a modem, wherein the base station is assigned a PSTN telephone number, and a mobile station assigned a cellular telephone number of the cellular network;

the method comprising;

the mobile station registering with the base station during which the mobile station stores base station identification information and the base station stores mobile station identification information;

the mobile station while in a cellular service mode, recognizing that the mobile station is in close proximity to the base station;

the mobile station selects the base station using the stored base station identification information;

the mobile station upon selecting the base station, couples to the base station, and wirelessly registers with the base station, and automatically de-registers from the cellular network; and the mobile station automatically switches to the second network via the modem to begin communications over the second network.

2. A method for controlling a wireless communication system as in claim 1, wherein the communications over the second network are voice communications.

3. A method for controlling a wireless communication system as in claim 1, wherein a modem link is authorized and established before the communications over the second network begin.

4. A method for controlling a wireless communication system as in claim 3, wherein the second network responds with a validation return message to authorize and establish communications over the second network.

5. A method for controlling a wireless communication system as in claim 2, wherein the modem converts analog voice signals to digital signals for voice communications over the second network.

6. A method for controlling a wireless communication system as in claim 5, wherein the digital voice communications over the second network are compressed signals.

7. A method for controlling a wireless communication system as in claim 5, wherein the modem digitally Processes signals.

8. A method for controlling a wireless communication system as in claim 7, wherein the modem digitally processes speech signals.

9. A method for controlling a wireless communication system as in claim 7, wherein the modem further connects to a modem pool.

10. A method for controlling a wireless communication system as in claim 8, wherein the modem performs signal processing functions associated with voice detection to differentiate between noise and voice signals.

11. A method for controlling a wireless communication system, including a mobile station, a base station, and a modem, the method comprising;

wirelessly transmitting over a first network analog voice communications from the mobile station to the base station;

transmitting the analog voice communications from the base station to the modem;

converting the analog voice communications into compressed digital signals in the modem; and transmitting the compressed digital signals over a second network via the modem.

12. A method for controlling a wireless communication system as in claim 11, wherein only registered users may communicate with the base station.

13. A method for controlling a wireless communication system as in claim 12, wherein the modem digitally Processes signals.

14. A method for controlling a wireless communication system as in claim 13, wherein the modem digitally processes speech signals.

15. A method for controlling a wireless communication system, including a base station coupled to a cellular telephone network and coupled to a second network via a modem, wherein the base station is assigned a PSTN telephone number, and a mobile station assigned a cellular telephone number of the cellular network; the method comprising;

the mobile station registering with the base station during which the mobile station stores base station identification information and the base station stores mobile station identification information;

the mobile station while in a cellular service mode, recognizing that the mobile station is in close proximity to the base station;

the mobile station selects the base station using the stored base station identification information;

the mobile station upon selecting the base station, couples to the base station, and wirelessly registers with the base station, and automatically de-registers from the cellular network; and the mobile station automatically switches to the second network via the modem to begin communications over the second network, wherein the modem includes a digital signal processor and a speech encoder that converts analog voice communications from the mobile station into compressed digital signals to be transmitted over the second network.

16. A method for controlling a wireless communication system as in claim 15, wherein only registered users may communicate with the base station.

17. A method for controlling a wireless communication system as in claim 15, wherein the modem further connects to a modem pool.

18. A method for controlling a wireless communication system as in claim 17, wherein the modem digitally processes speech signals.

19. A method for controlling a wireless communication system as in claim 15, wherein a modem link is authorized and established before the communications over the second network begin.

20. A method for controlling a wireless communication system as in claim 18, wherein the second network responds with a validation return message to authorize and establish communications over the second network.

* * * * *

UNITED STATES PATENT AND TRADEMARK OFFICE
CERTIFICATE OF CORRECTION

| | |
|---|---|
| PATENT NO. | : 7,035,646 B2 |
| APPLICATION NO. | : 10/647105 |
| DATED | : April 25, 2006 |
| INVENTOR(S) | : Michael A. Rafel et al. |

It is certified that error appears in the above-identified patent and that said Letters Patent is hereby corrected as shown below:

Title Page, Col. 1
Item (75), Inventors, delete "Christopher G. Lawr nc" and insert --Christopher G. Lawrence--.

Signed and Sealed this

Nineteenth Day of September, 2006

JON W. DUDAS
*Director of the United States Patent and Trademark Office*